US010740804B2

(12) United States Patent
Spivack et al.

(10) Patent No.: US 10,740,804 B2
(45) Date of Patent: Aug. 11, 2020

(54) SYSTEMS, METHODS AND APPARATUSES OF SEAMLESS INTEGRATION OF AUGMENTED, ALTERNATE, VIRTUAL, AND/OR MIXED REALITIES WITH PHYSICAL REALITIES FOR ENHANCEMENT OF WEB, MOBILE AND/OR OTHER DIGITAL EXPERIENCES

(71) Applicant: Magical Technologies, LLC, Redmond, WA (US)

(72) Inventors: Nova Spivack, Sherman Oaks, CA (US); Yenyun Fu, Sherman oaks, CA (US); Matthew Hoerl, Sherman Oaks, CA (US); Armando Pena, Sherman Oaks, CA (US)

(73) Assignee: Magical Technologies, LLC, Wilmington, DE (US)

( * ) Notice: Subject to any disclaimer, the term of this patent is extended or adjusted under 35 U.S.C. 154(b) by 0 days.

(21) Appl. No.: 16/048,190

(22) Filed: Jul. 27, 2018

(65) Prior Publication Data

US 2019/0108686 A1   Apr. 11, 2019

Related U.S. Application Data

(60) Provisional application No. 62/537,984, filed on Jul. 28, 2017.

(51) Int. Cl.
*G06Q 30/02*    (2012.01)
*G06T 19/00*    (2011.01)
(Continued)

(52) U.S. Cl.
CPC ......... *G06Q 30/0277* (2013.01); *G06F 3/011* (2013.01); *G06F 3/017* (2013.01);
(Continued)

(58) Field of Classification Search
None
See application file for complete search history.

(56) References Cited

U.S. PATENT DOCUMENTS 8,231,465 B2   7/2012  Yee
8,878,846 B1   11/2014 Francis
(Continued)

FOREIGN PATENT DOCUMENTS

KR   10-2012-0007215 A   1/2012
KR   10-2012-0042253     5/2012
(Continued)

OTHER PUBLICATIONS

International Search Report & Written Opinion for Application No. PCT/US18/44214, Date of filing: Jul. 27, 2018, Applicant: Magical Technologies, LLC, dated Nov. 23, 2018, 20 pages.
(Continued)

*Primary Examiner* — Nurun N Flora
(74) *Attorney, Agent, or Firm* — London Bridge Ventures

(57) ABSTRACT

Systems, Methods and Apparatuses of Seamless Integration of Augmented, Alternate, Virtual, and/or Mixed Realities with Physical Realities for Enhancement of Web, Mobile and/or Other Digital Experiences are disclosed. In one aspect, embodiments of the present disclosure include a method, which may be implemented on a system, to create an alternate reality environment of a physical location. The alternate reality environment can include: a representation of a real environment associated with the physical location and/or the virtual object. Moreover, in the alternate reality environment, one or more of, perceptibility of the virtual object and perceptibility of the representation of the real environment is configurable or adjustable by the human user.

32 Claims, 32 Drawing Sheets

(51) Int. Cl.
   *G06F 3/00*     (2006.01)
   *G06F 3/16*     (2006.01)
   *G06F 3/0482*   (2013.01)
   *G06F 3/01*     (2006.01)
   *G06F 3/0481*   (2013.01)
   *G06F 3/0488*   (2013.01)
   *G06Q 20/12*    (2012.01)
   *G06T 13/40*    (2011.01)
   *G06T 19/20*    (2011.01)
   *H04L 29/06*    (2006.01)
   *H04M 1/725*    (2006.01)

(52) U.S. Cl.
   CPC ........ *G06F 3/0482* (2013.01); *G06F 3/04815* (2013.01); *G06F 3/04883* (2013.01); *G06F 3/167* (2013.01); *G06Q 20/123* (2013.01); *G06Q 30/0273* (2013.01); *G06T 13/40* (2013.01); *G06T 19/006* (2013.01); *G06T 19/20* (2013.01); *G06Q 30/02* (2013.01); *H04L 67/38* (2013.01); *H04M 1/72519* (2013.01)

(56) References Cited

U.S. PATENT DOCUMENTS

| | | |
|---|---|---|
| 10,496,272 B1 | 12/2019 | Lonkar |
| 2002/0099257 A1 | 7/2002 | Parker |
| 2002/0099679 A1 | 7/2002 | Usitalo |
| 2005/0021472 A1 | 1/2005 | Gettman |
| 2008/0140494 A1 | 6/2008 | Charuk |
| 2008/0215415 A1 | 8/2008 | Willms |
| 2009/0061901 A1 | 3/2009 | Arrasvuori |
| 2009/0234948 A1* | 9/2009 | Garbow ............... A63F 13/12 709/225 |
| 2010/0100487 A1* | 4/2010 | Lingafelt ............. G06Q 30/00 705/80 |
| 2010/0114662 A1 | 5/2010 | Jung |
| 2011/0251902 A1 | 10/2011 | Nagarajayya |
| 2012/0116728 A1 | 5/2012 | Shear |
| 2012/0218296 A1 | 8/2012 | Belimpasakis |
| 2012/0229508 A1 | 9/2012 | Wigdor |
| 2012/0256954 A1 | 10/2012 | Soon-Shiong |
| 2013/0083173 A1 | 4/2013 | Geisner |
| 2013/0141419 A1* | 6/2013 | Mount ............... G06F 3/011 345/419 |
| 2013/0286004 A1 | 10/2013 | McCullouch |
| 2013/0293468 A1* | 11/2013 | Perez ............... G06F 3/033 345/158 |
| 2013/0293584 A1 | 11/2013 | Anderson |
| 2014/0100955 A1 | 4/2014 | Osotio |
| 2014/0208272 A1 | 7/2014 | Vats |
| 2014/0361971 A1 | 12/2014 | Sala |
| 2014/0369558 A1 | 12/2014 | Holz |
| 2014/0372540 A1 | 12/2014 | Libin |
| 2015/0055821 A1 | 2/2015 | Fotland |
| 2015/0058102 A1 | 2/2015 | Christensen |
| 2015/0187137 A1 | 7/2015 | Mullins |
| 2015/0213355 A1 | 7/2015 | Sharma |
| 2015/0371447 A1* | 12/2015 | Yasutake ............... G06T 19/006 345/420 |
| 2015/0378440 A1 | 12/2015 | Umlauf |
| 2016/0026253 A1 | 1/2016 | Bradski |
| 2016/0100034 A1 | 4/2016 | Miller |
| 2016/0175715 A1 | 6/2016 | Ye |
| 2016/0203645 A1 | 7/2016 | Knepp |
| 2016/0234643 A1 | 8/2016 | Crutchfield |
| 2016/0323332 A1 | 11/2016 | Welinder |
| 2016/0330522 A1 | 11/2016 | Newell |
| 2017/0052507 A1 | 2/2017 | Poulos |
| 2017/0103584 A1 | 4/2017 | Vats |
| 2017/0123750 A1* | 5/2017 | Todasco ............... G06F 3/1454 |
| 2017/0178373 A1 | 6/2017 | Sarafa |
| 2017/0186232 A1 | 6/2017 | Dange |
| 2017/0243403 A1 | 8/2017 | Daniels |
| 2018/0113594 A1 | 4/2018 | Alnatsheh |
| 2018/0190166 A1 | 7/2018 | Salmimaa |
| 2018/0349088 A1 | 12/2018 | Leppanen |
| 2018/0365898 A1 | 12/2018 | Costa |
| 2019/0102946 A1 | 4/2019 | Spivack |
| 2019/0107935 A1 | 4/2019 | Spivack |
| 2019/0107990 A1 | 4/2019 | Spivack |
| 2019/0107991 A1 | 4/2019 | Spivack |
| 2019/0108558 A1 | 4/2019 | Spivack |
| 2019/0108578 A1 | 4/2019 | Spivack |
| 2019/0108580 A1 | 4/2019 | Spivack |
| 2019/0108682 A1 | 4/2019 | Spivack |
| 2019/0108686 A1 | 4/2019 | Spivack |
| 2019/0188450 A1 | 6/2019 | Spivack |
| 2019/0260870 A1 | 8/2019 | Spivack |
| 2019/0266404 A1 | 8/2019 | Spivack |
| 2020/0019295 A1 | 1/2020 | Spivack |

FOREIGN PATENT DOCUMENTS

| | | |
|---|---|---|
| KR | 10-2014-0043522 A | 4/2014 |
| KR | 10-2014-0088578 | 7/2014 |
| KR | 10-1693631 | 1/2017 |
| WO | 2017093605 | 6/2017 |
| WO | 2019023659 | 1/2019 |
| WO | 2019028159 | 2/2019 |
| WO | 2019028479 | 2/2019 |
| WO | 2019055703 | 3/2019 |
| WO | 2019079826 | 4/2019 |
| WO | 2020018431 | 1/2020 |

OTHER PUBLICATIONS

International Search Report & Written Opinion for Application No. PCT/US18/44844, Date of filing: Aug. 1, 2018, Applicant: Magical Technologies, LLC, dated Nov. 16, 2018, 13 pages.
International Search Report & Written Opinion for Application No. PCT/US18/45450, Date of filing: Aug. 6, 2018, Applicant: Magical Technologies, LLC, dated Jan. 2, 2019, 20 pages.
International Search Report & Written Opinion for Application No. PCT/US18/50952, Date of filing: Sep. 13, 2018, Applicant: Magical Technologies, LLC, dated Mar. 15, 2019, 22 pages.
International Search Report & Written Opinion for Application No, PCT/US18/56951, Date of filing: Oct. 22, 2018, Applicant: Magical Technologies, LLC, dated Feb. 22, 2019, 17 pages.
International Search Report & Written Opinion for Application No. PCT/US19/41821, Date of filing: Jul. 15, 2019. Applicant: Magical Technologies, LLC, dated Nov. 21, 2019, 9 pages.
"Fujifilm balloon" (downloaded ©https://web.archive.org/web/20150514181842/http://www.imageafter.com/image.php?image=b2ain/ehicle3002.jpg, (Year: 2015).
"Print Ad Rates", downloaded @ https://web.archive.org/web/20160319050126/https://diverseeducation.com/media-kit/print-ad-rates/,available online since Mar. 14, 2016 (Year: 2016).
Mehdi Mekni et al., 'Augmented Reality Applications, Challenges and Future Trends', Applied computer and applied computational science, Apr. 25, 2014, pp. 205-214.
IPRP for Application No. PCT/US18/44214, filed Jul. 27, 2018, Applicant: Magical Technologies, LLC, dated Jan. 28, 2020, 18 pages.
IPRP for Application No. PCT/US18/44844, filed Aug. 1, 2018, Applicant: Magical Technologies, LLC, dated Feb. 4, 2020, 11 pages.
IPRP for Application No. PCT/US18/45450, filed Aug. 6, 2018, Applicant: Magical Technologies, LLC, dated Feb. 13, 2020, 10 pages.
International Search Report & Written Opinion for Application No. PCT/US18/50952, filed Sep. 13, 2018, Applicant: Magical Technologies, LLC, dated Mar. 17, 2020, 12 pages.

\* cited by examiner

Choose a location for advertisement:  252 — (Enter Coordinates)
Zoom in to learn more Crosshair

| Layer ID 602 | Layer Type 604 | Geolocation 606 | Owner 608 | Administrator 610 | Metadata 612 |
|---|---|---|---|---|---|
| 10100010... | Public | Global/Earth | Host | Host | Policies/Permissions; Clients/Customers; Payment Structure; Virtual object (VOB) types; Promotion criteria |
| 01101011... | Public | North America, China | Third Party | Third Party | Policies/Permissions; Sponsored VOBs |
| 01110011... | Personal | | User A | User A | Policies/Permissions; Subscribers; Attributes |
| 01101111... | Personal | | User B | User B | Policies/Permissions; Subscribers; Attributes |
| ... | ... | | ... | ... | |
| 00101001... | Celebrity / Expert | Hollywood, CA; New York, NY; Paris, France; London, GB; Milan, IT | User X | User X<br>Admin Y | Policies/Permissions; Subscribers; Followers; Attributes |
| 01101100... | Group | Boston, MA | University A | Admin A | Policies/Permissions; Members; Domain name; Attributes |
| 01101100... | Sub-Group | Boston, MA | University A | Admin B | Policies/Permissions; Student Members; Domain name; Attributes |
| 01101100... | Sub-Group | Boston, MA | University A | Admin G | Policies/Permissions; Faculty Members; Donor Members; Domain name; Attributes |
| 01101110... | Group | Seattle, Washington; Washington State; Maryland; Washington DC | Brand X | Admin C<br>Admin D | Policies/Permissions; Members; Domain name; Attributes |
| 01011110... | Group | Cupertino, CA; California; North America; London, GB; Shenzheng, China | Company Y | Admin E | Policies/Permissions; Members; Domain name; Attributes |
| 01101111... | Sub-Group | Cupertino, CA | Company Y | Admin F | Policies/Permissions; Team Members; Attributes |
| 10101110... | Sub-Group | London, GB<br>Dallas, TX | Company Y | Admin F<br>Admin G | Policies/Permissions; Customers; Attributes |
| 11000010... | Sub-Group | Cupertino, CA | Company Y | Admin G<br>Admin H | Policies/Permissions; Team Members B; Attributes |
| ... | ... | | | | |

*FIG. 6*

| Alternate (augmented) reality environment view options | View Range | View Characteristics | Available Interactions |
|---|---|---|---|
| Map View 702 | Longer range view | Use map API, depict map data | Depict location of avatars, named places, VOBs visible from a distance | Depict indications of crowds, live activity levels, or popularity in various places, numbers of VOBs<br><br>Depict identifiers of VOBs that cannot appear in dangerous places |
| Radar View 704 | View of what is in the vicinity of human user's environment or user's device | Shows what visible VOBs and avatars (for a user) are in a named place or within a certain distance from the user's device | Indicate that objects and avatars are moving or changing<br><br>Indicate 'heat' for objects that are more or less popular | Depict avatars and crowds<br><br>Certain objects can be interacted with |
| Goggles View 706 | View of what device is pointing at | Shows objects that are within a visual pointing distance from the user's device | Interaction with VOBs are enabled in goggle view<br><br>Game like interactions enabled (touching shooting) | Select VOBs are only visible in goggle view (encourage rewards and exploration of near environment in goggles view) |

| VOB Gesture options | | |
|---|---|---|
| VOB Portals (e.g. virtual doors) | AR, VR, MR<br>External app trigger<br>Alternative game trigger<br>Alternate reality trigger<br><br>Radar view<br>Map view<br>Goggle biew | |
| Slide view | Filtered View | Slide between map view and AR view |
| Object Animations | Starting State | Base Animation | Rotating<br>pulsing<br>faint flow<br>small movements/vibrations |
| | Highlighted State (e.g. transition state, intermediate state) | When user hovers over object or points/gestures towards object, or views object | Appearance of object aura<br>Noticeable transition animation (scale, hover, etc.)<br>Crate/lid box open or exposes content |
| | Trigger State (e.g. activated state) | When user selects object | Transition animation<br>Object opens, expands, activates, etc. |

FIG. 7B

| VOB Identifier | Type | VOB type | Dates | Users | Location | Number Copies | Policies / permissions | Renderings | Streams | Status | Annotations | Language | Target Audience (age groups etc) | Analytics | Grouped Objects | Payload | Data |
|---|---|---|---|---|---|---|---|---|---|---|---|---|---|---|---|---|---|
| UID | Object type | | Created | Creator | Layer(s) | Finite | Distance / proximity | Code | Log | Draft | Comments | Multilanguage | Age | Metrics about the activity of the object | Contained by (objects that contain this object) | Additional data this object carries (binary files) | Other fields of data specific to the type of object |
| Address | | | Modified | Admins | Places it is in | Infinite | Read | Art | Public events stream | Published | Likes | Single Language | Gender | Metrics parameters: users, when viewed/purchased, geolocation (where viewed/purchased) | Contains (objects this object contains) | | |
| URL/URI | | | Last interacted with | Owners | Geographic location (Place or places it is located now) | | Write | Branded content | | Deleted | Tags | Available languages | Education | Cross filter analytics with various parameters | Glued objects (objects that always move together with this object) | | |
| | | | Start date | Followers | | | Admin | | | Promoted | Keyword index | Language preference | Religion | | | | |
| | | | End date | Subscribers | | | Owner | | | | Ratings | | Geographical location | | | | |
| | | | Blackout Dates | User groups | | | Member | | | | | | | | | | |

FIG. 8

| VOB Types | Pass | Tool | Container | Actor | Content | Digital Stickers | Contact Record | Applications | Commerce Objects |
|---|---|---|---|---|---|---|---|---|---|
| | * Coupon;<br>* Gift card;<br>* Ticket;<br>* Points;<br>* Currency;<br>* Digital Currency objects;<br>Tickets; rewards; promotions; Treasures; Offers; Gifts; | * Key object to unlock / open another object<br>* Object to use another object<br>* Object to interact with another object<br>* Object to release another object | * Virtual object that contains other virtual objects<br>* e.g., gift box, easter egg | * Human user<br>* Brand ambassadors<br>* Celebrities<br>* Experts<br>* Simulated users / Agent (e.g., non player character (NPC)) | * Note<br>* Webpage<br>* Video<br>* Music<br>* Classified Ad (wanted, offered)<br>* Digital Graffiti<br>* Styled Text<br>* Spray paint<br>* Digital Skywriting<br>* Writing on walls, floors, ceiling or in the air | * Memes<br>* Slogans<br>* Logos<br>* Symbols<br>* Emojis | * Business card | * Poll<br>* Survey<br>* Guest book<br>* Game (e.g., puzzle, shooter, arcade, strategy game, quest) | * Sponsored objects;<br>* Commerce objects;<br>* Classified ad objects; |

| VOB Types | Vanity Objects | Utility objects | Avatar | Places |
|---|---|---|---|---|
| | * Social sharing;<br>* augmented self;<br>* photo objects;<br>* image objects;<br>* video objects;<br>* Wall objects;<br>* GIF objects;<br>* Emoticon objects;<br>* Pictogram objects;<br>* Sticker objects; | * Message objects;<br>* Text objects;<br>* Video Conference objects;<br>* Audio Conference Objects<br>* Search/ discovery objects<br>* Document objects | * Human user avatars<br>* Profile Halos<br>* NPC avatars | * Towns<br>* Cities<br>* Countries<br>* Arbitrary physical boundaries<br>* Lake, ocean, river, stream<br>* Tourist destinations<br>* Planets<br>* Universe |

*FIG. 9*

SYSTEMS, METHODS AND APPARATUSES OF SEAMLESS INTEGRATION OF AUGMENTED, ALTERNATE, VIRTUAL, AND/OR MIXED REALITIES WITH PHYSICAL REALITIES FOR ENHANCEMENT OF WEB, MOBILE AND/OR OTHER DIGITAL EXPERIENCES

CLAIM OF PRIORITY

This application claims the benefit of U.S. Provisional Application No. 62/537,984, filed Jul. 28, 2017 and entitled "Systems and Methods of an Augmented Reality and Virtual Reality Platform for Mobile Applications, Mobile Browsers, Web Browsers and/or Content," the contents of which are incorporated by reference in their entirety.

CROSS-REFERENCE TO RELATED APPLICATIONS

This application is related to PCT Application No. PCT/US18/44214, filed on Jul. 27, 2018 and entitled "Systems and Methods of an Augmented Reality and Virtual Reality Platform for Mobile Applications, Mobile Browsers, Web Browsers and/or Content," the contents of which are incorporated by reference in their entirety.

This application is related to U.S. application Ser. No. 16/048,195, also filed on Jul. 28, 2018 and entitled "Systems, Methods and Apparatuses to Facilitate Physical and Non-Physical Interaction/Action/Reactions Between Alternate Realities," the contents of which are incorporated by reference in their entirety.

This application is related to U.S. application Ser. No. 16/048,199, also filed on Jul. 28, 2018 and entitled "Systems, Methods And Apparatuses Of Multidimensional Mapping Of Universal Locations Or Location Ranges For Alternate Or Augmented Digital Experiences," the contents of which are incorporated by reference in their entirety.

This application is related to U.S. application Ser. No. 16/048,205, also filed on Jul. 28, 2018 and entitled "Systems, Methods And Apparatuses To Create Real World Value And Demand For Virtual Spaces Via An Alternate Reality Environment," the contents of which are incorporated by reference in their entirety.

TECHNICAL FIELD

The disclosed technology relates generally to alternate reality, augmented reality, mixed reality or virtual reality.

BACKGROUND

The advent of the World Wide Web and its proliferation in the 90's transformed the way humans conduct business, live lives, consume/communicate information and interact with or relate to others. A new wave of technology is on the cusp of the horizon to revolutionize our already digitally immersed lives.

BRIEF DESCRIPTION OF THE DRAWINGS

FIG. 6 depicts a table illustrating examples of virtual world layer (namespace, virtual world component) attributes and metadata, in accordance with embodiments of the present disclosure.

FIG. 7A depicts a table illustrating examples of view options and view characteristics in an alternate reality environment, in accordance with embodiments of the present disclosure.

FIG. 7B depicts a table illustrating examples of gesture options, view options and progressions of virtual objects (VOBs) through various states, in accordance with embodiments of the present disclosure.

FIG. 8 depicts a table illustrating examples of metadata or data fields associated with virtual objects (VOBs), in accordance with embodiments of the present disclosure.

FIG. 9 depicts a table illustrating examples of virtual object (VOB) types, in accordance with embodiments of the present disclosure.

DETAILED DESCRIPTION

Figure 1:
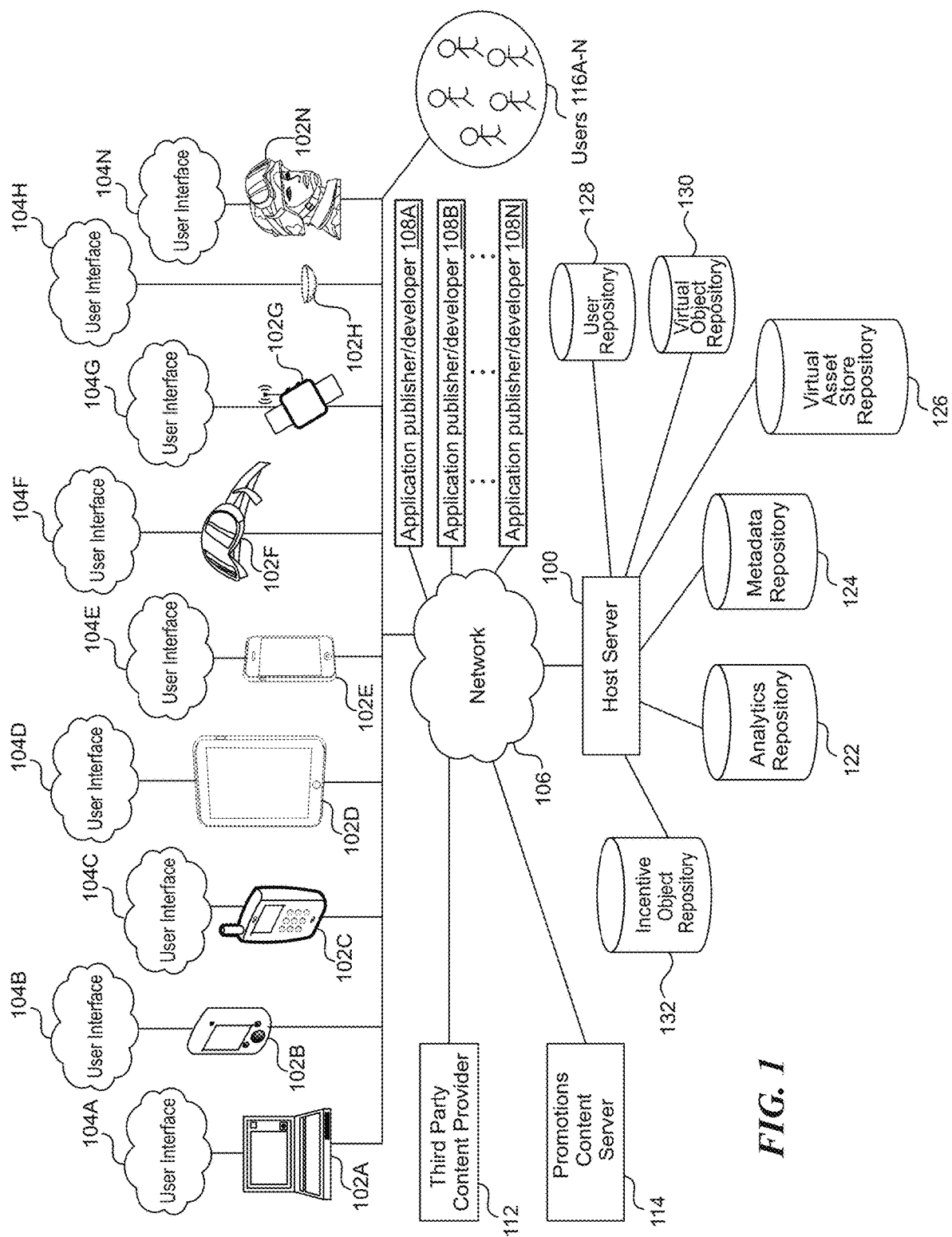
FIG. 1 illustrates an example block diagram of a host server able to seamlessly integrate mixed realities with physical reality for enhancement of web, mobile or other digital experiences over a network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems, methods and apparatuses of seamless integration of augmented, alternate, virtual, and/or mixed realities with physical realities for enhancement of web, mobile and/or other digital experiences. Embodiments of the present disclosure further include systems, methods and apparatuses to facilitate physical and non-physical interaction/action/reactions between alternate realities. Embodiments of the present disclosure also systems, methods and apparatuses of multi-dimensional mapping of universal locations or location ranges for alternate or augmented digital experiences. Yet further embodiments of the present disclosure include systems, methods and apparatuses to create real world value and demand for virtual spaces via an alternate reality environment.

The disclosed platform enables and facilitates authoring, discovering, and/or interacting with virtual objects (VOBs). One example embodiment includes a system and a platform that can facilitate human interaction or engagement with virtual objects (hereinafter, 'VOB,' or 'VOBs') in a digital realm (e.g., an augmented reality environment (AR), an alternate reality environment (AR), a mixed reality environment (MR) or a virtual reality environment (VR)). The human interactions or engagements with VOBs in or via the disclosed environment can be integrated with and bring utility to everyday lives through integration, enhancement or optimization of our digital activities such as web browsing, digital (online, or mobile shopping) shopping, socializing (e g social networking, sharing of digital content, maintaining photos, videos, other multimedia content), digital communications (e.g., messaging, emails, SMS, mobile communication channels, etc.), business activities (e.g., document management, document procession), business processes (e.g., IT, HR, security, etc.), transportation, travel, etc.

The disclosed innovation provides another dimension to digital activities through integration with the real world environment and real world contexts to enhance utility, usability, relevancy, entertainment and/or vanity value through optimized contextual, social, spatial, temporal awareness and relevancy. In general, the virtual objects depicted via the disclosed system and platform. can be contextually (e.g., temporally, spatially, socially, user-specific, etc.) relevant and/or contextually aware. Specifically, the virtual objects can have attributes that are associated with or relevant to real world places, real world events, humans, real world entities, real world things, real world objects, real world concepts and/or times of the physical world, and thus its deployment as an augmentation of a digital experience provides additional real life utility.

Note that in some instances, VOBs can be geographically, spatially and/or socially relevant and/or further possess real life utility. In accordance with embodiments of the present disclosure, VOBs can be or appear to be random in appearance or representation with little to no real world relation and have little to marginal utility in the real world. It is possible that the same VOB can appear random or of little use to one human user while being relevant in one or more ways to another user in the AR environment or platform.

The disclosed platform enables users to interact with VOBs and deployed environments using any device (e.g., devices 102A-N in the example of FIG. 1), including by way of example, computers, PDAs, phones, mobile phones, tablets, head mounted devices, goggles, smart watches, monocles, smart lens, smart watches and other smart apparel (e.g., smart shoes, smart clothing), and any other smart devices.

In one embodiment, the disclosed platform is analogous to, or operates in conjunction with the Web for the physical world. The host server (e.g., host server 100 as depicted in the example of FIG. 1) can provide a browser, a hosted server, and a search engine, for this new Web.

Embodiments of the disclosed platform enables content (e.g., VOBs, third party applications, AR-enabled applications, or other objects) to be created and placed into layers (e.g., components of the virtual world, namespaces, virtual world components, digital namespaces, etc.) that overlay geographic locations by anyone, and focused around a layer that has the highest number of audience (e.g., a public layer). The public layer can in some instances, be the main discovery mechanism and source for advertising venue for monetizing the disclosed platform.

In one embodiment, the disclosed platform includes a virtual world that exists in another dimension superimposed on the physical world. Users can perceive, observe, access, engage with or otherwise interact with this virtual world via a user interface (e.g., user interface 104A-N as depicted in the example of FIG. 1) of client application (e.g., accessed via using a user device, such as devices 102A-N as illustrated in the example of FIG. 1).

One embodiment of the present disclosure includes a consumer or client application component (e.g., as deployed on user devices, such as user devices 102A-N as depicted in the example of FIG. 1) which is able to provide geo-contextual awareness to human users of the AR environment and platform. The client application can sense, detect or recognize virtual objects and/or other human users, actors, non-player characters or any other human or computer participants that are within range of their physical location, and can enable the users to observe, view, act, interact, react with respect to the VOBs.

Furthermore, embodiments of the present disclosure also include an enterprise application (which can be desktop, mobile or browser based application). In this case, retailers, advertisers, merchants or third-party e-commerce platforms/sites/providers can access the disclosed platform through the enterprise application (e.g., an example user interface is illustrated in the example screenshot of FIG. 2K) which enables management of paid advertising campaigns deployed via the platform.

Users (e.g., users 116A-N of FIG. 1) can access the client application which connects to the host platform (e.g., as hosted by the host server 100 as depicted in the example of FIG. 1). The client application enables users (e.g., users 116A-N of FIG. 1) to sense and interact with virtual objects ("VOBs") and other users ("Users"), actors, non-player characters, players, or other participants of the platform. The VOBs can be marked or tagged (by QR code, other bar codes, or image markers) for detection by the client application.

One example of an AR environment deployed by the host (e.g., the host server 100 as depicted in the example of FIG. 1) enables users to interact with virtual objects (VOBs) or applications related to shopping and retail in the physical world or online/e-commerce or mobile commerce. Retailers, merchants, commerce/e-commerce platforms, classified ad systems, and other advertisers will be able to pay to promote virtual objects representing coupons and gift cards in physical locations near or within their stores. Retailers can benefit because the disclosed platform provides a new way to get people into physical stores. For example, this can be a way to offer VOBs that are or function as coupons and gift cards that are available or valid at certain locations and times.

Additional environments that the platform can deploy, facilitate, or augment can include for example AR-enabled games, collaboration, public information, education, tourism, travel, dining, entertainment etc.

Figure 19:
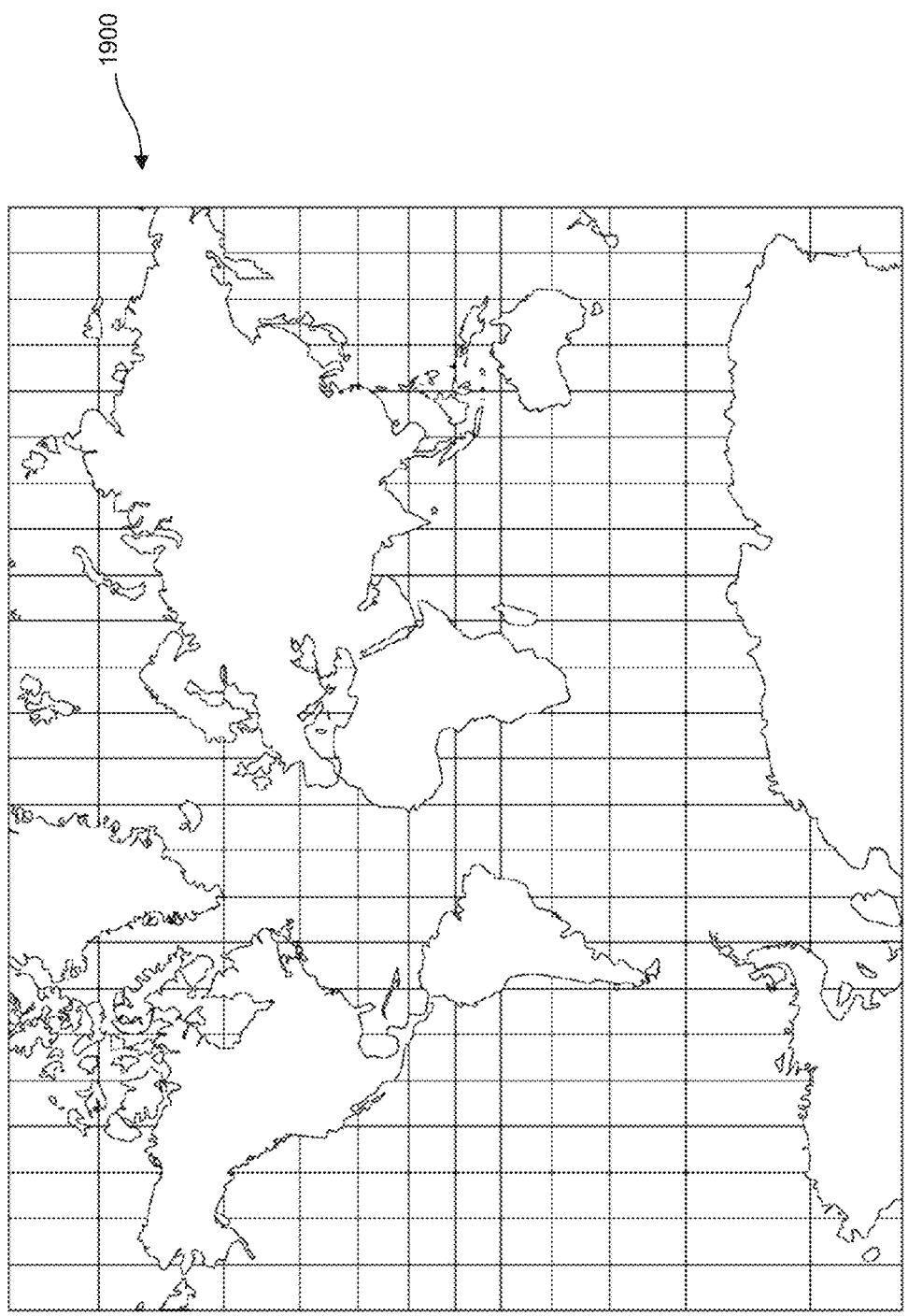
FIG. 19 depicts an example grid of physical locations in the real world with which virtual layer components can be associated, in accordance with embodiments of the present disclosure.
Figure 20A:
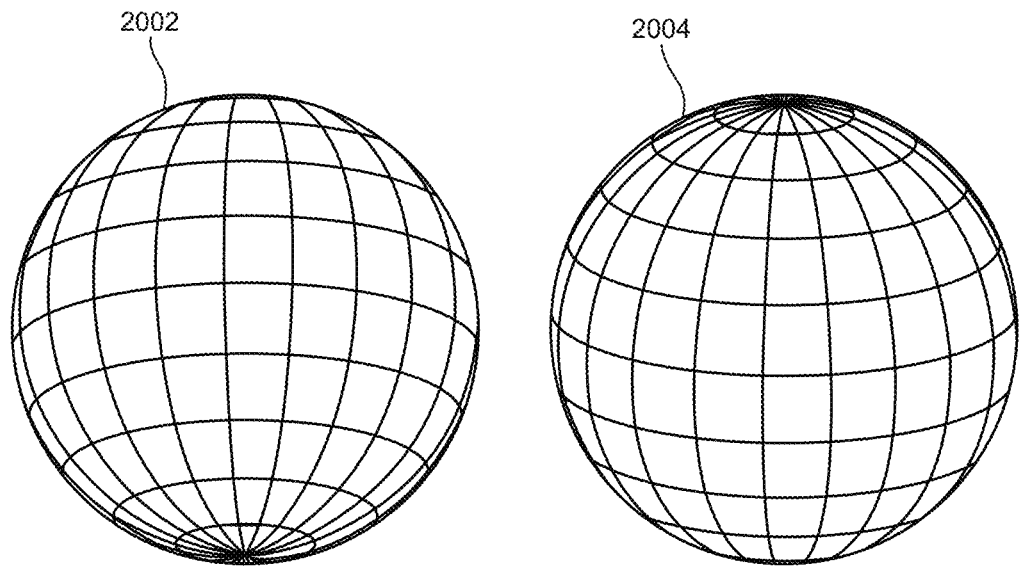
FIG. 20A depicts an exploded view of example grid configurations for physical locations on earth with which virtual layer components can be associated, in accordance with embodiments of the present disclosure.
Figure 20B:
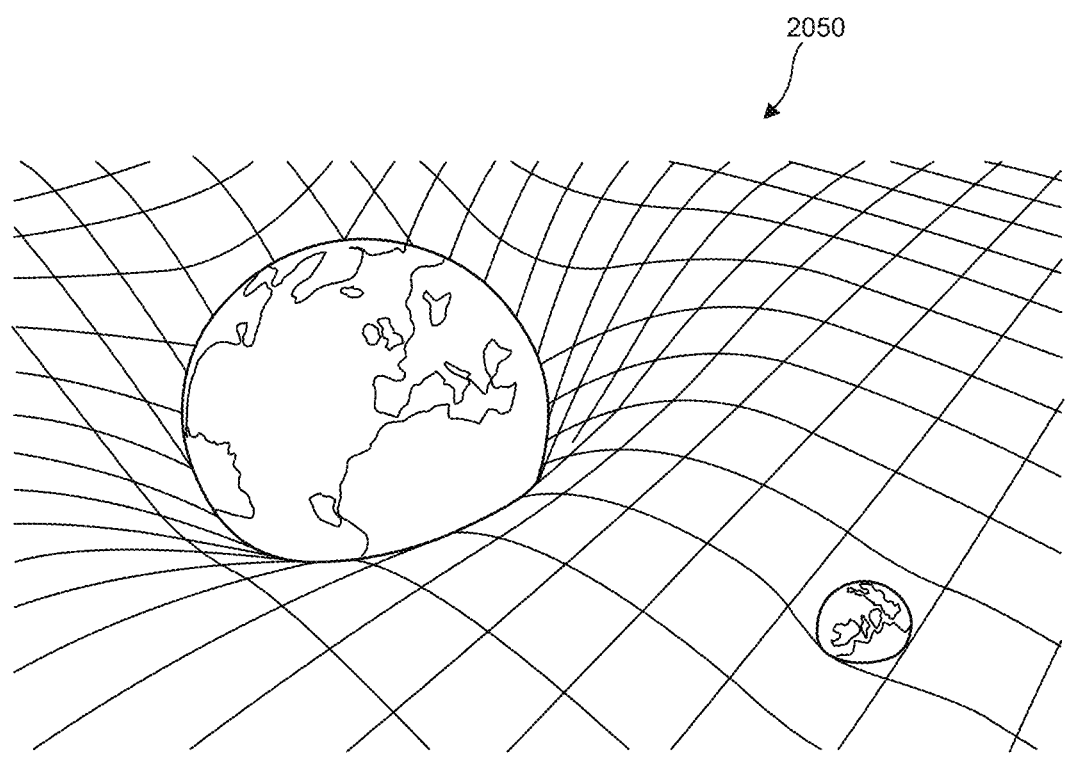
FIG. 20B depicts an exploded view of an example grid configurations for real locations in the universe with which virtual layer components can be associated, in accordance with embodiments of the present disclosure.

The seamless integration of real, augmented and virtual for physical places/locations in the universe is a differentiator (e.g., example grids used for the earth and universe are illustrated in FIG. 19, FIG. 20A-FIG. 20B). In addition to augmenting the world, the disclosed system also enables an open number of additional dimensions to be layered over it and, some of which exist in different spectra or astral planes. The digital dimensions can include virtual worlds that can appear different from the physical world. Note that any point in the physical world can index to layers of virtual worlds or virtual world components at that point. The platform can enable layers that allow physical and/or non-physical interactions.

FIG. 1 illustrates an example block diagram of a host server 100 able to seamlessly integrate mixed realities with physical reality for enhancement of web, mobile or other digital experiences over a network 106.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102A-N can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, a wearable device, a head mounted device, a smart watch, a goggle, a smart glasses, a smart contact lens, and/or any other portable, mobile, hand held devices, etc. The input mechanism on client devices 102A-N can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), eye tracking, eye detection, pupil tracking/detection, or a combination of the above.

The client devices 102A-N, application publisher/developer 108A-N, its respective networks of users 116A-N, a third-party content provider 112, and/or promotional content server 114, can be coupled to the network 106 and/or multiple networks. In some embodiments, the devices 102A-N and host server 100 may be directly connected to one another. The alternate, augmented provided or developed by the application publisher/developer 108A-N can include any digital, online, web-based and/or mobile based environments including enterprise applications, entertainment platforms, gaming platforms, social networking platforms, e-commerce, exchanges, search platforms, browsing, discovery, messaging, chatting, and/or any other types of activities (e.g., network-enabled activities).

In one embodiment, the host server 100 is operable to integrate (seamlessly) augmented, alternate, virtual and/or mixed realities with physical reality to enhance or optimize web, mobile or other digital experiences, alone or in combination with the application publisher/developers 108A-N.

As discussed further, the host server can 100 provide all applications discussed herein or the host server 100 can provide augmentation of any digital, online, web-based and/or mobile based environments developed or published by application publisher/developer 108A-N to virtualize or for integration with a virtual, augmented, alternate or mixed reality environment which can have temporal, contextual or geographical relevance. Similarly, the host server 100 can also alone or in combination with application publisher/developer 108A-N facilitate physical or non-physical interaction/action/reaction amongst different realities, for instance, through search, discovering, browsing, or otherwise navigating within a reality or across realities (e.g., any of AR, VR, MR, etc.).

In a further embodiment, the host server 100 is operable to facilitate multidimensional mapping of universal locations or location ranges for augmented digital experiences. Through such multidimensional mapping, the host server 100 can create real-world value or demand for virtual spaces via an alternate/augmented reality environment.

In one embodiment, the disclosed framework includes systems and processes for enhancing the web and its features with augmented reality. Example components of the framework can include:

Browser (mobile browser, mobile app, web browser, etc.).
Servers and/or namespaces. The host (e.g., host server 100 of FIG. 1 or host server 300 of FIG. 3A-B) can host the servers and/or the namespaces. The content (e.g., VOBs, any other digital object), applications running on, with, or integrated with the disclosed platform can be created by others (e.g., third party content provider 112, promotions content server 114 and/or application publisher/developers 108A-N, etc.).

Advertising system (e.g., the host server 100 can run an advertisement/promotions engine through the platform and any or all deployed augmented reality, alternate reality, mixed reality or virtual reality environments).

Commerce (e.g., the host server 100 can facilitate transactions in the network 106 deployed via any or all deployed augmented reality, alternate reality, mixed reality or virtual reality environments and receive a cut. A digital token or digital currency (e.g., crypto currency) specific to the platform hosted by the host server 100 can also be provided or made available to users.)

Search and discovery (e.g., the host server 100 can facilitate search, discovery or search in the network 106 deployed via any or all deployed augmented reality, alternate reality, mixed reality or virtual reality environments).

Identities and relationships (e.g., the host server 100 can facilitate social activities, track identities, manage, monitor, track and record activities and relationships between users 116A).

Figure 3A:
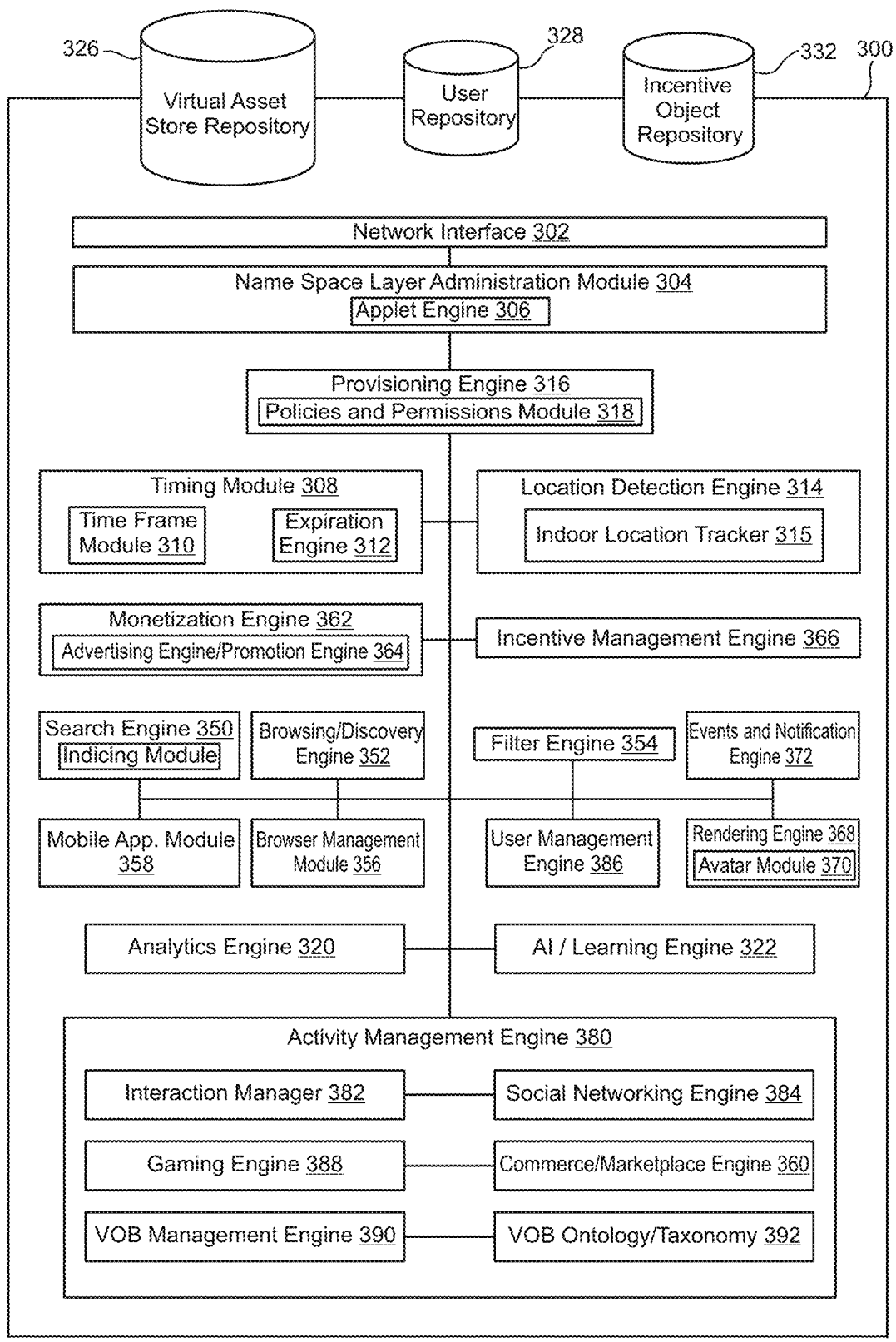
FIG. 3A depicts an example functional block diagram of a host server that integrates mixed realities with physical reality for enhancement of web, mobile or other digital experiences, in accordance with embodiments of the present disclosure.
Figure 3B:
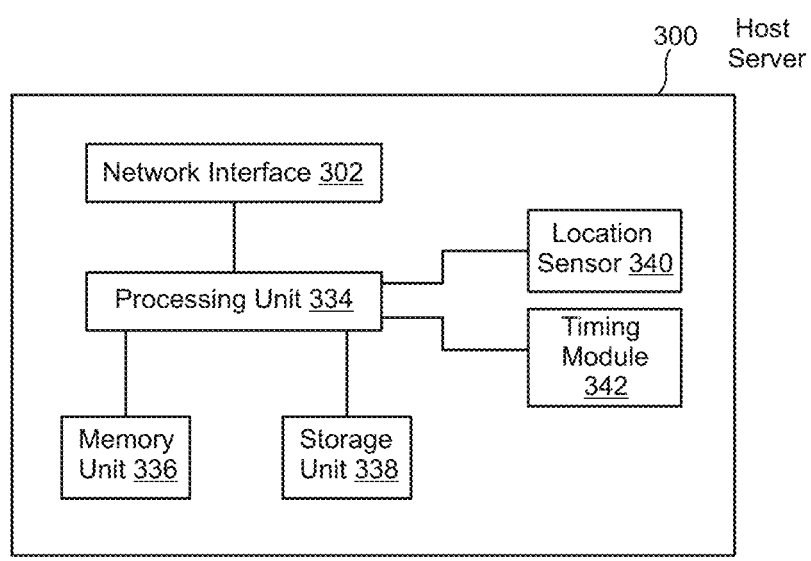
FIG. 3B depicts an example block diagram illustrating the components of the host server that seamlessly integrates mixed realities with physical reality for enhancement of web, mobile or other digital experiences, in accordance with embodiments of the present disclosure

Functions and techniques performed by the host server 100 and the components therein are described in detail with further references to the examples of FIG. 3A-3B.

In general, network 106, over which the client devices 102A-N, the host server 100, and/or various application publisher/provider 108A-N, content server/provider 112, and/or promotional content server 114 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 100 and may appear as one or more networks to the serviced systems and devices. In one embodiment, communications to and from the client devices 102A-N can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 5G, IMT-Advanced, pre-4G, 3G LIE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a virtual object repository 130, a virtual asset store repository 126, a metadata repository 124, an analytics repository 122 and/or an incentive object repository 132. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstmments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to generate, create and/or provide data to be stored in the user repository 128, the virtual object repository 130, the virtual asset store repository 126, the metadata repository 124, the analytics repository 122 and/or the incentive object repository 132. The user repository 128 and/or analytics repository 120 can store user information, user profile information, demographics information, analytics, statistics regarding human users, user interaction, brands advertisers, virtual object (or 'VOBs'), access of VOBs, usage statistics of VOBs, return on investment of VOBs, etc.

The virtual object repository 128 can store virtual objects and any or all copies of virtual objects. The metadata repository 124 is able to store virtual object metadata of data fields, identification of VOB classes, virtual object ontologies, virtual object taxonomies, etc. One embodiment further includes the incentive object repository 132 which can store information or metadata about incentive objects and where the virtual asset store repository 126 can store VOBs or other objects/content which can be sold to or between human users in or via the disclosed platform.

Figure 2A:
FIG. 2A depicts an example user interface to register for or sign in to a platform for accessing an alternate reality environment (e.g., also referred to as, augmented reality environment (AR environment/AR world), mixed reality environment (MR environment)), in accordance with embodiments of the present disclosure.

FIG. 2A depicts an example user interface to register for or sign in to a platform for accessing an alternate reality environment (e.g., also referred to as, augmented reality environment (AR environment/AR world), mixed reality environment (MR environment)), in accordance with embodiments of the present disclosure.

Figure 2B:
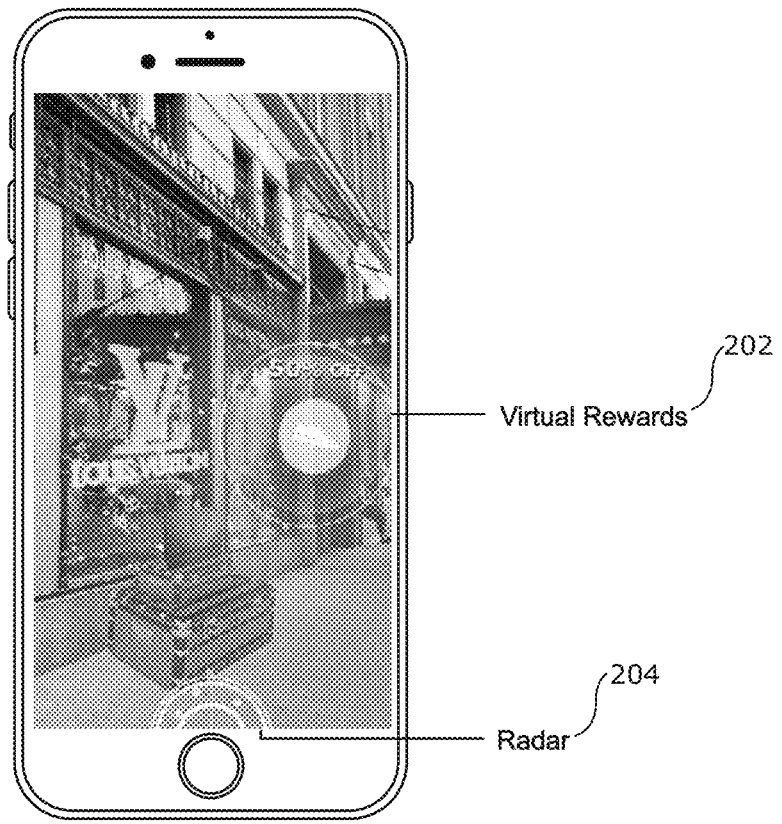
FIG. 2B depicts an example user interface of an alternate reality environment associated with a physical location having multiple virtual objects to be interacted with by human users, in accordance with embodiments of the present disclosure.

FIG. 2B depicts an example user interface of an alternate reality environment associated with a physical location having multiple virtual objects 202 to be interacted with by human users, in accordance with embodiments of the present disclosure.

In general, the user interface depicts the alternate reality environment which includes a scene of the physical location (e.g., a photorealistic rendering, image or video). For example, the user interface depicts an alternate reality environment including a scene of an actual Louis Vuitton store. The multiple virtual objects in the alternate reality environment can include incentive objects such as the virtual reward object 202. For example, the virtual rewards 202 includes a 50% off discount and may be a location-based brand or merchant sponsored reward made available, visible or accessible to users when they are in the vicinity of the physical location (e.g., the Louis Vuitton store). One embodiment of the user interface for the alternate reality environment includes a radar 204 depicted graphically. The radar can indicate object proximity to a human user in a set of predetermined or configurable distances (e.g., in-reach, near, far, or actual distances 1 ft, 1 meter, 3, meter, 15 meters, two blocks away, etc.).

Figure 2C:
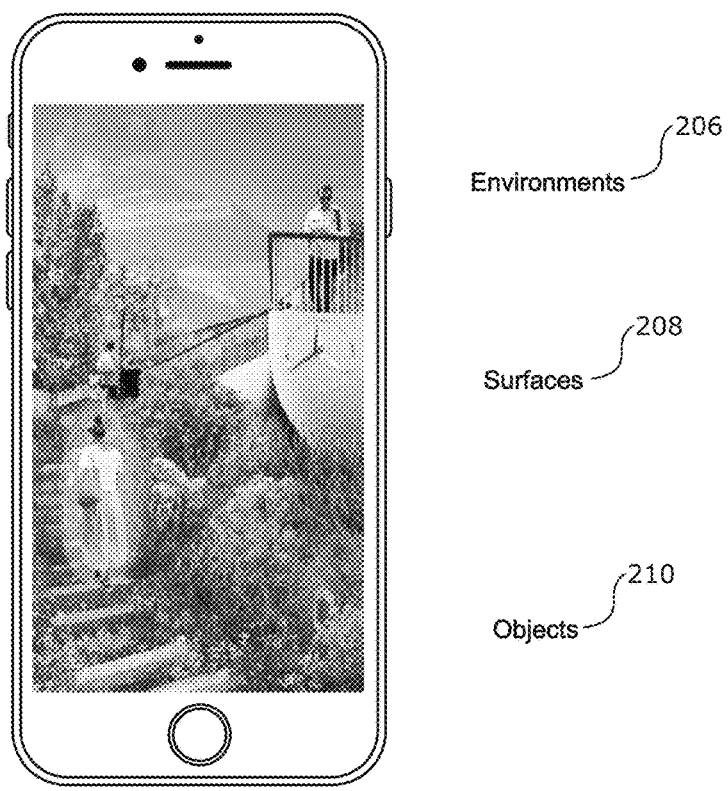
FIG. 2C depicts an example user interface of an alternate reality environment (AR environment or MR environment) associated with a physical location having virtual objects that are advertisement objects, in accordance with embodiments of the present disclosure.

FIG. 2C depicts an example user interface of an alternate reality environment (AR environment or MR environment) associated with a physical location having virtual objects that are advertisement objects, in accordance with embodiments of the present disclosure.

Virtual objects that are advertisements can be interactive and/or rendered in 3D in the alternate reality environment. The alternate reality environment 206 which includes ads can also be customizable to optimize brand visibility. In addition, surfaces 208 in the alternate reality environment, such as walls, windows, doors and floors can function as digital billboards (e.g., 2d or 3d interactive billboards) in the alternate reality environment. Virtual objects 210 can span in the AR environment thus enabling gameplay (e.g., role playing game style game play).

Figure 2D:
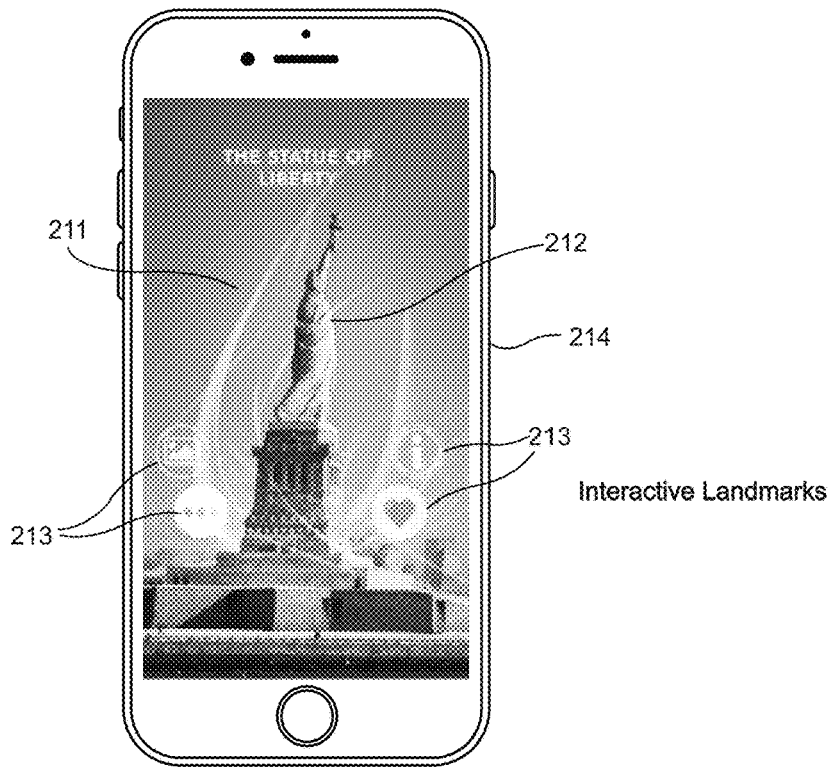
FIG. 2D depicts an example user interface of an alternate reality environment associated with a virtual object (VOB) depicting an interactive landmark, in accordance with embodiments of the present disclosure.

FIG. 2D depicts an example user interface of an alternate reality environment associated with a virtual object (VOB) 211 depicting an interactive landmark, in accordance with embodiments of the present disclosure.

The virtual object (VOB) 211 that includes the interactive landmark 212 in the AR environment can include a representation having a scene or image of the landmark 212 (e.g., the statue of liberty) which can be a photorealistic production or reproduction of an appearance of the landmark 212. The VOB 211 having the representation of the landmark 212 can also include integrated social features 213. The social features 213 are depicted or presented in the user interface around the scene of the landmark 212 and can be interacted with by the user using the user interface. Using the integrated social features 213, the user can, for example, view location information, history of the landmark, view visitors or their comments, photographs, and/or leave messages. Additional social features not illustrated herein can also be integrated.

Figure 2E:
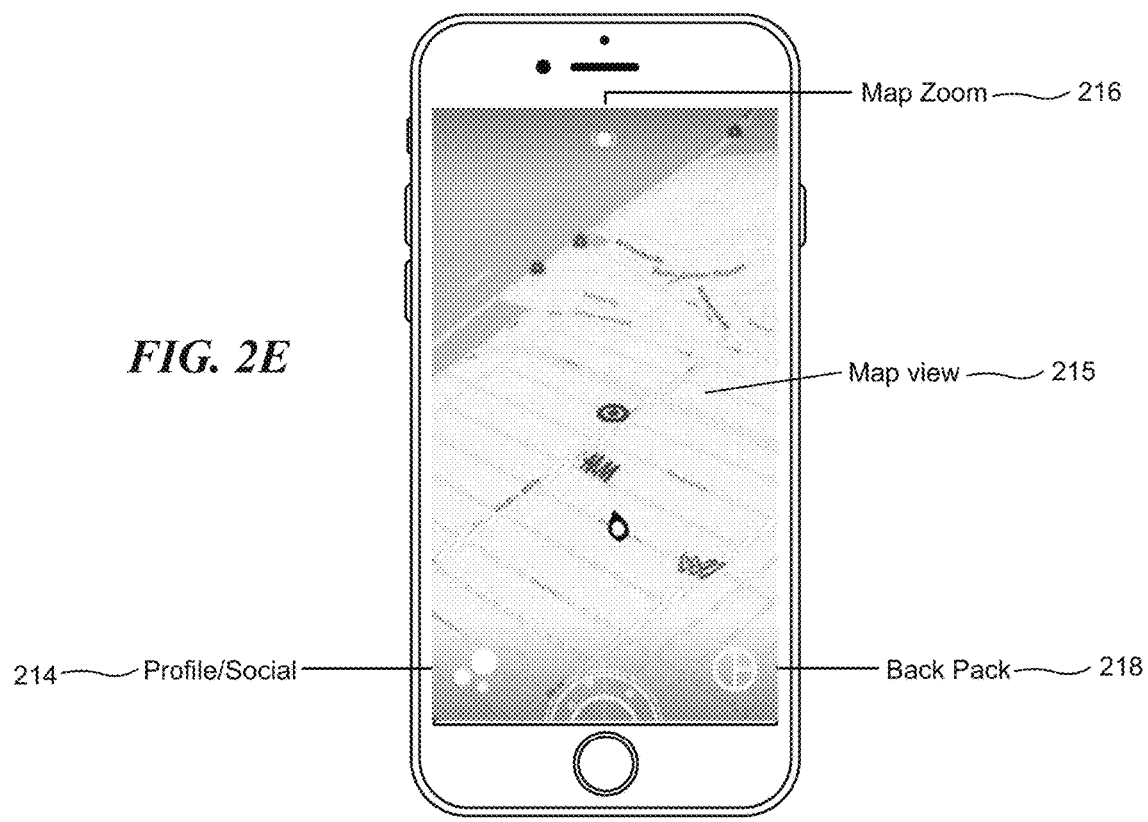
FIG. 2E depicts an example user interface showing a map view of an alternate reality environment, in accordance with embodiments of the present disclosure.

FIG. 2E depicts an example user interface showing a map view 215 of an alternate reality environment, in accordance with embodiments of the present disclosure.

One embodiment of the map view 215 can include user interface elements including, a profile/social element 214, a map zoom element 216 and/or a backpack element 218. The profile/social element 214 can be used to by the user to access, view or manage their own profile, level, experience points, friends, and/or followers. The map zoom element 216 can depict, identify or specify distances for the user to locate VOBs, nearby users, places, things, other actors, and/or roads/paths. The backpack element 218 can store or hold the user's digital wallet, VOBs collected or captured, and/or trophies (e.g., rewards received when the user completes a task or accomplishes something, etc.).

Figure 2F:
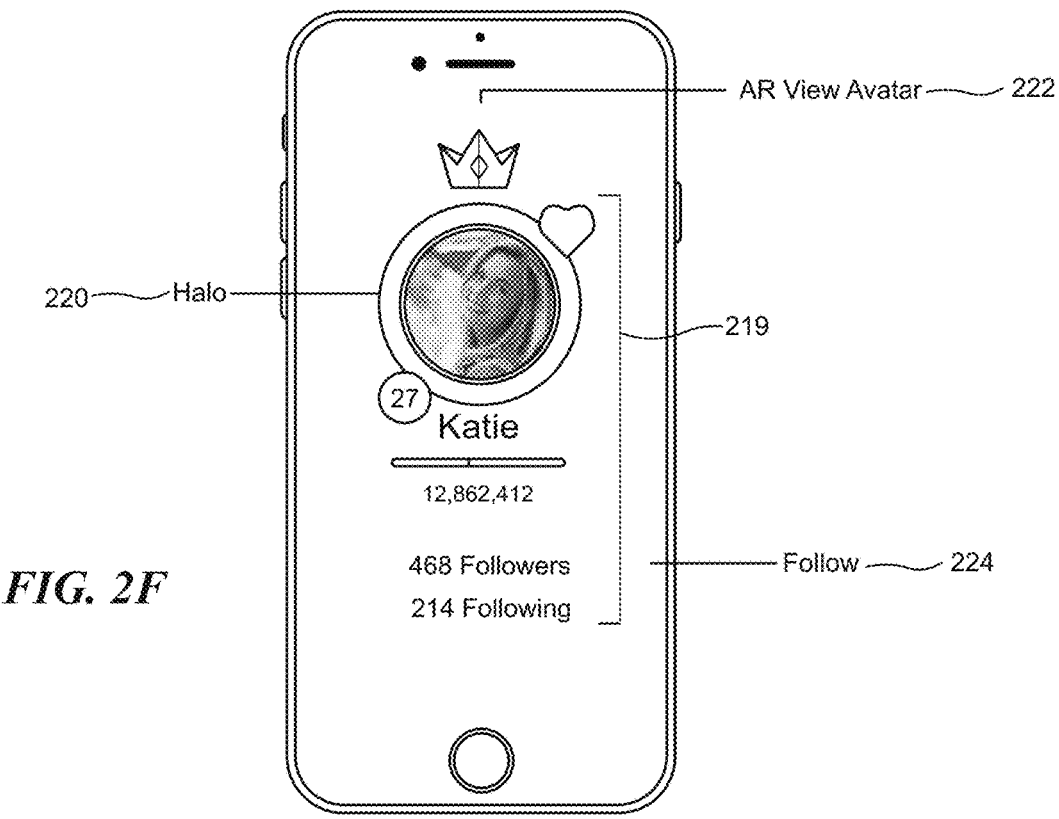
FIG. 2F depicts an example user interface showing a view of a user profile in an alternate reality environment and various user profile elements, in accordance with embodiments of the present disclosure.

FIG. 2F depicts an example user interface showing a view of a user profile 219 in an alternate reality environment and various user profile elements, in accordance with embodiments of the present disclosure.

The user profile elements can include, for example, a halo ring 220, an AR view avatar 222 and/or a follow indicia 224. The halo ring 220 can surround an image, photo or video of the user in 2D or 3D. The halo ring 220 can also include basic user profile information such as user name, nickname, user level, user age, status, etc. The AR view avatar 222 is a VOB which floats above the view of the user's head and can be depicted in a mode when the AR environment is depicted or in operation (e.g., AR mode). Other players can see the AR view avatar 222 and interact with this VOB. Note that in general, AR avatars can be purchased, awarded, edited, created and/or gifted. The follow indicia 224 depicts the number of followers and the number of users that the user is following. Using the follow icon 224, the user can view and interact with their followers and the users followed by the user in the depicted profile. Additional or less user profile elements, graphics or animations can be used in the AR environment.

Figure 2G:
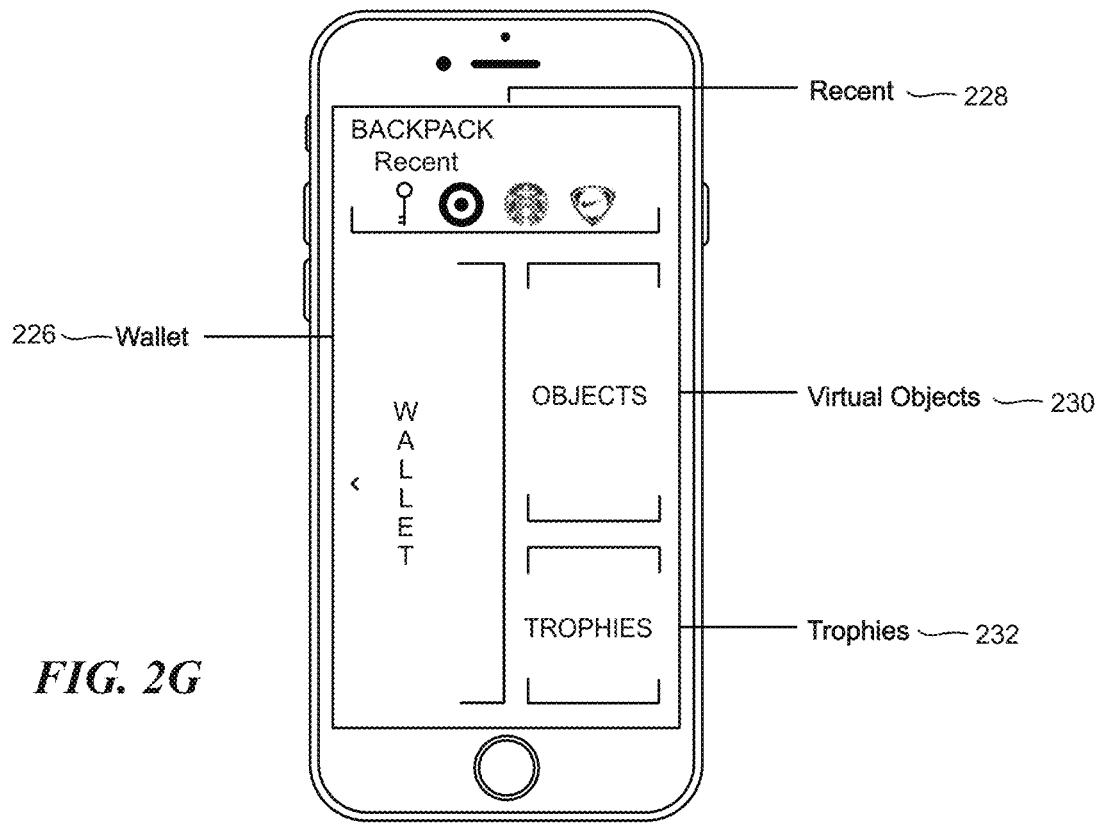
FIG. 2G depicts an example user interface showing items collected by a user in an alternate reality environment in relation to the natural environment in a physical location, in accordance with embodiments of the present disclosure.

FIG. 2G depicts an example user interface showing items collected by a user in an alternate reality environment in relation to the natural environment in a physical location, in accordance with embodiments of the present disclosure.

For example, the wallet 226 section can be used to store, access, or spend collected virtual objects that are incentive objects, including, for instance, coupons, gift cards, tokens, rewards, points or currency. Such incentive objects can be collected via the alternate reality environment and spent or used either in the alternate realty environment of in the real-world. The recent section 228 of the user interface depicts recent or last virtual objects collected, captured, obtained or acquired by the user. The virtual object 230 section can depict virtual tools or objects used in a game. The trophies 232 section can depict for example, in-game accomplishments collected via the AR environment.

Figure 2H:
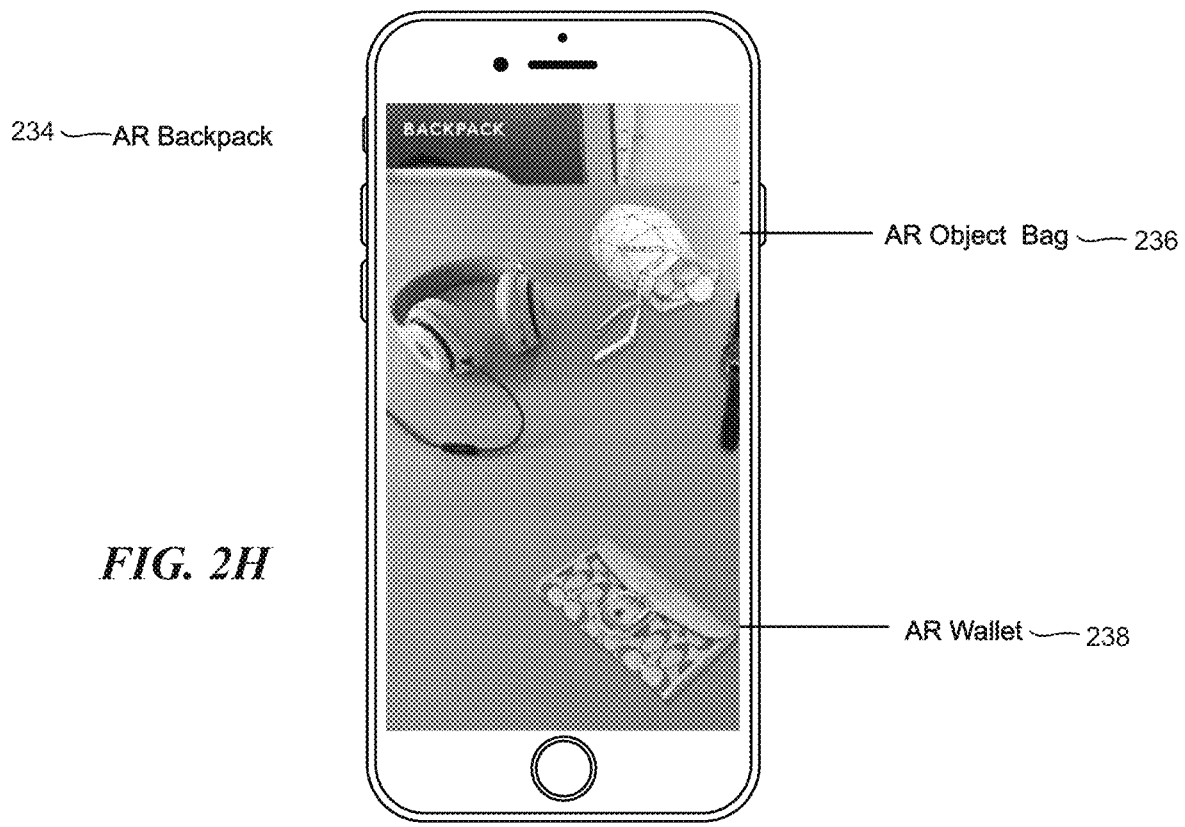
FIG. 2H depicts an example user interface showing items collected by a user in an alternate reality environment in a user's digital backpack, in accordance with embodiments of the present disclosure.

FIG. 2H depicts an example user interface showing items collected by a user in an alternate reality environment in a user's digital backpack, in accordance with embodiments of the present disclosure.

The AR backpack 234 can enable a human user to view an inventory of virtual objects (VOBs) or other digital content in the AR environment. The AR backpack 234 can further enable the human user to access their VOBs or other content, and deploy the contents into a physical location depicted in the AR environment. One embodiment further includes an AR object bag 236 which opens to an AR object inventory and enables users to interact with their objects (e.g.,VOBs or other digital content) in the AR environment. A further embodiment includes an AR wallet 238, which when accessed via the user interface to the AR environment, opens up an inventory of AR objects, which can be accessed, browsed, used or spent by the human user.

Figure 2I:
FIG. 2I depicts an example user interface showing an incentive object usable via the alternate reality environments, in accordance with embodiments of the present disclosure.

FIG. 2I depicts an example user interface showing an incentive object 240 usable via the alternate reality environments, in accordance with embodiments of the present disclosure.

The incentive object 240, can be, for example, a coupon, gift card, token or any other reward and can be stored in a virtual wallet accessible via the user interface to the AR environment. The incentive object 240 can be associated with a code 242 which ensures that the object 240 is linked to the user account and/or for authentication or verification purposes. The code 242 can be used to determine the eligibility, authenticity, validity of the incentive object 240 (e.g., a coupon for 50% discount at Target for today).

Figure 2J:
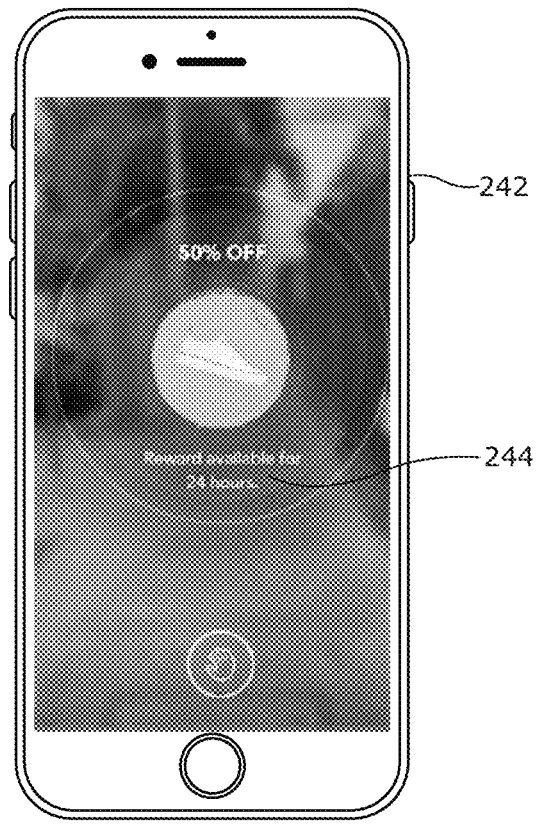
FIG. 2J depicts an example user interface showing an incentive object that has an expiration date, in accordance with embodiments of the present disclosure.

FIG. 2J depicts an example user interface 242 showing an incentive object 244 that has an expiration date, in accordance with embodiments of the present disclosure.

Certain VOBs can include an incentive object (e.g., the incentive object 244), The incentive object 244 is, in one embodiment, a targeted reward which can drive users to a brick and mortar establishment at a physical location in the real-world to access, collect, view, spend or otherwise use the incentive object 244 at or near the physical location. In some instances, the incentive object 244 can be time sensitive (e.g., the reward, incentive, discount) can be active or valid for a certain period of time, at certain times of day, and/or on certain days of the week or month.

Figure 2K:
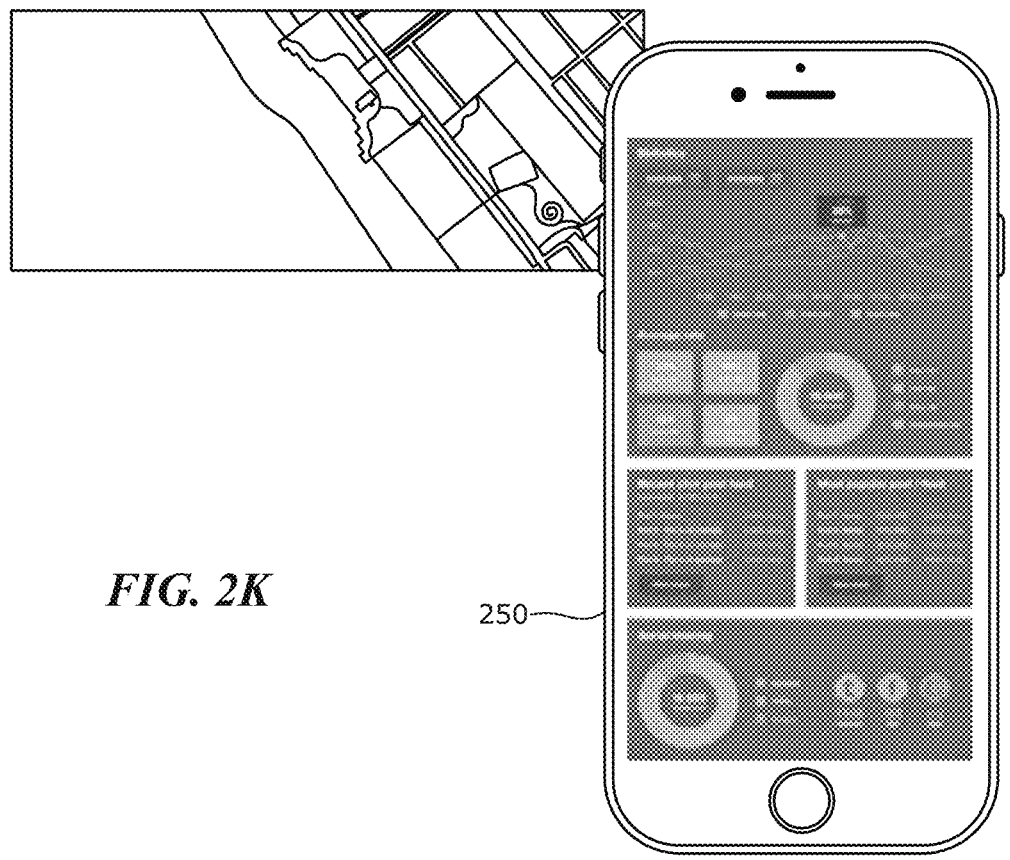
FIG. 2K depicts an example user interface showing a portal to deploy an advertisement campaign in an alternate reality environment, in accordance with embodiments of the present disclosure.

FIG. 2K depicts an example user interface showing a portal 250 to deploy an advertisement campaign in an alternate reality environment, in accordance with embodiments of the present disclosure.

The portal 250 can be part of an enterprise dashboard deployed via web portal or a mobile interface. The portal 250 can be used by a brand, advertiser, merchant, retailer or agency to create an advertising campaign in the AR environment. The portal 250 can in one embodiment, be used to choose a physical location with which to associate an advertisement. (e.g., by way of entering coordinates 252, or any other mechanism to define or identify a physical location). The dashboard 250 can also include statistics or analytics on performance or ROI of the advertising campaign. The advertising campaign can include AR features and can have 2D/3D features or interactive features accessible to human users via the AR environment.

Figure 2L:
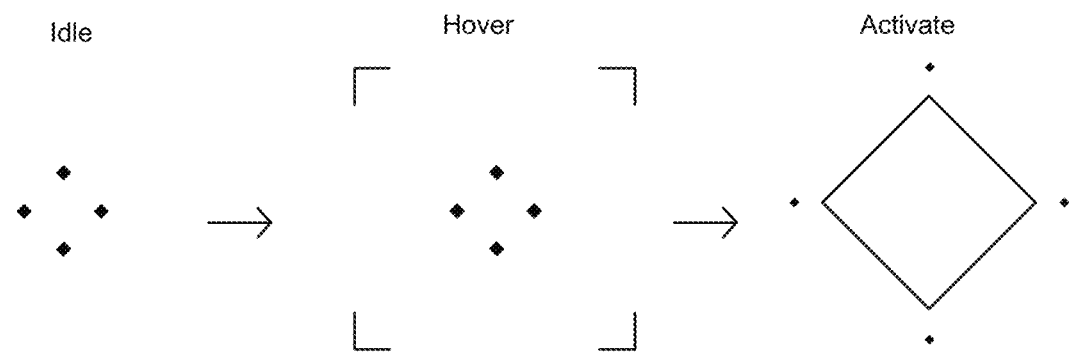
FIG. 2L depicts an example of cross hair animations when interacting with virtual objects in an alternate reality environment, in accordance with embodiments of the present disclosure. Example animation for progression of the cross hair through idle, hover and/or activated states are illustrated.

FIG. 2L depicts an example of cross hair animations when interacting with virtual objects in an alternate reality environment, in accordance with embodiments of the present disclosure. Example animation for progression of the cross hair through idle, hover and/or activated states are illustrated.

Figure 2M:
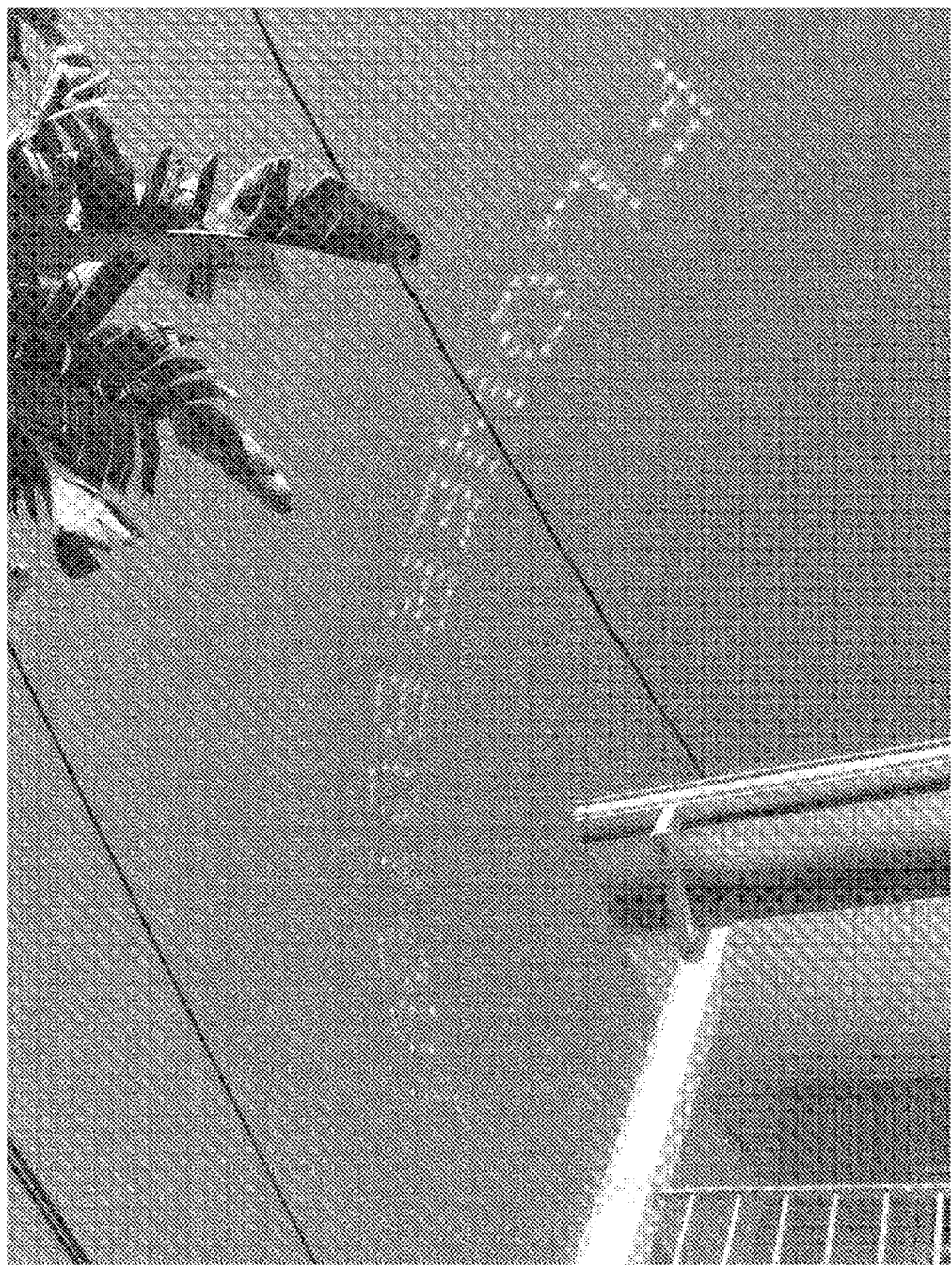
FIG. 2M-2N depict examples of digital sky writing, in accordance with embodiments of the present disclosure.
Figure 2N:
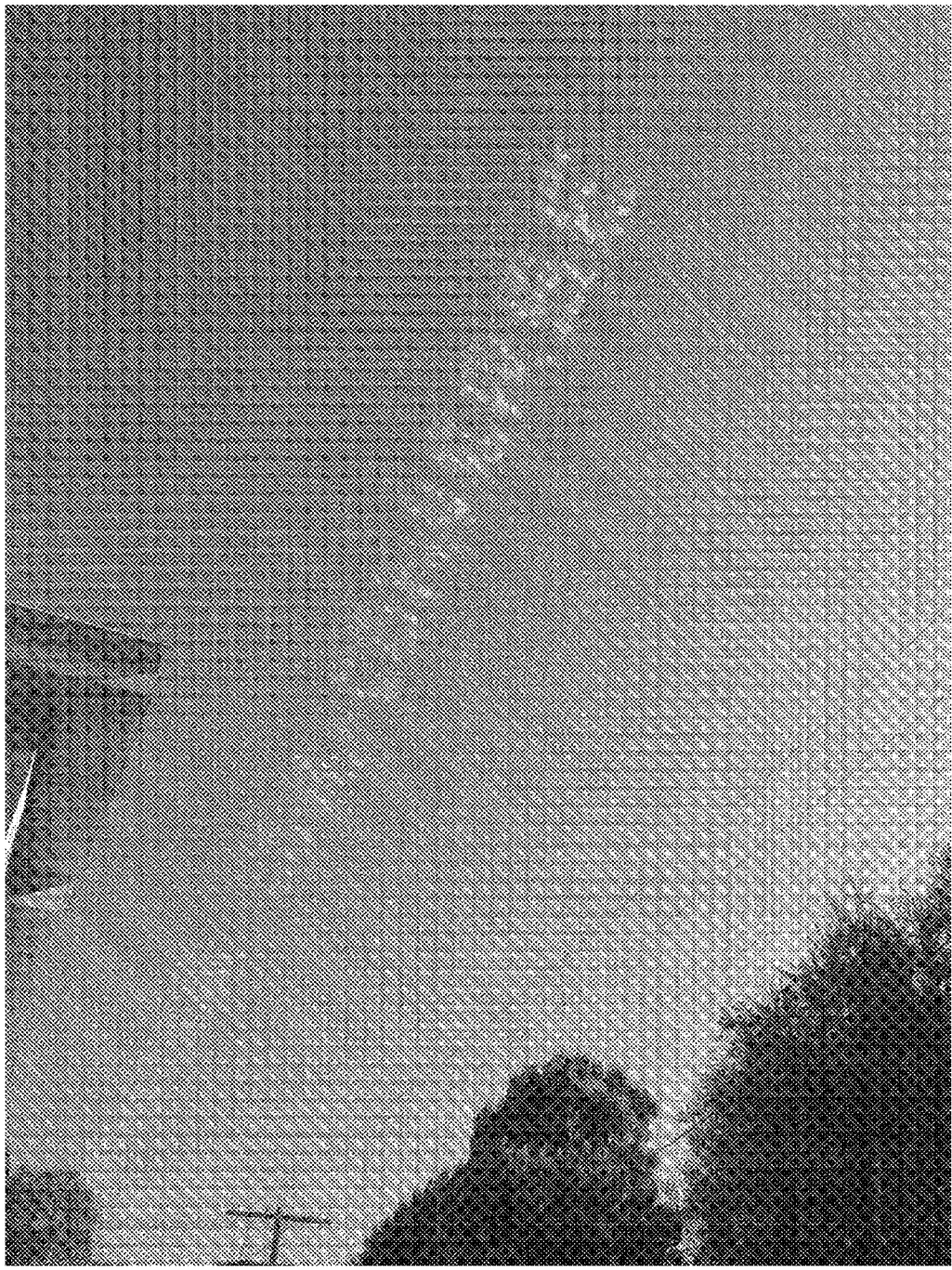

FIG. 2M-2N depict examples of digital sky writing, in accordance with embodiments of the present disclosure. One embodiment of the present disclosure includes using the AR environment to generate digital graffiti by write to the sky. The digital graffiti can include styled text, text or images that appear to have been spray painted, digital sky writing (e.g. this can be world locked), or digital writing on walls, floors, clings, trees, mountains, on a body of water, on the ocean surface, or in the air.

FIG. 3A depicts an example functional block diagram of a host server 300 that integrates mixed realities with physical reality for enhancement of web, mobile or other digital experiences, in accordance with embodiments of the present disclosure.

The host server 300 includes a network interface 302, a namespace/layer administration module 304, a provisioning engine 316, a monetization engine 362, and/or an activity management engine 380. The host server 324 is also coupled to a user repository 328, an incentive object repository 332 and/or a virtual asset store repository 326. The host server 300 can also include a variety of modules including, for example, a timing module 308, a location detection engine 314, an analytics engine 320, an AI/learning engine 322, a search engine 350, a browsing/discovery engine 352, a filter engine 354, a browser management module 356, a mobile application module 358, a commerce/marketplace engine 360, an incentive management engine 366, a rendering engine 368, and/or an events and notification engine 372. Each of the namespace/layer administration module 304, the provisioning engine 316, the monetization engine 362, and/ or the activity management engine 380 can be coupled to each other.

The host server 300 can also be coupled to or can include, a user data repository 328, an incentive object repository 332 and/or a virtual asset store repository 326. The host server 300 can further include a variety of modules including, for example, a timing module 308, a location detection engine 314, an analytics engine 320, an AI/learning engine 322, a search engine 350, a browsing/discovery engine 352, a filter engine 354, a browser management module 356, a mobile application module 358, a commerce/marketplace engine 360, an incentive management engine 366, a rendering engine 368, and/or an events and notification engine 372.

Additional or less modules can be included without deviating from the techniques discussed in this disclosure. In addition, each module in the example of FIG. 3A can include any number and combination of sub-modules, and systems, implemented with any combination of hardware and/or software modules.

The host server 300, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The network interface 302 can be a networking module that enables the host server 300 to mediate data in a network with an entity that is external to the host server 300, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, 5G, etc.), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or have its functionality distributed in part or in full. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, flash, optical storage, to name a few), but may or may not be limited to hardware.

One embodiment of the host server 300 includes the namespace/layer administration module (e.g., 'namespace administration module' or 'layer administration module') 304. The namespace/layer administration module 304 can be any combination of software agents and/or hardware modules (e.g., including processors and/or memory units) able to create, provision, allocate, administer, generate, manage, govern, digital namespaces, name spaces virtual world components, or layers associated with geographical locations or places in a real-world/real environment for use in provisioning or managing virtual objects (VOBs) in an augmented reality environment (e.g., mixed reality environment or alternate reality environment).

In one embodiment, in a layer (also referred to as a 'digital layer,' 'virtual real-estate,' 'namespace,' a 'digital namespace,' or a 'virtual world component'), as administered by the namespace module 304 in the augmented reality environment, the navigation between places is characterized by the directions in space that people can move. As an analogy, Web sites have navigation between places defined by links. Layers are further enabled to specify or define a set of navigational options from place to place (places in the digital or virtual realm), like a website does. For example, when a user is at place x (digital place, virtual place) in a layer, as administered by the namespace module 304, the user's choices are not to go in every direction but to go to certain other locations—for example, the user can go N, NE or NW from here, but not S, SE, or SW.

In one embodiment, navigation in the augmented reality environment (e.g., AR environment/AR world, MR environment/MR world, alternate realty environment, etc.) can be viewed as having 4 dimensions (4D)—3 dimensions of physical space, 1 of virtuality. 'Virtuality' can be an indicator to describe the virtualness of the AR environment at any given physical location, which can include a measure of perceptibility of virtual or synthetic objects in relation to real objects or photo-realistic objects/entities in a given scene of the AR environment. In addition, the disclosed AR environment also includes a time dimension (as managed by the timing module 308) to access past and future activity at a place. Time can in some instances be the 5th dimension. Additional dimensions can be included.

Locations in the disclosed AR environment can be expanded to non-physical places. Any location (e.g. digital location, virtual location) in any navigation system or digital environment could exist in a layer as administered by the namespace administration module 302 in a sub namespace for that system. For this location, there may not be any corresponding augmented reality (AR) plane, rather, a VR plane for a place like a document URL or named entity in a controlled vocabulary. By way of example, in a virtual world the "real" view can be the virtual world rendering, the AR view super imposes objects in the rendering, and the VR view adds a virtual place to the rendering, which corresponds to a connection to the fourth dimension.

The namespace/layer administration module 304 associates layers with the physical world to create the AR/MR environment in which human and virtual objects (VOBs) can interact. In a further embodiment, layers have associated with them, policies and permissions, as managed by a policies and permissions module 318 of the provisioning engine 316. In general, users (e.g., human users and/or non-player characters) and VOB can have an address and a namespace (layer) of its own. In one embodiment, by default, an entity's own layer is only visible or otherwise accessible the entity (e.g., any user, VOB). There can also be namespaces (layers) managed by the module 304 for other types of entities including for organizations, the public, and for groups.

In one embodiment, the disclosed AR environment/AR world functions a portal for the physical world. Users can interact with what is happening around them in the AR environment, in the layers the user has access to. Layers, along with users, places and/or VOBs form some of the basic primitives of the disclosed AR environment/AR world. In general, an example of a primary layer that most or all human users see can be the public layer. As the public layer is highly visible or accessible, it will have so much activity in it, that the visibility can be sold or rented, for example, by the monetization engine 362 to advertisers who want their VOBs to rise above the noise, for example, via paying to make the VOBs "Promoted." Promoted VOBs can be more visible in AR environment (e.g., via a client device or a consumer app when browsing, searching, in discovery mode, etc.). In a further embodiment, the perceptibility (e.g., human perceptibility, visibility, audibility), or relative perceptibility of a promoted VOB can depend on how much has been paid to promote it.

Moreover, human users generally have access to their own personal layer. Users can subscribe to other layers that they have permission to subscribe to, for example the layer for a group they join, which could be for customers or fans of a brand or a store, or a team member of an organization In one embodiment, to see the different layers, or move to them, a user can enter a navigation mode in the AR environment and change layers for a given physical location. Examples of layers and layer types are illustrated in the table of FIG. 6.

The namespace or layer administration module 304 can organize the AR environment into or as layers of activity, in which human users interact with VOBs and other human users or non-human players or users. In general, layers are hosted by servers, where different layers may be hosted by different servers (e.g., different hosts). In one embodiment, the disclosed system runs the only server (e.g., server 300). In other embodiments, server 300 (e.g., administration module 304) enables third parties to host their own layers.

An example set of default layers managed by the namespace administration module 304 can include:

Public Layer
- This layer is an example of layer that most if not all users can see. The host server 300 owns the ublic layer. In general, the content in the public layer is created by third party users, entities, or advertisers.
- Users can generally be browsing or discovering objects in the Public layer by default.
- The identity or branding of the public layer can be configurable.

Personal Layer
- In one example, a given user has their own personal layer that only they can see (e.g., by default). Users generally own their personal layers and can sublicense the content or data in it to the host 300.
- Non-human user actors such as VOBs can also have their own layers for objects they generate, spawn, create or own.
- The personal layer can be superimposed on the public layer. Users can configure a view of the AR environment to primarily access or view at the personal layer if they only want to see their own items, content, or objects.

Group Layer
- In one embodiment, a group layer refers to a namespace (layer) in the AR environment that has policies and permissions on it. The group layer can also have its own brand identity and look and feel.
- Additionally, a group layer can have the following example attributes:
  - It has one or more admin users (e.g., in a hierarchy or of a flat ranking)
  - It has metadata
  - It has associated policies and permissions
  - It has associated members (users)
  - It has associated VOBs
  - It can generate or create an event stream It can possess a brand identity and style sheet as well as brand art, soundtrack and other attributes Group names can correspond to for example, web domains names.

For example, to start and claim a group an admin must prove they own the web domain for the group. To prove this, they can respond to an email to the registered admin contact for the domain or they can put a special code in the HTML for a page at that domain. The verification process for claiming group names prevents squatters or disputes over name ownership.

One embodiment includes utilizing a certification process. For example, in passing the certification process, entities receive a blue badge that authenticates their identity. For example, VIPs in Facebook (FB) use a special app called FB Mentions that gives them special group and posting tools.

Groups can have subgroups and layers can have associated sublayers (as managed by the module 304)

For example, a company X can claim their group and then allow their employees to create sub-groups or be admins or members of the group or subgroups;

An online community can create a group and allow anyone to start a sub-group under it.

The owner of a group, for example, can set the policies and permissions to access its layer and associated content/objects A brand owner X can specifically prohibit competitors from promoting or posting content (e.g. promoted VOBs) into its group (e.g., the associated layer owned by the brand)

Examples of group layers can include, a layer for a community of interest, fans of a consumer brand, customers of a corporation, employees of a corporation, students of a school, etc. Further examples of group layers, sublayers and associated attributes are illustrated in the table of FIG. 6, Groups can be visible to various sets of users (public, only specific users, only members of specific groups, etc.)

Joining a group can be open to all, open to users who satisfy some set of criteria, or by invite only.

Admins in general, can control groups.

Approval to a group may be automatic, or may require an admin or sub-admin to approve it manually Admins can kick users out of groups. Admins can also control what content is in their group; they can moderate what is contributed; admins can modify or remove content, etc.

Groups can have branded look and feel capabilities for their layers—when a consumer views their layer it can have the unique brand attributes and style sheet of the party offering the group.

The host server 300 can designate places in the AR environment. For example, places are in general, named geographic regions around a central location, or within a closed loop boundary (the boundary can take on any shape or form). Note that a given geographic region or boundary can have different place names and metadata in different layers, in one embodiment, places are zones assigned by the administration module 304 within a namespace that users can follow and get notifications about when things happen (new coupon available, etc.).

A given layer in the AR environment has an AR to VR continuum. For instance, AR view can be useful when it matters to see physical things for part of the user interface. Alternatively, VR mode can be used when physical things or objects in the real world need not be viewed or rendered in a scene in the AR environment. For example, Layer n, place (x,y,z,t)

Real world view (photorealistic view or scene) of place (video, image, rendering, etc.)

Augmented view (video+VOBs)

Virtual view (no video, all synthetic)

The AR environment can levitate up into virtual level and find a wormhole to look into or project avatar into another place. Users can see that place via a user device instead of the place the human user is in. As the human user moves around, the avatar associated with the user and depicted in the AR environment can function and be rendered, for example, as a hologram from another dimension. By way of example, other human users can see that this type of avatar is more translucent.

In another example, the administration module 304 allows human users to put, publish, post, photos or other things in their associated layers. The layers can be followed by other human users as well.

Celebrity users can also have layers that other people can follow. Users can also subscribe to layers of other human users. For example, a celebrity can leave audio clips or video notes as VOBs associated physical places which can be consumed by human users that are subscribers or followers when they are near or within a distance range from the physical places associated with the VOBs.

One embodiment of the namespace/layer administration module 304 further includes an applet engine 306. The applet engine 306 can support multiple applets within the layers of the AR environment.

In general, applets can be attached to anything in the AR environment; for example, Layers, Places, VOBs, NPCs, and/or human or non-human users. The applet engine 306 can cause the applets to control, augment, or extend the behaviors of the objects/content they are attached to or otherwise associated with, and other things within that scope.

Applets can take on the following example behaviors:

Applets exist outside of layers and can be experienced and launched from VOBs.

Applets can be attached to specific VOBs such they can be launched and/or collected via those objects.

When the user launches an Applet, they can enter a Layer for that Applet. They then see VOBs and avatars specific to that Applet.

Applets enable games, quests, and other specialized programmatic experiences to be embedded within Layers.

Applets can augment user Avatars and can open specific sub-features like a specific in-game avatar with particular attributes.

This feature enables a game like Pokemon Go to be written via an Applet in the disclosed AR environment/platform; other simple games could be Pac Man or other arcade games, first person shooter games, team games like Capture the Flag, etc.

Treasure hunts for coupons, gift cards, and gift boxes are also simple types of games that can be built using the disclosed embodiments Some layers could have many games within them that can be found and launched via VOBs. Once in a game the user experiences the layer of that game, with any associated logic, until they exit the game.

The applet manager 306 uses applets to augment layers includes many uses beyond just gaming and can generally include, enabling specific logic and multimedia elements to be launched within a context in a layer.

In a further embodiment, the applet manager 306 associates Applets with Places in the AR environment. For example, an applet enabled Place could have code attached to it that generates and controls non-player characters (NPCs) in that Place. The applet enabled place can also generate and control VOBs in that place. Other rules might govern the appearance and physics of the Place. These rules can work across one or more places as well.

The applet engine 306 can then is to enable game mechanics or other logic to be attached to places. A "game" or "quest" could be constructed as a set of these rules, across some set of places, on some set of layers, for some set of VOBs and users.

One embodiment of the host server 300 includes a provisioning engine 316. The provisioning engine 316 can be any combination of software agents and/or hardware modules (e.g., including processors and/or memory units) able to create, generate, update, depict, provision, allow, permit, perceptibility, discernibility, access or consumption of objects (e.g., virtual objects (VOBs) or other content) in the augmented reality (mixed reality or alternate reality environment).

One embodiment of the host server 300 includes a timing module 308. The timing module 308 can be any combination of software agents and/or hardware modules (e.g., including processors and/or memory units) able to detect, track, monitor absolute time, relative time, elapsed time between events, activities, relative to a trigger, in the real world or in an augmented reality environment. The timing module 308 can further include a time frame module 310 and/or an expiration engine 312.

In one embodiment, owners of layers control temporal policies associated with the layer and of the virtual objects or other content. The temporal policies can then be monitored or enforced by the timing module 308 for use in the provisioning of the VOB by the provisioning engine 316.

For example, if user Bob owns a layer, Bob can set the default lifetime of VOBs to whatever he wants, per user or group of users in his layer. In this Personal layer by default, any VOBs created by Bob last forever, for Bob. They can be completely private and only Bob can see them.

In general, the owner of a group layer can specify that admins can post objects that last forever (or until they self-expire) and be tracked and/or enforced by the timing module 308 (e.g., the expiration engine 312). In addition, ordinary guests or members to the layer can for example, only post objects that last 5 minutes, and/or those objects are be approved by the moderator of the layer before they can be provisioned to appear (e.g., by the provisioning engine 316) to other members of the layer.

In the case of the public layer, the default policy can be set such that objects expire faster in high traffic areas. For example, the more people and objects there are in the Public Layer, at a place and a time, the more ephemeral objects are. In a very busy area objects may only appear for a few seconds. Certain types of VOBs such as promoted VOBs can have a longer lifetime. In one embodiment, Promoted Objects live for longer (e.g., has a longer expiry time) than unpromoted objects, as tracked by the expiration engine 312. The provisioning engine 316 then based on the expiry time parameter allows the virtual object to appear in the augmented reality environment. For example, in general promoted objects do not expire until their campaign budgets are used up. time-delimited sales or promotional events can also be enabled by merchant.

In the disclosed AR environment (e.g., augmented reality, alternate reality or mixed reality environment), various types of interactions are enabled when interactors share proximity in space and time (e.g., as determined by the timing module 308 and a location detection engine 314). Proximity can by determined by the location detection engine 314, for example, using geolocation of a user's device using one or more methods of locating the device.

In one embodiment the location detection engine 314 uses Bluetooth to locate users relative to other users for rendering in the AR environment. Using Bluetooth (e.g., Bluetooth mesh networking) enables the location detection engine 314, to precisely locate a user from the perspective of another user looking at them. In addition, any wireless signal, whether it is peer-to-peer, via a third-party node or network can be used.

For example, placement or location of user avatars (e.g., 3D rendered avatars), user halos (information halo) or other information associated with a user or user profile in the AR environment can be determined using wireless information (e.g. any or a combination of Bluetooth, RF, WiFi, GPS, RFID). Through utilization of relative location determination, any reliance for image processing for object placement can be alleviated. In a further embodiment, the location detection engine 314 can employ a mesh approach to determine or compute, or learn the locations of people inside buildings (e.g., using the indoor location tracker 315). In one example, people on WiFi and/or GPS could be used to triangulate other users. An indoor atlas can be generated by the indoor location tracker 315. Beacons can be integrated and used for indoor location tracking.

In one embodiment, volumetric video capture can be performed for enrichment of places depicted in the AR environment. For example, multiple cameras can be placed around physical locations and those locations can be monitored or constantly rendered in video from every perspective and can be viewed and participated in by non-local users as well as local users.

In one embodiment, layers of the AR environment can be associated with multiple time frames (e.g., by the time frame module 310 of the timing module 308). The multiple time frames can include, for example, time frames for Past, Present and Future. Additional time frames can be used, tracked, configured, defined, and implemented by the time frame module 310. The use of time Frames can reduce information overload and clutter in in the present time frame which is associated with the temporally relevant VOBs. For example, VOBs that are no longer relevant or active to the Present can be moved (e.g., by the time frame module 310) into the Past frame and clears out room in the Present frame. VOBs that are scheduled for example, by the time frame module 310, to appear in the Future also do not clutter the Present. In general, the Present frame is associated with live, active or otherwise unexpired VOBs.

Using a time attribute of VOBs, the time frame module 310 can filter a view of the user in a place by time. The time frame module 310 can also generate time frame data structures to be associated with the layers. Embodiments of the present disclosure include time-delimited sales auction like sales events or promotional events by merchant conducted using time frames associated with the layers. In general, users can participate in these events when in proximity or remotely. Additional example uses using time frame implementation include:

Objects can be live (active) in one or more time frames
By default new objects can be placed in the Present frame of a layer.
When objects expire they go into the Past frame.
Objects can be scheduled to appear by placing them in a point in the Future and when the time comes or approaches, virtual objects can be moved into the Present.

By default, the Present is a frame of time encompassing a given time range (e.g., the last 15 sec, 30 sec, 1 min 5 min, or 10 min etc.). That means after that time frame VOBs become inactive and invisible in the Present.

Expired (Past) objects can still be discoverable if users scroll back through time in a layer (if they are allowed to). But the ability to look at the Past and Future of a layer can be given to the owner/admin of the layer by default.

One embodiment of the host server 300 further includes a monetization engine 362. The monetization engine 362 can be any combination of software agents and/or hardware modules (e.g., including processors and/or memory units) able to assess, charge, impose, a fee or cost of other entities or user to publish, post or otherwise associate objects with various spaces in the alternate or augmented reality environment. The monetization engine 362 can also devise, create, revise, modify revenue models for generating advertising revenue through the AR environment and/or through an end user paid subscription or freemium model. In one embodiment, the monetization engine 362 further includes an advertising engine/promotion engine 364.

In one embodiment, the monetization engine 362 designates the public layer (e.g., public space) as paid. The monetization engine 362 assesses a cost or fee for a VOB to be placed in, published in or otherwise associated with the public layer. In addition, putting an object in from any other layer is equivalent to boosting a post—so in another layer if an entity boosts a post they are assessed a fee or cost by the monetization engine for the object to be visible in the public space.

In one embodiment, a virtual object can be, by default, associated with or posted to the layer of the owner (the brand, or a user). The entity (e.g. user, brand, organization, company, etc.) can then pay to boost that object to be visible in the public layer. As such, VOB movement between different types of layers (e.g. between public and private layers) are generally assessed a fee, such operations can include by way of example:

Moving an Object—Take it from layer x and move it to layer y
Copying an Object—Cloning it from layer x to layer y
Publishing an Object—Making an object that lives in layer x, visible to users in layer y (it remains in layer x, but is now also visible in layer y). This is an example of advertising or boosting an item or object (e.g., by the advertising engine 364)
Object Publishing Parameters can include, for example:
Published To
  Lists the layers that the object is visible in
  By default an object is only visible in the layer of the owner of the object.
Publishing Rules
  Default Layer
    Only owner of layer can publish to it
      Owner can moderate items to be published by others
  Public Layer
    Others can publish to it, via a payment system, and that gets moderated by us and then goes live One embodiment of the monetization engine 362 includes an advertising engine/promotion engine 364. Within the disclosed AR environment, ads, promotions and reality can be presented to users where users can interact or access with the depicted reality, objects, marketplace and/or ads. For example, if a human is near or within a predefined distance of a basketball court or in LA, or a basketball court in Los Angeles, the user will be able to shoot baskets, play basketball other users and then be upsold on Laker tickets or sneakers.

In one embodiment the, the advertising engine 364 implements and devices advertising as one of the monetization models. The advertising engine 364 in general enables users, groups, brands, merchants, companies to Promote any VOB they have permissions to promote. One embodiment of the present disclosure includes an advertiser app, the advertiser application can be mobile first (e.g., deployed by the advertising engine 364), as illustrated in the example screenshot of FIG. 2K. A mobile first advertising application is advantageous as retailers in the world will generally have easier mobile access but may not have a desktop PC in their stores.

An example use case is to enable advertisers to place Promoted coupons, gift card objects, messages, and other objects (for example treasures—if a user collects all three then the user get a coupon, etc.), in physical places, such as malls, or inside or outside stores.

Additional example attributes for advertising in the AR environment include, by way of example, not limitation:
Promoting a VOB is similar to promoting a link on Google or other search engines.
Promoters can choose between paying for impressions or paying for interactions.
Promotions can apply to the specific layers only, if they wish to limit them.
AR environment host (e.g., host server 300) can run the sale backend for selling Promotions across all layers.
AR environment host (e.g., host server 300 or the advertising engine 364 of the host 300) is the owner of the Public layer and keep 100% of ad revenues in a layer owned by the host or the public layer. In some instances, only the host server 300 can sell and place Promotions in the Public layer. Anyone who wants to promote anything in the Public layer does so through the host 300.
The owner of a namespace (layer) can sell Promotions in their layer, via us. The host server 300 can take a cut of ad revenues in layers. So, for example, a publication could establish their own layer and sell Promotions in it to other brands. The host server 300 (e.g., the advertising engine 364) can run the backend for that and keep 50% of the revenues.
The host server 300 can provide analytics to advertisers (e.g., via an analytics engine 320).
Promoted Objects can be more visible and live longer in the Public layer. Non-promoted objects appear in the Public layer for an amount of time that may vary with the amount of activity in that region.
Promoted objects can be scheduled (e.g., users can pay to post it into the future in the public layer), In addition, different fees can be associated with different times. For example, peak times associated with certain events (e.g., Live event, superbowl, rush hour) where visibility is higher may cost more.
Promoted objects can also be part of Campaigns with budgets and analytics that cover the whole campaign.
An example of the advertising format (e.g., as administered by the advertising engine 364) is as follows:
Bidding System Example Format
Current bids for this location:
  Position 1: $100/hour
  Position 2: $80/hour
  Position 3: $60/hour
  Position 4: $50/hour
  Position 5: $25/hour Campaign Object Examples
Display Ads: $1 CPM+$1 CPA
Coupons: $1.50/coupon/15 days' time to live
Gift Cards: $1/card unit+15% fee on points
Treasure Chests: $20/chest+15% fee on points
Puzzles: $20 per puzzle+$1 per puzzle piece
Crystals: $1/$5/$10/$20/$100 crystal
Boons: $200 per boon+15% points
Poll or Survey: $20/campaign+$0.5 per entry An example of advertising game play features (e.g., as administered by the advertising engine 364) is as follows:

NPC and Bot Advertising and Gameplay:
NPCs can interact with Users and can give treasures, coupons, gift cards, or other rewards
NPCs can be sponsored by brands
NPCs can roam around in an environment
Bots are automatically spawned NPCs avatars
Brands can pay to put Bots into the world
"Bots" as a type of commercial ad object that brands can buy (e.g., price per bot is $200+$2 CPA for now).
A CPA is an engagement interaction with a user.

Powerups:
VOBs that are sponsored by brands
Power up Examples
Radar Power boost (e.g., for 5 mins or a specified amount of time, or for an amount of time that has been assessed by the advertising engine 364 and paid for)
Map resolution boost (e.g., for 5 mins or a specified amount of time, or for an amount of time that has been assessed by the advertising engine 364 and paid for)
Double points (e.g., for 5 mins or a specified amount of time, or for an amount of time that has been assessed by the advertising engine 364 and paid for)
Reach extender—interact with objects that are farther away
X-Ray Vision—see special hidden objects
Crystal magnet—pulls them into a user's wallet
Increase Goodies—higher odds of good things spawning near a human user (e.g., for 5 mins or a specified amount of time, or for an amount of time that has been assessed by the advertising engine 364 and paid for)

The advertising engine 364 charges an advertiser to make a gift card loaded with points The advertising engine 364 charges an advertiser to buy 100 coupon objects, the advertising engine 364 can also charge an advertiser to boost them to the be visible to the public layer In a further embodiment, the advertising engine 364 assesses a 'cost per acquisition or cost per action (CPA)' or a 'cost per thousand (CPM) or a 'cost-per-click (CPC) to an advertiser. For example, CPA can be charged as follows:
Collect a thing
Spend a gift card or coupon in a store
Follow a layer In one embodiment, the advertising engine 364 enables donation in the AR environment where users or entities can donate points that have been purchased for use by other entities, Donations could work in the system.

One embodiment of the host server 300 further includes an incentive management engine 366. The incentive management engine 366 can be any combination of software agents and/or hardware modules (e.g., including processors and/or memory units) able to motive, encourage, incentivize human users to participate in or engage in activities or events in the real world or through the AR environment deployed or administered by the host server 300. The incentive management engine 366 can grant to the human users, rewards, points, gifts, financial rewards, intangible rewards (e.g., presented as VOBs) through the AR environment.

In one embodiment, the host server 300 (e.g., the incentive management engine 366) can enable retailers and/or brands and retailers to incentivize users to show up at physical places in order to receive virtual objects (e.g. incentive objects) that can for example function as coupons, gift cards, treasures, coins, or other units of value that can be converted to fiat currency (e.g. dollar, pound, euro, etc.) equivalents in real world commerce. Incentive objects can have value in the real world, in a virtual world, in the AR environment, or any combination of the above.

For example, a brand can offer 100×$100 virtual objects that function as gift cards near or in their stores in a certain city at certain dates and times Human users of the AR environment can see these virtual objects, and have a chance to get them if they show up in certain places and times. These VOBs can be easy to get or can require work such as treasure hunting, puzzle solving, competition or other gamification. The VOBs can also be scarce and time limited. These incentive objects can for example, by deployed by the host server 300 (e.g., the incentive management engine 366) and can be captured and used by human users in the AR environment if they are in physical space around their stores at particular times, and perform various behaviors.

For example: Somewhere in the mall today there are 3×$1000 gift cards today, or there are 100×50% off coupons near a store that are only valid for a limited amount of time (e.g., the next 5, 10, 15, 30 minutes, 15, 20, 45, 60, sec. etc.) The VOBs that are incentive objects (e.g., incentive objects are stored in the incentive object repository 332) are deployed, placed, managed, controlled by the host server 300 (e.g., the incentive management engine 366) and in some instances, they can be tiny—e.g., a millimeter cubed, or a centimeter cubed and difficult to find. The incentive management engine 366 can also configure the incentive objects to move around or try to hide and run away from the human users in the AR environment. If the incentive objects are found and captured or otherwise consumed, the human user can get the value associated with the incentive object. Users in the AR environment, or using the application to access, view or interact with or within the AR environment can find and interact with these objects, to get rewarded.

In another example: outside physical stores in certain hours every day there are a certain number of special coupons or offers that appear as virtual objects (e.g., incentive objects as stored in the incentive object repository 332). The incentive objects can appear for a few minutes at a time. If a human user captures or collects them in the AR environment, the human user then can use them, either in the real world, in the real world redeemed via the AR environment, or used in the AR environment.

In some embodiments, the incentive management engine 366 assigns usage policies to the incentive objects. For example, the incentive management engine 366 can assign an expiry time frame for the incentive objects such that they have to be used in a certain window or period of time or they expire. These create an urgency and competition among users to find the incentive objects, tell their friends about them, get them, and use them while time and supplies last.

Another example type of promotion can include incentive objects that are treasures (such as points, coins, etc.) that have to be found, and/or that are connected to actions or achievements like hours spent in a place, number of visits to a place, miles traversed in the app or on a certain path. In some examples, by checking into a place in the app certain rewards could be earned by users. Additionally, by taking other actions like browsing through the aisles in a store, or spending $x in a store, or spending y minutes in a store, they could earn more points. Incentive objects or AR based rewards can be used for participation gamification element as a way to pull in users and advertisers, and to monetize through the AR environment. This enables the host server 300 to pull users in—in other words, host server 300 pays human users to participate via rewards that are funded by advertisers and sponsors.

The host server 300 is not limited to shopping oriented use-cases liked coupons and gift cards—The host server 300 (e.g., the monetization engine 362) can also monetize branded experiences where there is no tangible dollar-equivalent reward to human users. For example, the reward from the host server 300 (e.g., the incentive management engine 366) to users might be on a different 'level' in the AR environment, such as giving them access to exclusive content or events or other experiences around brands or celebrities they care about. The monetization engine 362 of the host server 300 charges brands to create and promote differentiated content or events or other AR powered experiences. As such, the host server 300 can generate attention to the advertisers from our user base in the AR environment and the result can be increased brand awareness, improves brand sentiment, more brand engagement, etc.

For example, a celebrity could put photos, notes, reviews, tips, clues, special rewards or offers, in locations in the physical world. Fans that follow their layer via the AR environment can see and interact with these things. This can also include the celebrity leaving virtual tickets around their layer of the world, that can be found for example, exclusively via the AR environment hosted by the host server 300, which then give users who find them the location, time and entry pass to a physical event such as a secret pop-up concert by a celebrity. A branded experience deployed in the AR environment can be sponsored by a brand and can contain branded objects or advertisements as well. In this case the incentive (e.g., as facilitated by the incentive management engine 366) to a user is access to exclusive content and the value is to advertisers that sponsor that content or experience.

Additional mechanisms can be deployed by the incentive management engine 366 to create rewarding experiences for users, advertisers and retailers in the AR environment. Essentially, the incentive management engine 366 implements strategies to drive consumers to carry out a behavior of value like buying something, subscribing to something, or taking some desired action. The target behaviors include, for example, going into stores, making online purchases, or taking some other actions. The incentive management engine 366 can estimate, predict, compute, track, monitor, measure, return on investment outcomes that prove the efficacy of the AR environment to advertisers.

Beyond rewarding shopping behaviors, the host server 300 can also catalyze open growth and adoption in the AR environment like the early days of the Web. For example, the AR environment can function as an advertising medium and the host server 30 provides the advertising marketplace. The host server 300 (e.g. the monetization engine 362) can own the inventory and the advertising platform for the inventory. The host server 300 can receives a cut of every ad and every other in-world transaction, and the host server 300 generates, creates and owns the analytics (e.g. via the analytics engine 320).

Embodiments of the present disclosure further include a point system (as managed by the incentive management engine 366). For instance:

The host server 300 can include a points system to give users incentive rewards for taking various actions.

The host server 300 (e.g., the incentive management engine 366) can award points for various actions, and enable advertisers to buy points campaigns in the system. Examples of such actions can include:
Collect coupon
Spend coupon
Buy something
Enter a place
Remain in a place for an amount of time
Invite others to visit a place
Complete a quest
  Do some action (or series of actions) a certain number of times on a date, on different dates, or on adjacent dates
  Complete some set of goals in a period of time or in a place
  Go to sequence of places
Remain within place for <time>
Touch object
Follow Object
Share object
Invite friend
Like object
Achievement
  Collect a certain number of objects
  Get a certain number of followers or likes to an object you created
  Invite a certain number of new users who sign up for the app
  Create a certain number of new objects One embodiment of the host server 300 further includes an analytics engine 320. The analytics engine 320 can be any combination of software agents and/or hardware modules (e.g., including processors and/or memory units) able to generate, compute, monitor, track, record, statistics, data or metadata related to human users, places, things, garners, virtual objects, advertisers that use or access the AR environment.

In one embodiment, advertisers or brands which offer incentive objects or points in the AR environment, can access or view the analytics and demographics of their campaigns, and the other campaigns and public activity. Such analytics can be generated by the analytics engine, for example, at physical places near where human users can earn these incentive objects (e.g., local rewards.)

Advertisers can be charged a fee or levels of fees (e.g., by the monetization engine 362) to access or view the analytics and demographics about places too. In some embodiments, a fee is assessed for access to aggregate analytics about a physical place across specified layers and/or the public layer in the AR environment. In general, the analytics engine 320 can provide basic overall traffic or popularity graphs to non-paying users in the metadata for each place. Users in the AR environment can choose to levitate to that strata to see that.

The analytics engine 320 generates or collects analytics using statistical data and metadata from any or all layers, places, objects, actors, users and/or other participants. In one embodiment, the analytics engine 320 enables admins or owners view analytics about things which are in their control. In general, more advanced analytics can be for example, provided by the analytics engine 320 to advertisers or for paying Premium customers.

One embodiment of the present disclosure includes an application or dashboard for layer admin or owners. The analytics engine 320 can aggregate or generate the analytics to be provided via the application or dashboard for layer admins or owners. The analytics engine 320 can also generate customized views of the analytics for the layer admins or owners. In some instances, the admin application or dashboard enables the layer admins or owners to query the data for customized views into the analytics.

One embodiment of the host server 300 further includes an activity management engine 380. The activity management engine 380 can be any combination of software agents and/or hardware modules (e.g., including processors and/or memory units) able to detect, track, monitor, facilitate, govern, control, manage, determine, interactions between various entities in the alternate reality (e.g. mixed reality, augmented reality) environment. The entities can include, end users (e.g., regular users, celebrities, experts, etc.), non-player characters, virtual objects, third party entities (organizations, brands, advertisers, merchant, etc.), places, etc.

One embodiment of the activity management engine 380 further includes, one or more of, an interaction manager 382, a social networking engine 384, a gaming engine 388, a commerce/marketplace engine 360, a VOB management engine 390 and/or a VOB ontology/taxonomy manager 392.

Embodiments of the host server 300 provide (e.g. via the VOB management engine 390 of the activity management engine 380) the ability to access, perceive, hear, see or interact with VOBs in the environment. The activity management engine 380 can also enable, facilitate or govern the use of human gestures or motions or motions detected at a device used to access the AR environment to interact with VOBs. Furthermore, the activity management engine 300 (e.g., the interaction manager 382) can facilitate or enable VOBs to passively sense, and actively interact, with other VOBs or human users in the AR environment. Example types of interactions include, ask, see, hear, get, put, give, touch and/or annotate. In embodiments of the present disclosure, virtual objects (VOBs) are examples of objects with addresses or identifiers such as URIs (web addressable) and APIs. The interaction manager 382 enables VOBs to support actions or interactions including:

Query
Get public or private information from the object, if the user has permission
A virtual object can include publicly accessible metadata; such as a name, UID, creator, location, created data, modified date, etc.
A virtual object can include one or more streams of events it generates, which can be queried by actors (human users, or other VOBs) with permission
Talk
Communicate with an object using text and/or speech to ask questions, give commands, or perform other interactions
A virtual object can have a basic interactive capability by default
Object authors can give their objects more advanced talk capabilities or AI capabilities
See
A virtual object can have different visual renderings for different devices or users with different permissions
Hear
A virtual object can have different audio renderings for different devices or users with different permissions
Touch
Interact with the surface or internals of the object and trigger behaviors by the object
This can include sub-actions like Move, Hit, Shoot, Poke, etc.
Get
Get the only one copy of the object (e.g., virtual object), or get one of a finite or infinite number of copies of the object
To pick up an object may optionally require preconditions such as the user having certain permissions, or the user having paid for the object, or the user having other objects that are pre-requisites, etc., or the user being within a certain distance from the object or within a named place that the object is in, etc.
Put
Put down an object in a physical location
Not all physical locations allow objects to be put or in them; putting an object somewhere may require the user to have certain permissions
Give
Give an object to another user
The host server 300 (e.g., the activity management engine 380 or the VOB management engine 390) can give the only copy the user has, or may give one of a finite or infinite number of copies
Annotate
Commenting, liking and rating, tagging, linking
Edit
Change anything about the object's specification
The host server 300 (e.g., the activity management engine 380 or the VOB management engine 390) may require admin rights to the object
Publish
Objects can publish (post) events to streams they have permission to post to
Events are messages that have metadata and body content
Events can be anything from a notification to a command
By default the activity management engine 380 (e.g., via the VOB management engine 390) can associate a virtual object with a public event stream which can be to anyone, and an admin event stream visible only to the admin of that object. The activity management engine 380 can assign or associate the VOB with other event streams.
Subscribe (Follow)
Objects can subscribe (pull) to events from streams they have permission to subscribe to.
Custom Behaviors
the VOB management engine 390 can assign custom behaviors to VOBs that enable them to do more complex activities or support other types of interactions by users
The VOB management engine 390 can configure the VOBs to behave in an autonomous manner such as:
Randomly roaming around a path or region
Chasing users
Running away from users
Hiding
Doing things to other objects (not just users)
Behaviors can specify rules about what an object does in various circumstances
If user comes from place x then do y
If a user has <permissions|qualifications> then do x
If user goes from me to place x then do y If user has objects <set> and <something else is true>
    then do
Other possible custom behaviors
  Self destruct
  Shoot at users
  Get shot at by users
  Stealth mode
    VOB can be hidden except for <people in certain
      locations, people in certain layers, certain people,
      people who have other objects, etc.>
  React to user
    Bot behaviors
      Talk to the user
      Play with the user
      Fight with the user
      Move around when user does x
  Change over time
    Move from one location to another, or traverse a path
      Move according to some intelligent rules
      Chase people
      Run away from people
      Follow a route
      Go where there are more people
      Go away from crowds of people
      Don't go outside some region
      Wander randomly within a region
    Morph from one type of object to another
      Turn from a golden ticket to a silver ticket after a
        period of time In some embodiments, the VOB management engine 390 can configure VOBs to react or act in response to gesture combinations. For example, some VOBs can be activated or collected with special secret gesture combinations (phone shakes, or by moving around it in a pattern or surrounding it etc.). Or for example, by saying (or shouting) the secret words, singing, or humming certain notes or note sequences into the mic of a device to unlock VOB.

One embodiment of the host server 300 further includes a user management engine 386 to track, detect, provision, control, manage human user and/or non-player characters (NPCs).

One embodiment of the host server 300 further includes a user management engine 386. The user management engine 386 can be any combination of software agents and/or hardware modules (e.g., including processors and/or memory units) able to detect, track, monitor, facilitate, govern, control, manage, the activities identities, permissions of human users in the alternate reality (e.g. mixed reality, augmented reality) environment administered by the host server 300. The user management engine 386 can also track, facilitate, enable provision, control actions, reactions and/or interactions of human users in the alternate realty network with other users (e.g., other human users, entities, organizations, advertisers, brands, non-player characters, etc.) and/or any other entity (e.g., VOBs, objects, places, and/or things)

The user management engine 386 can also manage, track, facilitate, control the behavior of non-player characters (NPCs) and/or their interaction with various other entities in the AR environment deployed by the host server 300. The entities can include, end users (e.g., regular human users, celebrities, experts, etc.), non-player characters, virtual objects, third party entities (organizations, brands, advertisers, merchant, etc.), places, and/or things etc. Characteristics of various actors in the disclosed AR environment include for example:

Human Users
  Human users have accounts and represent real people
    with verified mobile phone numbers and/or email and
    other social IDs
  Human users can be individuals or organizations; organizations can be owned by one or more individual
    users.
Non-Player Characters (NPCs)
  NPCs are VOBs that act as bots and are capable of
    autonomously acting the world with other users and
    VOBs
  NPCs can be registered and owned by a User. The user is
    generally responsible for the behavior of their NPCs.

The VOB management engine 390 of the activity management engine 380 can additionally configure VOBs to act, react or interact as follows:
  1. Interactions with Objects
    1. Passively Sense and actively interact with objects
      1. View, Grab, Drop, Trade, Combine
    2. Add VOBs to inventory The interaction manager 382 can manage, control, determine, facilitate interactions of human users with VOBs (e.g. objects or user avatars), things places, objects and/or other users, in or via the AR environment. Such interactions can occur virtually (e.g., in the digital/virtual realm with a digital/virtual effect), in real world with a real world effect/outcome and/or a digital/virtual effect in the AR environment, or occur in the digital/virtual realm (e.g., via the AR environment deployed by the host server 30)) with real world results, outcome, use and/or effect.

Figure 4A:
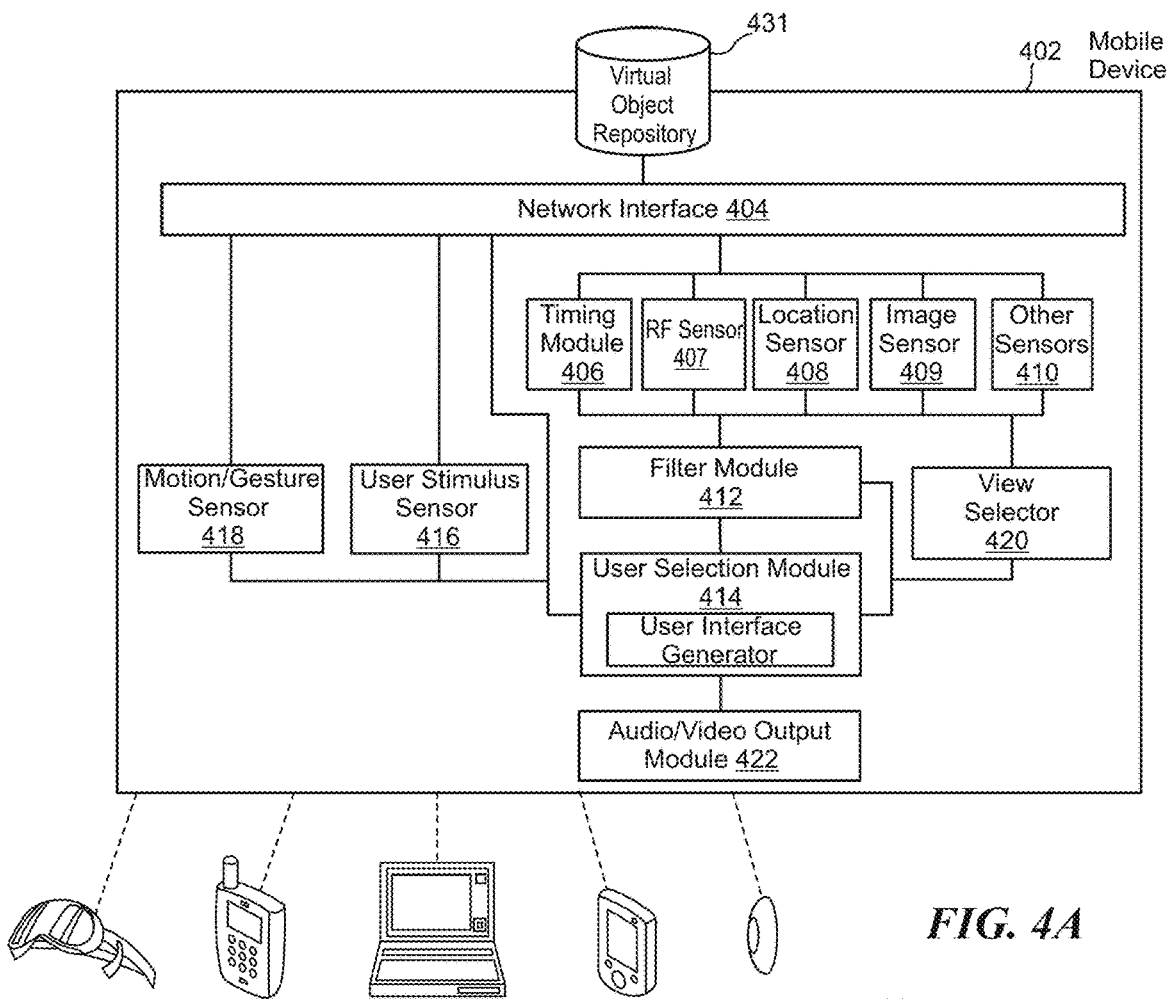
FIG. 4A depicts an example functional block diagram of a client device such as a mobile device that presents, to a human user, mixed realities integrated with physical reality for enhancement of web, mobile or other digital experiences, in accordance with embodiments of the present disclosure
Figure 4B:
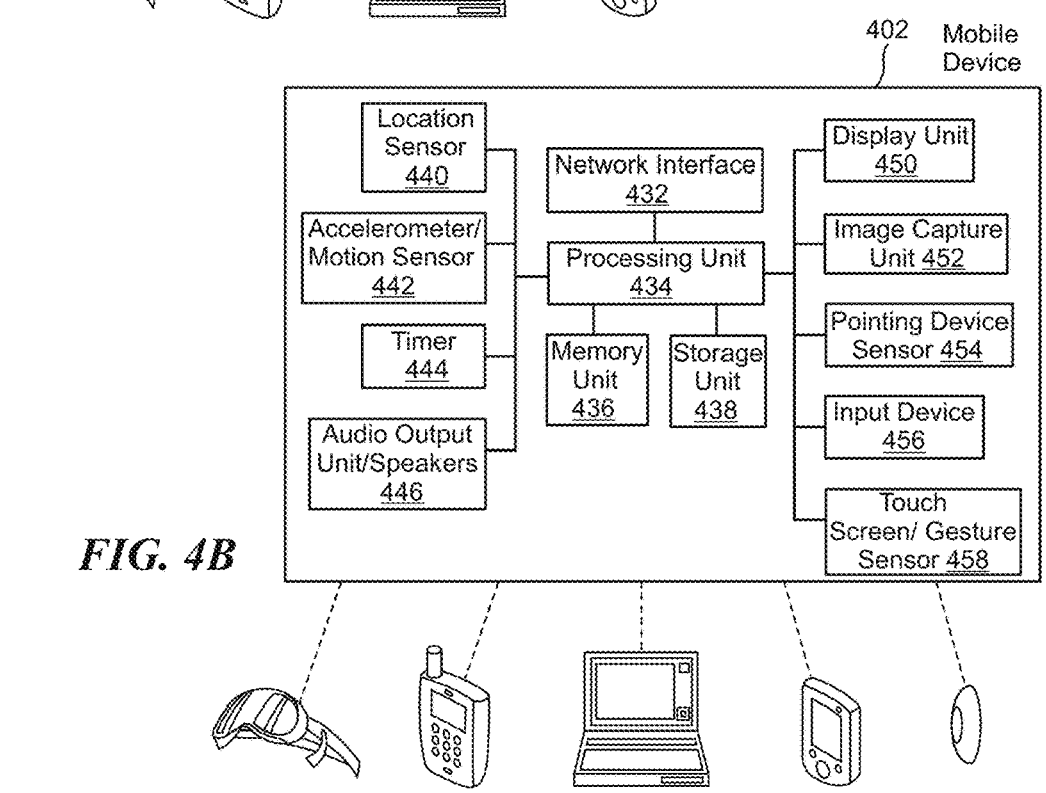
FIG. 4B depicts an example block diagram of the client device, which can be a mobile device that presents an integration of augmented, alternate, virtual, and/or mixed realities with physical realities for digital experience augmentation and enhancement, in accordance with embodiments of the present disclosure.

Examples of such interactions, which can be initiated at a device used by a human user (e.g., a client device illustrated in the example of FIG. 4A-4B) to access the AR environment administered in part or in whole by the host server 300, can include:
  Touch Screen Interactions
    Tap to select/Touch: a human user is able to tap a screen
      (e.g., of a client device illustrated in the example of
      FIG. 4A-4B) in addition to or in lieu of AR gestures in
      a familiar method to non-AR apps.
  Rear Camera Interactions
    Focus: Users center a VOB in the center of a screen (e.g.,
      of a client device illustrated in the example of FIG.
      4A-4B) to highlight/trigger an event.
    Reach: Users extend hand into view of a rear-facing
      camera (e.g., of a client device illustrated in the
      example of FIG. 4A-4B) to select/trigger a VOB in the
      AR environment (reach to select).
      Wipe to Clear: Users can make VOBs disappear by
        moving their hand from left to right (or right to left)
        in the rear camera field of view (FoV).
  Screen
    Place a screen/advertisement on any square object in view
      of the AR camera of the AR environment.
  Front Camera Interactions
    Wink: Users can wink to select VOB's
    Pinch: Users touch thumb and forefinger to select a VOBs
    Additional Examples of Interactions of and among various entities (e.g., human users, NPCs, objects, virtual objects, places, things) in or with the AR environment include:
  Persons
    Look at yourself in a rear camera (e.g., of a client device
      as illustrated in the example of FIG. 4A-4B) and see an
      augmented view of yourself.
  Public Layer
    Items you have put there for anyone to see around you
      through their front cameras Items put there by the host server 300 for everyone to see—Achievements, awards, and other stats that Aura puts there about you
Rewards to you for looking at or adding to your public aura:
Vanity (popularity, self-expression, self-validation)
Attention (engagement, acknowledgment, connection)
Entertainment (content)
Private Layer
Items that others (friends, brands, content providers) have put there for you (stickers, gifts, content, etc.) to see around yourself in your rear camera
Items you have put there for specific people or groups you belong to
Rewards to you for looking at or adding to your private aura:
Vanity
Attention
Greed (get gifts and points)
Entertainment
Look at another person through a front camera (e.g., of a client device illustrated in the example of FIG. 4A-4B) and see an augmented view of the other person in the AR environment.
Public Layer
Items around them that they share publicly
Rewards to you for looking at or engaging with objects associated with another human user's public layer, or another person's public aura
Vanity (compare yourself to them, celebrate them, learn about them)
Attention (get their attention—when you look at someone's objects associated with their public layer and you are in the same place they can sense that they are getting attention from you and they can look back)
Greed (get stuff from them that they offer via their public auras)
Entertainment
Private Layer
Items you put there for them to get/see
Items they put there that is shared privately with you or groups you belong to
Rewards to you for looking at or adding to another person's private aura
Vanity (compare yourself to them, celebrate them, learn about them)
Attention (obtain their attention—share stuff with them that they will look at and give you attention for)
Greed (obtain stuff from them that they offer via their private auras)
Entertainment
Places
Access or view a place (a tourist destination, a landmark, a venue) through a front camera of a device (e.g., a device as illustrated in the example of FIG. 4A-4B) and view, interact with or otherwise access an augmented view of the place the AR environment deployed by the host server 300.
Public
Sponsored items from advertisers, brands, or promoters
Collections of items put there by anyone, including yourself, your friends, the public, brands, etc.
Rewards to you for looking at or engaging with the public aura of a place
Greed (get stuff)
Knowledge (learn about the place from others)
Attention (get attention from others who go there or are interested in that place)
Vanity (make yourself look good or improve your reputation via what you put in the place)
Entertainment
Private
Items that are only visible to you or groups you belong to
Rewards to you for looking at or engaging with the private aura of a place
Greed (get stuff)
Knowledge (learn about the place from others)
Attention (get attention from others in specific groups who go there or are interested in that place)
Vanity (make yourself look good or improve your reputation for specific groups via what you put in the place)
Entertainment
Things
View, hear or otherwise access a thing (such as a product) through a front camera (e.g., of a client device illustrated in the example of FIG. 4A-4B) and see an augmented view of that thing in the AR environment deployed or administered in part or in whole by the host server 300.
Public
Sponsored items about the thing from advertisers
Collections of items put there by anyone, including yourself, your friends, the public, brands, etc.
Rewards to you for looking at or engaging with the thing associated with the public layer or a public aura of the thing
Greed (get public rewards—points, virtual goods, etc., or get a discount or offer or a virtual good, or a ticket to an event, etc.)
Knowledge (learn about the item from others or the brand offering the item)
Attention (get attention by commenting on the item, etc.)
Vanity (make yourself look good or improve your reputation via interacting with the item, collecting it, adding it to your aura, sharing it)
Entertainment (possibly)
Private
Items about the thing that are only visible to you or groups you belong to
Rewards to you for looking at or engaging with the private aura of a thing
Greed (get public rewards—points, virtual goods, etc., or get a discount or offer or a virtual good, or a ticket to an event, etc.)
Knowledge (learn about the item from others or the brand offering the item)
Attention (get attention by commenting on the item, etc.)
Vanity (make yourself look good or improve your reputation via interacting with the item, collecting it, adding it to your aura, sharing it)
Entertainment (possibly)

The disclosed innovation includes a client application or consumer application, as deployed or managed by the mobile application module 356 of the host server 300 for user devices (e.g., a client device illustrated in the example of FIG. 4A-4B) which includes mobile devices. Embodiments of the present disclosure enable human users to view, access, or interact with other users and brands via the AR environment, using the client application (e.g., example user interfaces are depicted in the example figures of FIG. 2A-2L).

The social networking engine 384 of the activity management engine 380 can manage, deploy, track, record, facilitate, enable, provision social actions or interactions among human users or among human users and avatars representing other users, or between avatars representing human users and/or NPCs in the AR environment.

The social elements of the AR environment as enabled or actions/reactions/interactions facilitated therefor by the social networking engine 384 can include, by way of example not limitation:

A) Messaging
    Ability for a User to drop a message beacon at a location for a friend/follower to read.
        The message beacon can only be read/viewed at a location.
        User can set a timer for the message to expire. If friend/follower does not get to the location in time, the message disappears.

B) Avatar Viewing
    View other Users in the AR environment

C) Spectator View
    Followers can watch a User's AR camera Feed and project it into their space. For example, this could be done inside the AR environment with the camera feed mapped to a square inside a user's apartment.

Example features of a social networking environment (e.g., as deployed by the social networking engine 384) include:
    User Login
    Map View with VOBs showing on Map
    Ability to switch into AR Goggles View to view VOBs
    Rear camera interactions
    Instant Coupon Beacon
    Avatar Viewing
    Message Dropping User profiles can be generated, curated, created, updated, modified, edited, maintained, tracked, recorded, aggregated, stored, deleted, by the social networking engine 384 for various users or entities in the AR environment. Users have profiles that have demographics and identity to enable the host server 300 (e.g., via the monetization engine 362) to create or determine related analytics which can, for instance be communicated to advertisers, with or without a fee. Such user profiles can include any information including, for by way of example not limitation:

Application Permissions
        Location and GPS Permissions
        Identity Permissions
        Camera Permissions
        Media Permissions (Access photos, videos on device)
    Initial Sign Up information
        Phone Number
        Email
        Name (First, Last)
        Password
    Additional Collected Information for Advertising
        Credit Card Data
            Collected from user upon first in-game purchase
        Address
        Age
        Gender
        Occupation
    Note that in some embodiments, a user can be rewarded with points for submitting additional data points In a further embodiment, the social networking engine 384 enables location-based check in functionality at real world locations or places for human users. For instance, such check in behavior can unlock or facilitate certain actions in the AR environment. Example embodiments of activities or functionalities in the AR environment that are enabled by checking into real location include, for instance, Points/Rewards
    Users get points and other benefits when they opt to check in at a place
    Each place could have variable rewards points bonuses offered by retailer for check ins and repeat check ins.
    If you check in to a place enough it might unlock another level of the place (place in layer, or the entire layer—this can be configured by layer owner)
    A check-in can be shared with your followers as a post. It has identity, where, when and comments sections.

The social networking engine 384 further enables, supports and/or rewards social behavior amongst users of the AR environment through managing, enabling, facilitating, tracking, administering, controlling, governing, and/or recording, a variety of social actions including by way of example:

Giving
    Share a layer, place, scheduled event or object with another user

Messaging
    messaging is supported between users, for example,
        Between users who are in the same place but not friends
            This needs to enable pseudonymous interactions between avatars
        Between friends, when they are not in the same place
        The message could be associated with the location it was left at for a specific user or a group of users meeting certain criteria. The intended recipient(s) are able to access it or respond to it when at, near the location, or when meeting a location criterion.

Touching
    Virtual physical interactions between avatars
    Combat is a subclass of touching that could be enabled in the system to enable games.

Annotation
    Commenting, tagging, liking, etc.

Friending and Following
    Friend a person and get notifications
        When they are near you
        When something great happens
    Follow a layer, place or object and get notifications
        When some new object is going to be available at a place and time
        When some new quest is offered
        When various things happen there (someone wins a prize, etc.)
        following of users, experts, celebrities, etc. using mini celebrity/celebrity status
        social features between users include follower/follow mechanics. For instance, the growth of social networks in the AR environment can be associated with mini celebrities forming around a topic and big ones (Kardashians, Lakers, Lebron James, etc.) taking over large pieces of a service. Users can see or follow the moves of a Kardashian through the AR environment and follow, hear or see what the Kardashian saw. This layer can be used for promoting content/coupons.

Authoring
    Users should be able to make content easily and leave it in layers they have permission to publish to.
    By default this would be their own layer, the public layer, and any groups they belong to.

Filtering
  see what other users have viewed, purchased;
  see what friends have viewed;
    filter user by friend status
    filter user by distance from me
    filter by system defined 'similar user' based on in application (or outside app) behavior
Additional embodiments of location-based or location-aware activities or functionalities in the AR environment that are enabled (e.g., by the social networking engine 384 and/or the location detection engine 314) by checking into real location include, for instance,
  Users can drop Notes/comments about the place for their followers.
  These could be hints of what to do there, or reviews, suggestions for what to buy etc. They could have ratings, polls, photos attached. They can include discussion threads.
  Imagine a celeb publishing content for their followers from where they are. This can be redeemed by followers at those places or anywhere—depends on the policy (e.g., as determined by the policies and permissions module 318 of the provisioning engine 316).
  This could create a twitter and foursquare type of chatterbox and provide social reward (visibility, vanity) to people who check in.
  User can see reviews and comments by people they follow via the Message Board object at place.
  Message Board opens up into a space like the backpack—arranging the threads around a user etc. This could be superimposed over a rendering of the real world place rendered as an AR environment accessed using a client device (e.g., a client device as illustrated in FIG. 4A and FIG. 4B).
  Backpack in the AR environment and its sub-components (e.g., as illustrated in the example user interfaces of FIG. 2G and FIG. 2H)
  a user can levitate or change state of consciousness to shift their attention, view mode, and/or avatar between augmented reality/mixed reality (e.g., AR/MR) and virtual reality (VR) for any real place.
  layer owners can also offer special frequent visitor or VIP customer benefits (special VOBs or special points rewards) to visitors who check in to specified physical places/locations. The advertising engine 362 can enable advertisers like merchants, brands, or retailers to buy through us. In one embodiment, the host server 300 (e.g., via the incentive management engine 366 and/or the monetization engine 362) runs the back end for local rewards programs.
Embodiments of the social networking engine 384 further enables a spectator view or a celebrity view in or via the AR environment. For example, in the spectator or celebrity view, a human user can, via the AR environment, observe and interact with a world or place through the viewpoint of a celebrity, public figure, an organization, or brand. The spectator view or the celebrity view as administered or deployed by the social networking engine 384 can include the following example features:
  New way for consumers to engage with celebrities and brands.
  View different labels or information based on that celebrity/spectator "filter"
  Filters could be sponsored by the celebs favorite brand(s) or their current sponsors.
  In some embodiments, followers can navigate the user interface of the AR environment to places depicted in the AR environment where the celeb/sponsors/agency/public figures have published content (e.g., VOBs) that they would like users to see while in Spectator/Celebrity layer.
  A follower can explore the person of interest's view of a place via subscribing to view their layer as they move around in the physical world.
    ex. could tag or note their favorite places, add their tips and comments and observations at places, their photos or videos of their experiences in those places, etc.
  In some embodiments, Users can post content or virtual objects to their subscribed layers, like they do with social networks,
    Establish a friend & follow structure (publish and subscribe model) between users and layers and their posts (which are either other users or they can be groups in a social network and brand pages—layers created by someone to market or promote ideas or brands)
In a further embodiment, the host server 300 (e.g., via the social networking engine 384) builds and maintains its own social graph based on various relationships, actions, reactions and/or interactions that are initiated or occur in or via the AR environment through integration with real world entities, physical places, physical objects, humans and/or things.

The host server 300 (e.g., via the applet engine 312) can also integrate with third party networks such as Facebook, Twitter, and others, in order to propagate through third party social graphs and extract any metadata For example, the social networking engine 384 can enable human users to connect any of their external accounts (e.g., email, social networking, third party ecosystems via Google, Android, Apple, Facebook, Twitter, Windows/Microsoft, etc.).

The host server 300, for example, via the social networking engine can then publish or reflect user behavior or actions in the AR environment to third party services or platforms such as Facebook posts, Tweets, messages, emails, texts, multimedia messages through a third-party platform, etc. to their friends or any other entity having proper permissions. These posts can further include viral links such as "join me on here" links/calls to action. There can also be a third party plug in app such as a Facebook app for the AR environment hosted by server 300 which enables users to launch the AR environment from third party applications or sites and post from the third-party app or sites into the AR environment.

Examples of third-party application connectors (add support for viewing, posting, sharing VOBs for specific content types from other apps within the AR environment, and for posting AR environment content or objects out to third-party apps) can include: for exampleoPhotos FacebookoFoursquareoYelpoSnapchatoYouTubeo-TwitteroAmazonoTripAdvisoroGoogle SearchoGoogle LocaloGoogle News
  AR Commerce Platform
  AR Rewards
    A points based rewards engine in Aura for rewarding user behaviors
  AR Advertising
    Buy and run ad campaigns across one or more places in AURA
    Display ads, offers, coupons, gift cards, virtual gifts, and other treasures can be posted as campaigns to drive engagement at places
  AR Shopping
    View products in physical world via the AURA lens and learn about them, buy them, comp
    Comparison shopping via AURA Features of the social networking environment as facilitated by the social networking engine 384 in the AR environment can further include:

'Auras'

Public Aura
- Profiles of users (people, brands, groups) that they can construct and personalize, with avatars and auras etc.

Walls
- People can put an item on your wall and others can see it too. This gets you to look at your wall and moderate the content from others.

Private Aura
- What you show of yourself to specific people or groups

Personal Aura
- What you see about yourself that is only visible to you

Connections

Following of user, brand or group to see their public posts (posts in this case are objects placed into the world)

Friending of user, brand or group to communicate and see their private posts

Inboxes
- Users, brands, and groups have the equivalent of walls or inboxes where others can submit things for them to see and potentially share Search Timelines Public timeline—events, activities or other triggers happening within distance of a place Filtered timeline—events, activities or other triggers s happening within distance of place, for audience or posted by someone, of an object type, etc.

Personal timelines of notifications for events in the system (items posted by people they follow or friends, items posted near their location, notifications from the app, Social Actions Messaging Poking/touching Posting
- The ability to post an object (from an ontology of object types—might include web content, photos, videos, from outside our app) to a person, group, place or thing—posts can be world locked (shows up only in certain places) or person locked (shows up wherever the person is), or both Liking of items Commenting on items Bookmarking, Favoriting items Collecting items, when they are collectible (saving the item)

Sharing items (reposting to public or private timeline or sharing with a specific person or group)

The gaming engine 388 of the activity management engine 380 is able to provision, monitor, facilitate the gamification of the AR environment. The gaming experience provided by the gaming engine 388 can be through creation of the gaming environment and experience by the gaming engine 388. The gaming engine 388 can also provide a plugin to a third-party gaming service or platform to enhance third party games with features and capabilities provided by the host server 300 as described herein. In addition, the third-party gaming platforms can integrate third party services or applications with the host server 300 for access via the AR environment or via the third-party platform.

Examples of games administered by the gaming engine 388 via the AR environment can be white labeled or they can be branded, can include:

Scavenger Hunt
- Skinnable, customizable scavenger hunts
- Capture the Flag Template
- Augmented capture the flag game in physical places Pac Man Game in Aura
- User can be a pac man running through cities or places getting food and evading monsters AR Risk or Monopoly Game
- Compete to get real places in the physical world Assassin Game Template
- First person shooter style game—human user can be assigned another player to kill; teams etc.

The gaming environment provided by the gaming engine 388 and any other gamification functions or game-like activities in the AR environment, can include example features such as:

AR Based Social Metagame Framework and App
- Driven by simple repeatable UGC behaviors (vanity, social sharing, etc.)
- User profile vanity game (augmented self)
- Photos and photo sharing—augmented photos and videos
  - AR photos and videos—Users can take and share photos and videos of augmented experiences using Aura; just like taking photos of real people with camera
- Content sharing and social messaging
  - Post objects into AR (outside content, photos, videos, 3D VOBs from growing library)
- Discovery and search
- Self-Serve authoring, rewards, commerce, and advertising engines built-in so it can scale Embodiments of the presently disclose AR environment further include example features:

AR enabled Pets—Intelligent virtual pets in the AR environment, which can be in part implemented with machines with artificial intelligence, including machine-implemented human intelligence abilities such as emotional intelligence, emotions and personality. The AR enabled pets can also be able to learn
- AR pets can be a game that users can play with; brands can also be involved in this initiative
- Users can see, train and interact with very realistic or visual intelligent avatars in the AR environment
- The AR enabled pets can interact and move in your physical environment—the room or place you are in—just like a robot would, but they are completely synthetic
- Users can see their own virtual pets and you can see virtual pets from others in the AR environment
- When multiple pets are in the same place they can see and interact with each other too
- The host server 300 (e.g. the gaming engine 388) can provide special digital/virtual places in the AR environment for training them, fighting them, racing them, enabling them to play together, etc.
- The host server 300 (e.g. the gaming engine 388) can create Competitions with rewards for pets that do things (perform tricks, solve mazes, cage fighting, racing, other games, etc.)
- The host server 300 (e.g. the gaming engine 388 and/or the commerce/marketplace engine 360) can create a Marketplace for buying virtual goods to construct and customize your pet; also a place to buy and sell trained pet brains Third party virtual pet add-ons can be sold in the marketplace administered by the commerce/marketplace engine 360

Educational and other brain downloads can be purchased and added to virtual pets to give them more knowledge and behaviors Virtual pets can be downloaded into physical robots The tech used for AR Pets can also be used to:

Power NPCs in the AR environment (branded experiences, games, etc.)

Power virtual assistants and avatars in third party VR apps and games

Power third party autonomous devices (robots, cars, etc.)

One embodiment of the host server 300 further includes an events and notification engine 372. The events and notification engine 372 can be any combination of software agents and/or hardware modules (e.g., including processors and/or memory units) able to detect, track, monitor occurrences of triggers and/or events and/or activities that occur in the real physical world and/or in the AR environment.

The events and notification engine 372 can further notify relevant or appropriate entities that are users or participants of the AR environment (e.g., human users, human user groups, companies, organizations, brands, merchants, advertisers, etc.). Notifications can be sent based on follower or subscriber relationships, and can be further send based on any applicable permissions or rules (e.g., a determined by the policies and permissions module 318).

In general, a consumer app (e.g., as accessed from a client device as shown in the example of FIG. 4A-4B) enables user to monitor and receive notifications via the AR environment for triggers, events, occurrences, or other entities of interest. The events and notification engine 366 can enable further search, follow and/or subscribe features to generate and push various types of (filterable) live and historical notifications about what is happening there.

Example features and capabilities of the notification engine 366 include:

By default the engine 366 can monitor multiple layers (e.g., 2 layers, 3 layers etc.) of activity in every physical location in the real world Personal (their own private layer)

Public (the public layer that everyone can see)

monitor other locations and layers given appropriate permissions

Some locations and layers might have a policy that they cannot be monitored by users who are not present in the location at a specific time, and/or by users who lack certain permissions In the user interface (UI) of the client/consumer app (e.g., as accessed from a client device as shown in the example of FIG. 4A-4B), the monitoring experience can include different modes. An example of the different modes can include:

Passive mode: the user's device is in their pocket or on a surface and they are not looking at it.

When in this mode, the consumer app (e.g., as accessed from a client device as shown in the example of FIG. 4A-4B) can notify the user of various notification events they are interested in being notified about in a passive mode.

The consumer app (e.g., a client application, as accessed from a client device as shown in the example of FIG. 4A-4B), in accordance with embodiments of the present disclosure can determine when it is in passive mode and automatically adopt the policies for that mode, and it can sense when it moves into active mode (user has not viewed, interacted with or otherwise accessed the consumer app (in n seconds, consumer app (is in background, consumer app is closed, device is in pocket or lying flat on surface etc.)

Active: the user is actively looking at or interacting with or otherwise accessing the AR environment hosted by the server 300 via the consumer app In active mode the notifications policies could be different (more intrusive or proactive)

In active mode, if the user is looking at or otherwise active in the disclosed AR environment, notifications can happen in the user interface of the client application, in addition to or in lieu of notifications on the device outside the user interface.

One embodiment of the host server 300 further includes a search engine 350. The search engine 350 can be any combination of software agents and/or hardware modules (e.g., including processors and/or memory units) able to index, contextualize, process content and objects including virtual objects in the AR environment to enable search.

In one embodiment, the search engine 350 (e.g., an indicing module) can generate, update, maintain, or query a global directory and index of content, objects, virtual objects, users, and/or participants of the AR environment. In some instances, the indicing of objects can be performed on the client device (e.g., a client device as shown in the example of FIG. 4A-4B) to alleviate potential processing and storage loads on the server 300 to implement a distributed and scalable backend.

One embodiment of the host server 300 further includes a browsing/discovery engine 352 (hereinafter 'engine 352'). The browsing/discovery engine 352 enables users or participants of the AR environment to search, browse, or view any layer, physical place or virtual location in the AR environment to locate, find, discover objects, virtual objects, things, places, human users, actors, entities or other participants in the AR environment.

The search results can be relevant to a search query. In addition, the search engine 350 and/or the engine 352 can further filter results for contextual relevance (e.g., temporal, spatial, social, etc.). Furthermore, the search results generated by the search engine 350 and/or the engine 352 can be subject to permissions of the user/actor/participant who is searching. In one embodiment, users can search in the layers in which they have the appropriate permissions. For example, a given user can have permissions to search in the Public Layer and their Personal Layer.

In one embodiment, the search engine 350 (e.g., via the indicing module) can index and/or searches for objects (e.g., VOBs) in the Present time frame, for members of a layer. Admins of a layer can search for in additional time frames (e.g., the Past and Future frames) of their layer. By keeping the Present free of clutter from Past and Future frames, the indicing module can potentially reduce the indexing and search load on the Public layer. One embodiment allows users to access past or future objects associated with a given place. Some objects are hidden from search and can only be seen by users who are physically proximate to the object or within a place, and/or who have permissions. This means that it is possible for the user to search for objects that are outside the user's current location, but they will only see objects that allow that.

The browsing/discovery engine 352 enables a human user, actor or other participant to explore and/or discover what's in a physical place, or in a virtual location depicted in the AR environment, and/or around a user, without searching for anything specific. The browsing/discovery engine 352 can, for instance, search for everything in a relevant region and rendering the results in various ways. Embodiments of the present disclosure encourage users to physically be in places in order to see what's there and participate in what's happening there.

In some instances, the search engine 350 and/or the engine 352 allow or enable objects to be perceptible (searched or event visualized) from anywhere and can only be collected or interacted with by proximate users. For example, an advertiser might want the fact that a coupon is available outside their physical store to be discoverable from anywhere, but the coupon can only be attained by a user who is physically proximate or have a location data that meets a criterion relative to the coupon at the store. This advertises the coupon and incentivizes users to show up physically to get the coupon. The host server 300 can charge advertisers (e.g., via the monetization engine 362) for distance reached, or to reach specific geographical locations. Sales/promotional events can be broadcast by the host server 300 (e.g., via the advertising engine 364) to select users or users within or qualified to be within a certain geographical area or certain distance from the event.

One embodiment of the host server 300 further includes a filter engine 354. The filter engine 354 can be any combination of software agents and/or hardware modules (e.g., including processors and/or memory units) able to filter primitives of the AR environment including, human users, actors, NPCs, any other participants, entities, objects, content, virtual objects, places and/or things whether virtual (e.g. digitally synthesized) or existing in the real world.

The filter engine 354 uses metadata associated with all actors and participants to perform a filter process as a result of search, browsing, querying and/or discovering in the AR environment. In one embodiment, the user interface of the consumer app (e.g., as accessed from a client device as shown in the example of FIG. 4A-4B) can show the user two layers: Public and Personal, in the present time frame, as a default setting. Additional layers can be shown by configuration of the layer owner or admin user, for example. Objects associated with time frames other than the present time frame can also be shown to users who have for example, specific permissions based on their identity, their membership level, whether they are celebrities/experts, etc.

In general, a public layer is potentially noisy with objects, virtual objects, and/or avatars. The filter engine 354 thus enables users to filter a view in a user interface of the consumer application. The filter parameters that can be applied by the filter engine 354 in response to user selection, can include any number of, by way of example not limitation:

price
discount percentage
discount/promotion/coupon expiration
discount length of time
button for expiring soon/expiring today
search radius
product category (filter button)
Service category
further filter by feature under product category
filter by relevance to friends/connections
wish list
shopping list
wish list shopping list reminders notifications
further recommendations based on shopping list, browsed items ('you may like' or 'other users also viewed')

In one example, by default, users can generally see all Promoted VOBs. The perceptibility, visibility, audibility or accessibility of promoted VOBs generally correspond to the price paid for it. The VOBs can be contextually relevant to the place location and/or user.

In a further example, the price paid to promote a VOB can determine the local proximity that the object can be sensed from. So, if you pay more to Promote a VOB (e.g., as assessed by the monetization engine 362 or the advertising engine 364), then human who are farther away from the physical location with which the VOB is associated can perceive, see, hear, or access it, thus having greater perceptibility for more users.

In addition, if there are many VOBs in the same place, in a cloud or list or grouping of VOBs, when a human user looks at that place, or searches it, the VOBs that are associated with more Promotional budget should be in front of those that have less budget. In other words, if there is a sphere around a location in which there are many VOBs, the more budget a VOB has the closer to outside surface of the sphere (or cloud or jumble) it would appear.

Similarly, if the host server 300 display VOBs in a list, the Promoted VOBs would display higher according to budget.

Human users can toggle to view in a user interface (e.g., a UI of a client device as shown in the example of FIG. 4A-4B) Promoted VOBs in a place or to view other select VOBs, Users may or may not an option in the user interface to exclude the Promoted VOBs from the view. For example, paying users, depending on level of membership or subscription can pay to access the AR environment without advertisements and/or without any or some promoted VOBs.

An example embodiment includes a slider in a user interface (e.g., a UI of a client device as shown in the example of FIG. 4A-4B) might enable the user to filter VOBs in a place by Promoted status and/or other parameters (created date, modified date, number of likes, number of comments, number of followers, etc.)

One embodiment of the host server 300 further includes a browser management module 356. The browser management module 356 can be any combination of software agents and/or hardware modules (e.g., including processors and/or memory units) able to administer browsers for various types of devices or interfaces for access, observation, or interaction with the disclosed AR environment.

For example, the browser management module 356 can create, modify, deploy, manage a mobile browser, web browser, a mobile application or a desktop/laptop client for access and use of the AR environment. Inside the browser is a set of user attributes that can function across any or all environments deployed by the AR environment—shopping, gaming, entertaining, dining, socializing, work, etc. In one example, the browser experience is delivered to be gamified (e.g., Black Mirror episode).

One embodiment of the host server 300 further includes the commerce/marketplace engine 360. The commerce/marketplace engine 360 can be any combination of software agents and/or hardware modules (e.g., including processors and/or memory units) able to administer a marketplace in the AR environment. The engine 360 can also facilitate transactions relating to virtual goods, virtual services, and/or goods and services in the real world via the AR environment. In general, the virtual goods/services and the real world goods/services can be purchased using fiat currency or any digital/crypto currencies.

In one embodiment, the engine 360 provides or facilitates a general shopping experience in the AR environment. Moreover, the engine 360 can further enable brands, merchants, retailers or advertisers to create their own layers, for example, for a fee (e.g., as assessed by the monetization engine 362). Characteristics of the commerce/marketplace environment as provided in the AR environment by the commerce/marketplace engine 360 include, for example:

Commerce is enabled in the network between users to buy and sell virtual goods via VOBs, and to use VOBs as passes for transactions (for example to use a Coupon or Gift Card to buy something)

One embodiment includes peer to peer AR-enabled classified ad marketplace: transactions of physical goods/used goods/services between users User can select items of interest, both vendor goods and goods offered from other users can pop up when search criteria are met (distance, price etc.)

Users can create VOBs for their items/services with photos videos, potential buyers interact with items with ability to visualize in their home, car, wear the item, etc. This could be an enhanced user account, paid account or paid feature or we could simply take a cut of the list/sales price One embodiment includes using customized cryptocurrency or supporting existing crypto currencies for conduct transactions via the AR environment Users can participate when nearby or remotely. The engine 360 can enable auctions like sales events via the AR environment. Merchants would welcome it as it allows a brick and mortar store to reach customers it otherwise wouldn't.

In one embodiment the host server 300 is coupled to or includes a virtual asset store which can operate or manage the virtual asset store repository 326. The virtual asset store can feature, for, example:

The virtual asset store of the host server 300 can sell avatar accessories, mantras/spells, power ups, other VOBs that a human user can share, give, or create or make for others. Embodiments of the present disclosure include one-time special objects (one of 10 created by a famous artist, or a bouquet of special animated flowers). Special objects can also include templates for user purchase in the virtual asset store that allows users to mint objects—like make a cool animated hyper cube object for carrying my comments at a place (e.g., a cool envelope). Limit edition objects can be collector's objects in the future. The virtual asset store can assign serial numbers to virtual objects, and in particular the limited-edition objects.

When users open or access envelopes or content that are VOBs, the user can go into either a set of applets to interact and consume the VOB, or it can open a specific applet for that object—like virtual view or a special app.

Powerful wizards can manifest in other places, put objects in other places.

Pay people to let you inhabit them in AR or real mode in a remote place. They do your bidding.

The host server 300 can provide a marketplace at each place in each layer. These are special zones where there is a lot of activity. Layer owner or admin can set prices or auction price.

Through the monetization engine 362, layer owners can sell space/visibility/publishing rights to advertisers/users in their layers. As such the host server 300 enables Layer owners and creators to monetize their layers. Among other things this gets is a lot of content because it rewards content creators. It also enables influencers, publishers or brands to monetize their audiences. The host server 300 gets a cut of any sales or fees.

Layer owner can attach a flat fee or auction module price to each action in each zone/place. These have a radius and cannot overlap in the same layer.

One embodiment of the host server 300 further includes a rendering engine 368. The rendering engine 368 can be any combination of software agents and/or hardware modules (e.g., including processors and/or memory units) able to draw, illustrate, paint, render, depict, playback, a user interface of the AR environment and to update various entities of the AR environment in accordance with actions, interactions, reactions that have occurred in the AR environment.

The rendering engine 368 can also present, generate, duplicate, reproduce, record, photograph, draw, illustrate or present a scene or other representation of a real environment associated with a physical location in the real world. The scene or other representation of a real environment is generally presented in a photorealistic manner in the AR environment.

One embodiment of the rendering engine 368 includes an avatar module 370. The avatar module 370 can generate, update, modify, delete, render, illustrate, design, present, and/or depict avatars (e.g., 2D or 3D and/or 360 degrees) representing users (e.g., human users, NPCs, other actors, etc.) to other users or actors in the AR environment. Via the client application, the AR environment also enables users to interact with avatars that represent other human users, entities, or actors in the AR environment. Example characteristics of avatars can include, by way of example:

Avatars can be a sub-class of VOB that represent unique user accounts in the disclosed platform Special actions can be enabled between avatars:
Messaging: synchronous and asynchronous messaging
Transactions: buying and selling and trading objects
Friending and Unfriending
Sharing identity and contact information Interactions between avatars can have different proximity rules than between avatars and objects.
Users can only interact with objects that are close to them
Users can only interact with avatars for other users they are not yet mutually connected to when they are proximate to each other
Users should be able to interact with avatars of other users they are socially mutually connected, even when they are no longer proximate.

Users avatars may appear differently and/or have different attributes on different layers of the app
Layers may augment user avatars with specific content for those layers. For example, in the layer for a clothing brand, users may outfit their avatars with virtual clothing from that brand. They can configure AR environment to show that only in a select layer or in the public layer or all layers.

In a further embodiment, the rendering engine 368 determines placement or location of an object (e.g., a VOB) in the AR environment. Object location or placement in the AR environment (e.g., as can be observed via AR view in the user interface), can be placed based on, for example:

Size
There can be a maximum size of an object, which is adjustable
The higher or highest paying objects are the maximum size; other objects can be scaled down based on price paid relative to it Space Around Object (keaming)
Brands pay for air rights surrounding object
Position/Placement
Eye Level for location priced more
Ground/sky less valuable
Object Properties
Distance from object to see object
Distance from object to interact with object
Hidden objects
Objects that are small or invisible, or very hard to find; for treasure hunts and easter eggs
Advertising on Surfaces
Mapping ads to surfaces
Ads floating in space
Gameplay Group
Object avoids players
Groups must surround objects to capture
Secret Panels in surfaces
A secret door or panel on a surface—find it, open it with a key or solve the puzzle, and then it functions like a chest—there are things in it you can get
Some of them are hard to find—you might have to touch the wall
Mapping Objects onto Clouds, Places in the Sky, Trees
Reward people for traveling on foot a certain distance or path over a certain time—rewards running One embodiment enables users of the client app to take pictures of things in the world and label them and submit them as training data for the AI/learning engine 322 to perform machine learning to recognize the objects (e.g., by the AI/learning engine 322). For example, users can submit images of the same thing from different angles, in different lighting, etc. The disclosed system can learn about the object across these. This can crowdsource training of the host server 300 to do object recognition.

In one embodiment, the AI/learning engine 322 can perform training/machine learning on items in a user's wish list or shopping list in any platform or service in which they have added notes. The host server 3000 (e.g., via the AI/learning engine 322) can provide the option for users to submit these notes to the host server 300 or to prompt them with additional fields to be filled out with incentives. The host server 3000 (e.g., via the AI/learning engine 322) can further prompt the user to add data to items, things, or objects that the host server 300 knows they are interested in or that they care about.

In a further embodiment, the AI/learning engine 322 can deploy a training module or applet that launches when a user wants to train the system. This applet would enable the user to take many images of something and label them with one or more labels for the object, as well as any relevant metadata. Users, through the training module or applet can submit video as training. Within a still or moving image, users could select and label one or more things.

FIG. 3B depicts an example block diagram illustrating the components of the host server 300 that seamlessly integrates mixed realities with physical reality for enhancement of web, mobile or other digital experiences, in accordance with embodiments of the present disclosure In one embodiment, host server 300 includes a network interface 302, a processing unit 334, a memory unit 336, a storage unit 338, a location sensor 340, and/or a timing module 342. Additional or less units or modules may be included. The host server 300 can be any combination of hardware components and/or software agents for integration of augmented, alternate, virtual and/or mixed realities with physical realities for enhancement of web, mobile and/or other digital experiences. The network interface 302 has been described in the example of FIG. 3A.

One embodiment of the host server 300 further includes a processing unit 334. The data received from the network interface 302, location sensor 340, and/or the timing module 342 can be input to a processing unit 334. The location sensor 340 can include GPS receivers, RF transceiver, an optical rangefinder, etc. The timing module 342 can include an internal clock, a connection to a time server (via NTP), an atomic clock, a GPS master clock, etc.

The processing unit 334 can include one or more processors, CPUs, microcontrollers, FPGAs, ASICs, DSPs, or any combination of the above. Data that is input to the host server 300 can be processed by the processing unit 334 and output to a display and/or output via a wired or wireless connection to an external device, such as a mobile phone, a portable device, a host or server computer by way of a communications component.

One embodiment of the host server 300 further includes a memory unit 336 and a storage unit 338. The memory unit 335 and a storage unit 338 are, in some embodiments, coupled to the processing unit 334. The memory unit can include volatile and/or non-volatile memory. In accordance with embodiments of the present disclosure, the processing unit 334 may perform one or more processes related to integration of augmented, alternate, virtual, and/or mixed realities with physical realities for enhancement of web, mobile and/or other digital experiences.

In some embodiments, any portion of or all of the functions described of the various example modules in the host server 300 of the example of FIG. 3A can be performed by the processing unit 334.

FIG. 4A depicts an example functional block diagram of a client device 402 such as a mobile device that presents, to a human user, mixed realities integrated with physical reality for enhancement of web, mobile or other digital experiences, in accordance with embodiments of the present disclosure The client device 402 includes a network interface 404, a timing module 406, an RF sensor 407, a location sensor 408, an image sensor 409, a filter module 412, a user selection module 414, a user stimulus sensor 416, a motion/gesture sensor 418, a view selector 420, an audio/video output module 422, and/or other sensors 410. The client device 402 may be any electronic device such as the devices described in conjunction with the client devices 102A-N in the example of FIG. 1 including but not limited to portable devices, a computer, a server, location-aware devices, mobile phones, PDAs, laptops, palmtops, iPhones, cover headsets, heads-up displays, helmet mounted display, head-mounted display, scanned-beam display, smart lens, monocles, smart glasses/goggles, wearable computer such as mobile enabled watches or eyewear, and/or any other mobile interfaces and viewing devices, etc.

In one embodiment, the client device 402 is coupled to a virtual object repository 431. The virtual object repository 431 may be internal to or coupled to the mobile device 402 but the contents stored therein can be illustrated with reference to the example of a virtual object repository 130 described in the example of FIG. 1.

Additional or less modules can be included without deviating from the novel art of this disclosure. In addition, each module in the example of FIG. 4A can include any number and combination of sub-modules, and systems, implemented with any combination of hardware and/or software modules.

The client device 402, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4A, the network interface 404 can be a networking device that enables the client device 402 to mediate data in a network with an entity that is external to the host server, through any known and/or convenient communications protocol supported by the host and the external entity. The network interface 404 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

According to the embodiments disclosed herein, the client device 402 can render or present an augmented, alternate, virtual and/or mixed reality integrated with the physical reality for user perception, access, or engagement.

The alternate reality environment can also be rendered at least in part via one or more of, a mobile browser, a mobile application and a web browser, e.g., via the client device 402. Note that the alternate (e.g., mixed reality or augmented reality) environment can be rendered in part of in whole in a hologram, for example, in 3D and in 360 degrees, via the client device 402.

In one embodiment, the alternate reality environment is rendered at least in part via a mobile device 402 having a rear facing camera and/or a front facing camera. The interaction with the virtual object in the alternate reality environment via a field of view of the rear facing camera can for instance, be triggered through initiation of physical action in the field of view of the rear facing camera. The physical action in the field of view of the rear facing camera, includes, by way of example movement of a limb (e.g., fingers, arms, legs, torso, head, etc.) of the human user or another human user in the field of view of the rear facing camera of the mobile device.

In addition, the interaction with the virtual object in the alternate reality environment can be initiated by detecting, using the front facing camera, one or more of: winking or rate of winking of one or more eyes of the human user; eyelid motion of the one or more eyes of the human user; field of view of one or more eyes of the human user; iris movement or eye ball movement of the one or more eyes of the human user; pupil dilation of the one or more eyes of the human user.

The client device 402 can provide functionalities described herein via a consumer client application (app) (e.g., consumer app, client app. Etc.), The consumer application includes a user interface that enables users to interact with VOBs and other users, in physical locations and times. Examples of user interfaces of the client app are illustrated in FIG. 2A-FIG. 2L. The client application can include a mobile application. The client app can also include a desktop client and/or web client.

One embodiment includes monetizing the B2B part by providing extensibility of the client app to third party entities. For example, third party entities (e.g., retailers, merchants, advertisers, promoters, vendors, etc.) can, via the consumer application, specify, define or customize the experience of their target clientele. The system can allow for different types of modifications or different levels of customization at higher paid levels. In some embodiments, the system can offer up valuable learnt user information and feedback to third parties to facilitate their modifications.

Embodiments of the present disclosure includes the view selector 420 which enables activity depicted or presented in the AR environment via the client device 402 to be perceived, viewed and/or accessed in a place in a number of ways. Examples of different access or view options at the client device 402 include by way of example not limitation Map View (for Longer Range)
- In one embodiment, Using Google Maps or some other maps API, show the locations of avatars, named places, and VOBs that are visible from a distance.
- Show indications of crowds, live activity levels or popularity of the AR environment in various places, numbers of VOBs etc. These can be summarized with symbols or color or animations, for example, to indicate that there is more happening in certain places.
- One embodiment includes identifiers of VOBs that cannot appear in "dangerous" places, such as in the lanes of streets, identifying dangerous locations or traffic to warn users or to prevent users from getting harmed, such dangerous areas can be marked with a different color in the maps view, for example. In a further embodiment, artificial intelligence techniques paired with maps data allows hazardous or dangerous areas to be identified and presented via the client device 402

Radar View (What's Right Around the Vicinity of the User's Device)
- This shows what visible objects and avatars (for a user) are in a named place or within a certain distance from the user's device, in one embodiment.
- It can indicate that objects and avatars are moving or changing
- It can indicate some kind of "heat" for objects that are more or less popular
- It can show avatars and crowds as well (this could be toggled on/off)
- Some types of objects can be interacted with via this interface, even if they are not close enough to be interacted with in Goggles view.
- Objects that can only be interacted with in Goggles view would allow that when close enough to the user, or would remind user to move closer in order to interact.

Goggles View (see What the Device is Pointed at), for Example
- This view can depict or present objects that are within a close visual pointing distance from the client device 402
- While other views may show locations of VOBs, actual interactions with VOBs and other avatars typically or primarily occur in goggles view.
- Goggles view can enable game like interactions (touching, shooting, etc.).
- There can be a certain gestural language for basic kinds of interactions like Touch, Get, etc. For example, to 'Get' an object, the consumer application provides a way to grab it with the client device 402 and/or to view it within the screen of the device and get it with a swipe or gesture.
- Some VOBs are only or primarily visible in Goggles view. This encourages and rewards exploration of the near environment in Goggles view.

One embodiment of the client application includes a user interface having a slider that shows various views associated with a geographical or physical location, from real to virtual. For example, the slider can be along a side of the screen users can slide across planes in a layer. In addition, user interface elements such as sliders or other selection mechanisms can enable the user to change the view to/from AR view, map view, radar view or any other views. Additional views can be included without deviating from the scope of the disclosure.

According to embodiments of the present disclosure, the client application, as deployed via the client device 402, enables the user to interact with VOBs and/or other users who are in proximity of the client device 402. The consumer app can support various ways of interacting with proximate and non-proximate objects in or via the AR environment, according to the policies and permissions and behaviors of the objects.

The client application can also enable human users to collect objects and view the objects they have in their collection via the AR environment Human users can also follow objects and places and receive notifications from them via the consumer app. In general, the human user can control notifications by mode, context and/or type of event. The consumer app can also enable users to friend other users and manage those relationships One embodiment of the client application includes a gamified component where users identify objects of interest and edits/creates relevant metadata for submission as training data. Users can gain points which unlocks features which normally could be paid. The system (e.g., host server 100 of FIG. 1, host server 300 of FIG. 3A-3B) can crowdsource training data, content and foster participation as well (ability to crowdsource training of local object recognition).

Further embodiment of the client application can enable the user to interact with other users they are friends with, who are not in proximity (for example seeing where they are, inviting them to come to a place, sending a message). The client application can also include extensions (plugins) so that additional features and capabilities can launch from it. Note that different types of places and VOBs might launch particular applets that enable new UI and features. For example, a VOB having video can include a video player, a VOB for a game can include an applet for that game.

There can be paid tiered features for the client application. These features can also be unlocked through certain actions within the application. For example, depending on how far geographically from current location, a user can search for objects or product promotions. For instance, access of intelligent data/statistics on price trends of a product/service/merchant can be provided to paying customers/users. In addition, users can spend points to increase the power of their 'scanner' in the AR environment. For example, human users can pay a fee or spend points to have access to objects (e.g., VOBs) associated with locations that are further away than can a non-paying human user. Paying human users may be able to see objects that are hidden or in stealth.

FIG. 4B depicts an example block diagram of the client device, which can be a mobile device 402 that presents an integration of augmented, alternate, virtual, and/or mixed realities with physical realities for digital experience augmentation and enhancement, in accordance with embodiments of the present disclosure.

In one embodiment, client device 402 (e.g., a user device) includes a network interface 432, a processing unit 434, a memory unit 436, a storage unit 438, a location sensor 440, an accelerometer/motion sensor 442, an audio output unit/speakers 446, a display unit 450, an image capture unit 452, a pointing device/sensor 454, an input device 456, and/or a touch screen sensor 458. Additional or less units or modules may be included. The client device 402 can be any combination of hardware components and/or software agents for presenting, to a human user, mixed realities integrated with physical reality for enhancement of digital experiences. The network interface 432 has been described in the example of FIG. 4A.

One embodiment of the client device 402 further includes a processing unit 434. The location sensor 440, accelerometer/motion sensor 442, and timer 444 have been described with reference to the example of FIG. 4A.

The processing unit 434 can include one or more processors, CPUs, microcontrollers, FPGAs, ASICs, DSPs, or any combination of the above. Data that is input to the client device 402 for example, via the image capture unit 452, pointing device/sensor 454, input device 456 (e.g., keyboard), and/or the touch screen sensor 458 can be processed by the processing unit 434 and output to the display unit 450, audio output unit/speakers 446 and/or output via a wired or wireless connection to an external device, such as a host or server computer that generates and controls access to simulated objects by way of a communications component.

One embodiment of the client device 402 further includes a memory unit 436 and a storage unit 438. The memory unit 436 and a storage unit 438 are, in some embodiments, coupled to the processing unit 434. The memory unit can include volatile and/or non-volatile memory. In rendering or presenting an augmented reality environment, the processing unit 434 can perform one or more processes related to enhancement of digital experiences through facilitating physical and/or non-physical interaction/actions between alternate realities.

In some embodiments, any portion of or all of the functions described of the various example modules in the client device 402 of the example of FIG. 4A can be performed by the processing unit 434. In particular, with reference to the mobile device illustrated in FIG. 4A, various sensors and/or modules can be performed via any of the combinations of modules in the control subsystem that are not illustrated, including, but not limited to, the processing unit 434 and/or the memory unit 436.

Figure 5A:
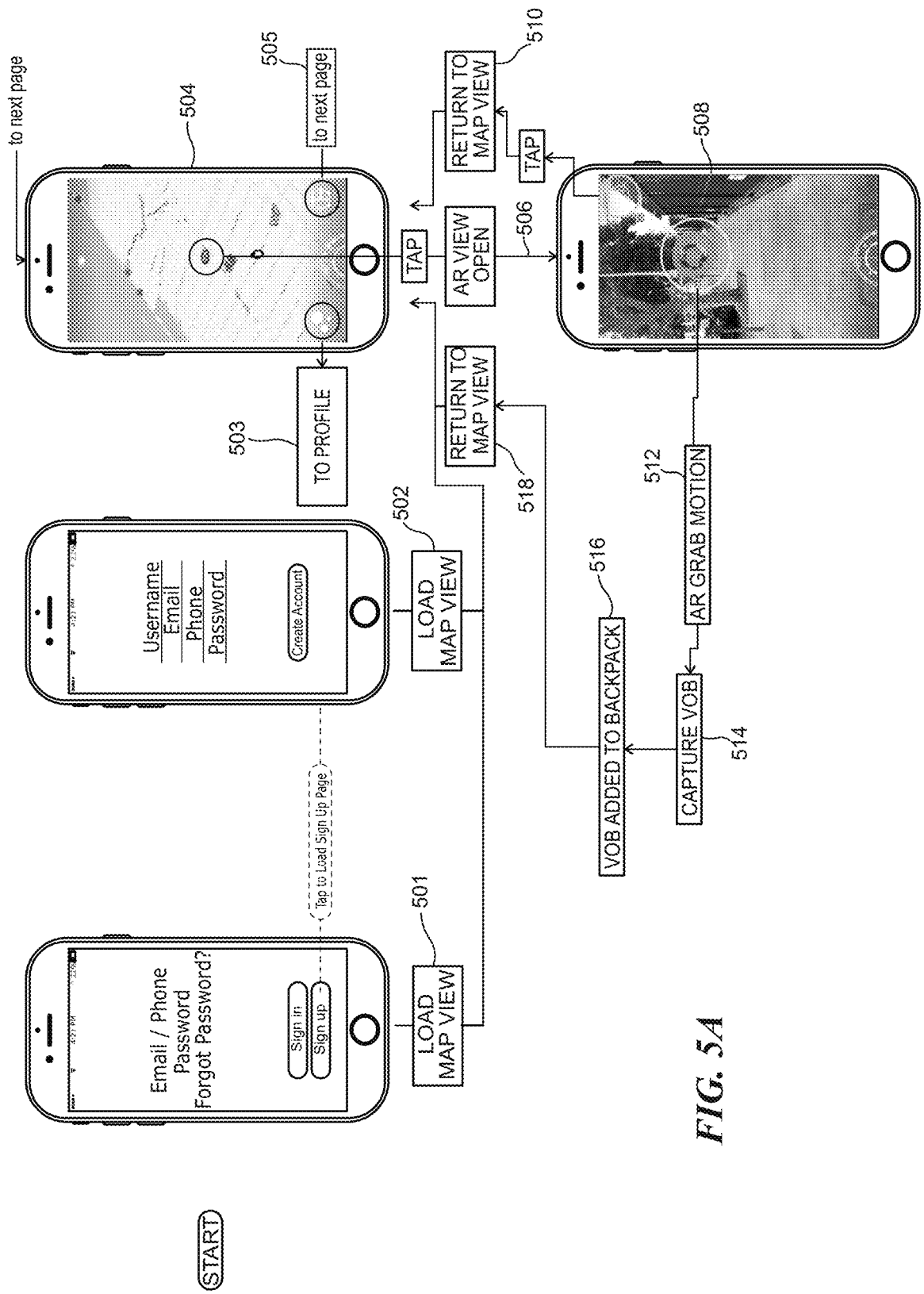
FIG. 5A-5B graphically depicts example processes for user navigation between different modes and views in the alternate reality environment through user interfaces, in accordance with embodiments of the present disclosure.
Figure 5B:
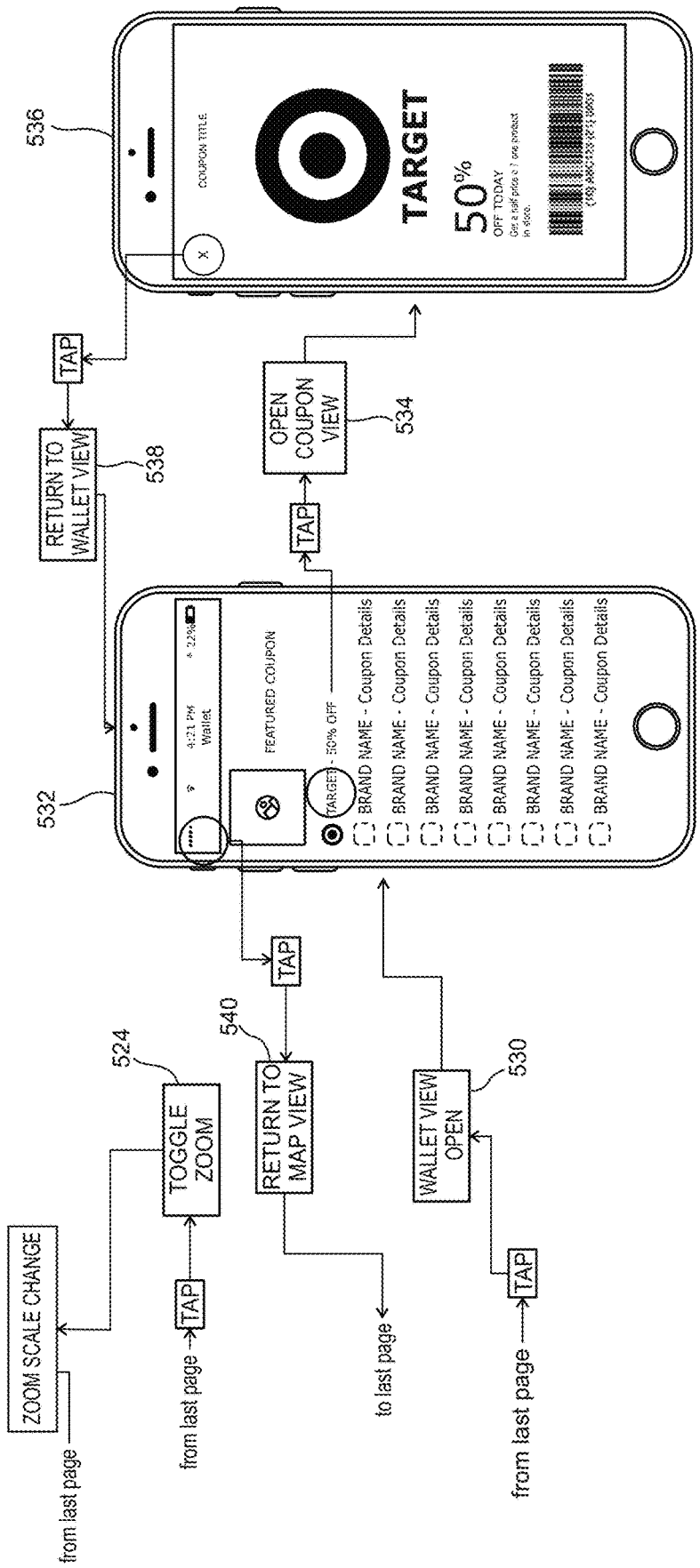

FIG. 5A-5B graphically depicts example processes for user navigation between different modes and views in the alternate/augmented reality environment through user interfaces, in accordance with embodiments of the present disclosure.

Through navigation in the user interface, a human user can access or log into the AR environment/platform and load the map view from steps 501 or 502. An example of the map view is depicted in 504. The map view 504 can include user interface features that enable access of the user's profile at step 503 or go to the next page at step 505.

Moreover, from the map view 540, the user can, for example, select via the user interface, a physical location on a map and further select to open an augmented reality view (AR view) in step 506 of the alternate reality environment, as depicted in 508. In the example AR view 508, the user can perform various actions on or interact with the objects (e.g., VOBs) in the AR environment via the user interface. For example, the user can initiate or perform an AR grab motion in step 512, capture the VOB in step 514, and/or add the VOB to the backpack in step 516. The user can have the option to return to the map view from the AR view 508 in step 510, or at step 518 after performing various actions in the map view 508 or interacting with VOBs.

In a further embodiment, from step 505, in the next page of the user interface, the wallet view can be opened in step 530. The wallet view is depicted in 532. From the wallet view 532, a coupon view 536 of the AR environment can be opened in step 534. From the coupon view 536, the user can, for example, return to the wallet view 532 in step 538. From the wallet view 532, the user can return to the map view in the example step 540. In one embodiment, from step 505, the user can toggle a zoom setting in example step 524.

Figure 5C:
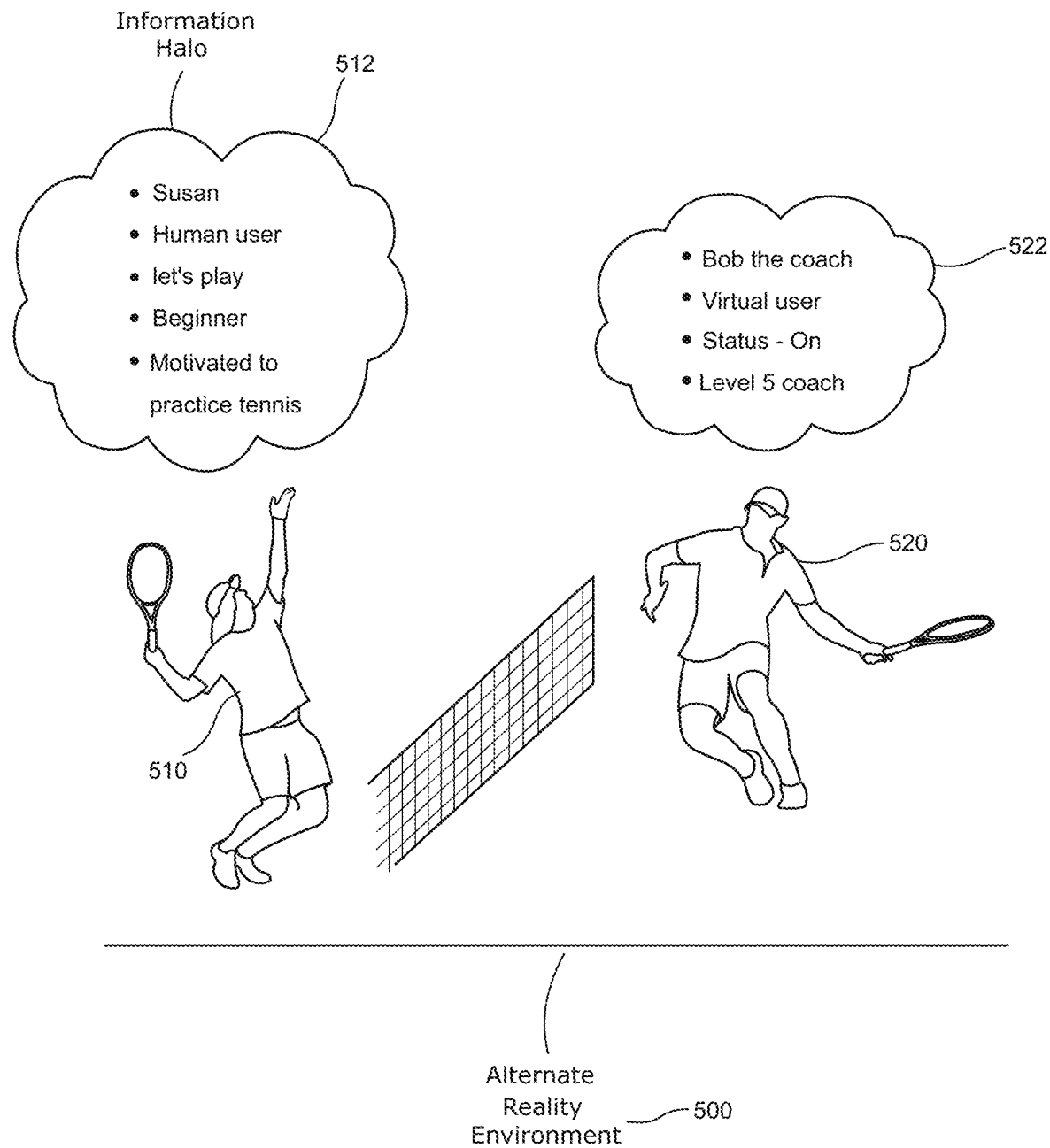
FIG. 5C depicts avatars and halos representing human users and other characters/participants (e.g. non-player characters (NPCs)) in the alternate reality environment, in accordance with embodiments of the present disclosure.

FIG. 5C depicts avatars 510 and 520 and halos 512 and 522 representing human users and other characters/participants (e.g. non-player characters (NPCs)) in the alternate reality environment 500, in accordance with embodiments of the present disclosure.

Embodiments of the present disclosure enable people to have avatars or icons or things around them that provide the users with a way for self-expression, conveying status, accomplishments, for example, via a halo or cloud with content 512 around them. Other types of icons can include, symbols, pets or tinkerbell, etc. An information halo 512 allow other users to see their status/rank, medals or achievements through a user interface of the alternate reality environment 500.

In one embodiment, a user interface includes a halo or aura of symbols, objects and stats that provide a sense of the user's status and other things. An "avatar," for example, can be an aura around a person—not a replacement for the person.

Figure 5D:
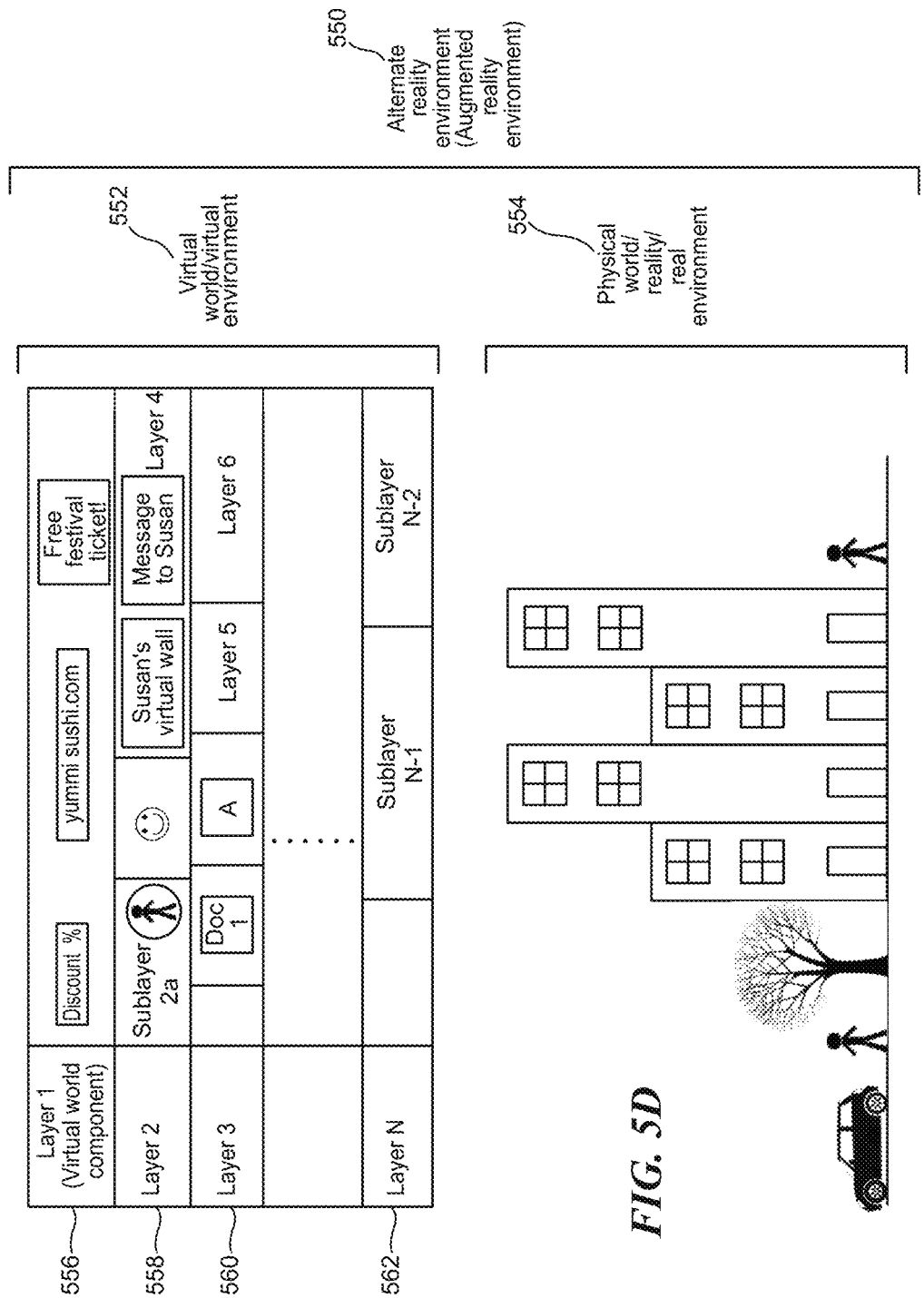
FIG. 5D diagrammatically depicts a virtual world component of an alternate reality environment (e.g., augmented or mixed reality environment, collectively referred as 'AR environment') associated with a real world location in the physical world, in accordance with embodiments of the present disclosure.

In one embodiment the AR environment 500 can augment depiction of the user with a halo and aura (e.g., information halo 512) that is visible in the AR environment through the platform. When a person (e.g., user Susan 510, or virtual coach Bob 520) is viewed in the AR environment—an aura of information 512 becomes visible. In accordance with embodiments of the present disclosure, "avatar" elements can include, by way of example not limitation, one or more of:
  Name
  Object Type (Player, Object, Event, Etc.)
  Status (Busy, let's play, etc.)
  Rank/Level/Popularity
  Trophies
  Description/Bio/Message
  Mood/Emotion FIG. 5D diagrammatically depicts a virtual world component 552 of an alternate reality environment (e.g., augmented or mixed reality environment, collectively referred as 'AR environment') 550 associated with a real world location in the physical world 554, in accordance with embodiments of the present disclosure.

The virtual world component (e.g., virtual environment) 552 of the AR environment 550 can include digital objects, digitally synthesized objects or virtual objects (e.g., collectively, 'VOBs'). VOBs can generally include, objects that are digitally rendered or synthesized to be presented in the AR environment to be perceived by a human user of the AR environment 550. VOBs can have contextual relevance or awareness in relation to the user, characteristics or events of the physical world 554 and/or a certain time/time period. VOBs can also have social relevance to the physical world 554 and/or to the human user accessing the AR environment 550.

The AR environment 550 can also include a representation of the physical environment associated with the physical world 554 (e.g., a physical location, reality, real world environment). The representation of the physical environment can include an image, a video, a live video, a recorded video, a video stream of the physical environment. In general, the representation of the physical environment can include any photorealistic production or reproduction of the physical environment. For example, the representation of the physical environment can be digitally rendered or in part or in whole digitally created, synthesized or illustrated.

The virtual world component 552 can, in one embodiment, be organized as layers (e.g., also referred to as, digital namespaces, namespaces, virtual spaces, etc.), as further described in the examples of FIG. 3A-FIG. 4B, FIG. 15, FIG. 16, FIG. 18). The layers (e.g. Layer 1 556, layer 2 558, layer 3 560 . . . layer 5, layer 6 . . . layer N, etc.) for example, can further be used to organize, categorize or arrange VOBs in the AR environment. Layers can further include sublayers e.g., sublayer 2a, of layer 2 558, sublayer N-1, sublayer N-2 of layer N. Sub layers may have the same owner as the root layer but with different memberships, as further discussed with reference to the example of FIG. 3A. Examples of layer and sublayer attributes and parameters are illustrated in the example table of FIG. 6.

Any number of VOBs can be associated with a layer or a sublayer. In one embodiment, Layer 1 556 corresponds to a public layer which can be hosted or owned by the host server (e.g., host server 100 of FIG. 1 or host server 300 of FIG. 3A-FIG. 3B). The host server can then determine, manage, control, or enable to VOBs to be posted into layer 1 556 and enforce any relevant social, temporal, contextual or spatial criteria related to the publication of VOBs into layer 1 556 and their accessibility or consumption.

Different layers (e.g., layer 2, layer 3, . . . ) can have different ownership (e.g., owned by different human users, different entities, different brands, advertisers, companies, etc.) and the owners typically determine and govern the rules pertaining to publication of VOBs into its associated layers. In one embodiment, individual human users are owners of their own persona or private layer and can post or publish VOBs into their layers and configure and set various permissions or policies regarding access or consumption of the VOBs in their personal layers by other users, actors, entities, or other participants. A human user's personal or private layer can be subscribed to or followed by other users, actors, entities etc., subject to the appropriate permissions and criteria being met. In general, VOBs depicted or rendered in the AR environment 550 can serve a function or purpose in the real world 554 (e.g. documents, articles, news, a search result, a game, messages, ads, rewards, tickets, avatars, information about a person, place, thing or entity, etc.), or they can be vanity or entertainment objects with little or no utility (e.g., emojis, pictograms, images, comic, photos, gifs, etc.)

FIG. 6 depicts a table 600 illustrating examples of virtual world layer (namespace, virtual world component) attributes and metadata, in accordance with embodiments of the present disclosure.

Various attributes can be associated with the layers (e.g., nameplates) in the virtual world component. Attributes can include by way of example, layer id 602, layer type 604, geolocation 606, owner 608, administrator 610 and/or other metadata 612. Example values for the attributes are illustrated in the example of table 600.

FIG. 7A depicts a table 700 illustrating examples of view options and view characteristics in the alternate reality environment, in accordance with embodiments of the present disclosure.

Various view options include map view 702, radar view 704 and goggles view 706. Examples of View ranges, characteristics, and/or available interactions are shown in the example table 700. Additional embodiments of the views include:

AR View

Users can see check ins as content objects dropped from people you follow.

These can be consolidated into 1. Message Board object for each place in. It shows the public discussion.

Users can also leave comments about the place on other layers that can only be seen by followers of those layers.

Map View

When a User looks at Map View, they have the option to filter to show popularity or heat of directions and places by filters for everyone or people User follow.

Map view can be filtered by time—visited by people a User followed in last hour, day, week, month, year. Users could see where people you follow go or have gone or are now.
- A) Google Maps APK (Or similar Map APK)
  - B) Features
    1. VOBs are displayed when User is within close proximity
    2. Fog Surrounds areas where User has not traveled to. For example, Fog Reveals as User moves throughout gamespace.
  - C) Tracer Trail ("Spree")
    1. Sprees can be left behind by a user in the gamespace that allows friends/followers to view another User's path in AR. As a user walks around, a trail can be broadcasted to other users to view.
    2. Sprees can generally be seen in AR, and can also be depicted on the Map View as an icon Radar View Shows direction of close by VOBs that have not appeared on Map View FIG. 7B depicts a table 700 illustrating examples of gesture options, view options and progressions of virtual objects (VOBs) through various states, in accordance with embodiments of the present disclosure.

VOB Portals "Virtual Doors"
Users can interact with a portal VOB
  The Users surrounding, environment, or world changes
  Portals can be in AR, VR, MR, external app experiences, or trigger other game play
Object Animations
Starting State
  base animation (rotation, pulsing, faint glow, small movements)
Highlighted State (When User hovers crosshair over object)
  Object aura would appear
  Noticeable transition animation (scale, hover, etc.)
  ex. Crate/box lid could crack open
Trigger State (when user selects object)
  Object would open, expand, activate
  transition animation
VOB Container/"Bin" Interaction
User can peer into a container to see a map view of what's in it
  then unfold it into physical space if interested in AR view of what it contains
When User unfolds or opens a container it is equivalent to tuning AR view to the later for that container, indexed to the present location.
These containers are similar to URLs that open web sites (layers) at pages for your present location.
This enables ability to show sponsored layers, the public layer, friends layers, at every location
  easy access from map and AR views.

Slide View—Filter
A UI slider on the side of map view and AR view that can change the spectra of the view from sponsored to friends, and from friends to personal.
Users can slide the view up and down to see what is in these layers.
The container objects have iconic/specific navigation elements at every place.
Users can swipe the toggle triggering a new view showing different VOBs in an area.
Users can select a type of VOB that would trigger a new filter view with new sub-VOBs to interact with.
  Each VOB can have a local sub layer containing new VOBs
  Another way to reduce VOB clutter in AR mode.
User Interface View Organized by 'Layers' at a Place:
  Sponsored (these appear separately)
    objects of any kind including layer objects for getting a new layer to follow
  Public (nested inside this object)
    objects of any kind including layer objects for getting a new layer to follow
  Friends (nested inside items to/from people you follow)
    objects of any kind including layer objects for getting a new layer to follow
  Personal (only the user can see their personal layer)
  Layer View: Expanded or Collapsed
  Users can opt to see any layer expanded or collapsed by default.
  These are contexts that can be turned on off from the user navigation control area in a user interface to the AR environment—check layers on/off and other settings
User Interface View Organized by VOB Structure/Hierarchy:
  VOB "Bin"/"Fan"/"Folder" Hierarchy
    All public content is connected to one or more public objects at a place.
    Users can open these "bins" to see connected objects stuff
    Virtual objects unfold to show content
    objects can appear in a location or around the user
    This additional level removes clutter
    Advertisers can break out separate virtual objects of any kind.
User Interface View Organized by Location Based User Data:
  Public Layer User Generated Content Organization
    All posts are visible to public at a place.
    A virtual object is located at every place
      Shows how many public objects there are of each type
    The focus of a place for Users to see and interact with them
    An AR Location-based "Virtual Information Center" or "VIC"
  Private Layer User Generated Content Organization
    User followers see User public content in a special public object
    Public Object for data of people you follow in a location in addition to the public object available and visible to everyone.
    Objects with stats can be seen without opening them
      The relative object size is number of objects,
      A number for number of objects
      A number for number of people
      An activity level score (how much activity in last 8 hours)

FIG. 8 depicts a table 800 illustrating examples of metadata or data fields associated with virtual objects (VOBs), in accordance with embodiments of the present disclosure In general, a virtual object, which is represented by a data object, can be implemented as an instance of a class in an ontology. The ontology can further define data structures for multiple virtual object types where the virtual object is of a given virtual object type represented by the class. The host server (e.g. host server 100 and/or host server 300) supports multiple types of VOBs, each defined by an ontology.

Moreover, the class in the ontology can be represented by a data structure where various attributes of the data object representing the virtual object are specified as data or metadata in the data structure. Ontologies can be controlled, managed, maintained by the host server (e.g. host server 100 and/or host server 300) and can be extensible. In addition, as can be further controlled by the host server, the ontologies can be created by a third-party entity or modified/customized or built upon by a third party. The third party can also build upon their own customized ontologies.

Note that virtual Objects can inherit root metadata attributes in the AR environment from the object class. Multiple levels of inheritance can also be supported. For example, the multiple virtual object types can include a first object type which is represented by a first class having a first set of attributes and a second object type which is represented by a second class having a second set of attributes. The second set of attributes of the second class can inherit from the first set of attributes of the first class.

Examples of attributes of virtual objects specified as metadata in a data structure representing a given type of VOB, can include by way of example not limitation:

UID
Type (of object, in the ontology)
Dates (created, modified, last interacted with, start date, end date, blackout dates)
Users
Creator
Admins
Owners (who has it)
Followers (who tracks it)
Location
Layer (it is in)
Places it is in
Geographic location
   Place or places where it is located now
Number Copies
There may be a finite or infinite number of an object instance
Policies and Permissions
Distance
   At what distances can users or other objects sense and interact with this object.
Read
   This includes whether the object is visible to search engines, including our own and/or whether it is visible to search by users who, are outside a place, or beyond an allowed proximity of the object
Write
Admin
Renderings
Code and art to render the object for various types of device
Streams
Log
Public Events Stream
Status (draft, published, deleted, Promoted)
Annotations
Comments
Likes
Tags
Keyword index
Ratings
Language
Target Audience (age group etc.)
Analytics
Metrics about the activity of the object
metrics can be to parameters such as: users, when viewed/purchased and geolocation (where viewed/purchased), ability to cross filter analytics with various parameters
Grouped objects
Contained by (objects that contain this object)
Contains (objects this object contains)
Glued objects (objects that always move together with this object)
Payload
Additional data this object carries (binary files etc.)
Data
Other fields of data specific to the type of object.

FIG. 9 depicts a table 900 illustrating examples of virtual object (VOB) types, in accordance with embodiments of the present disclosure.

Figure 10:
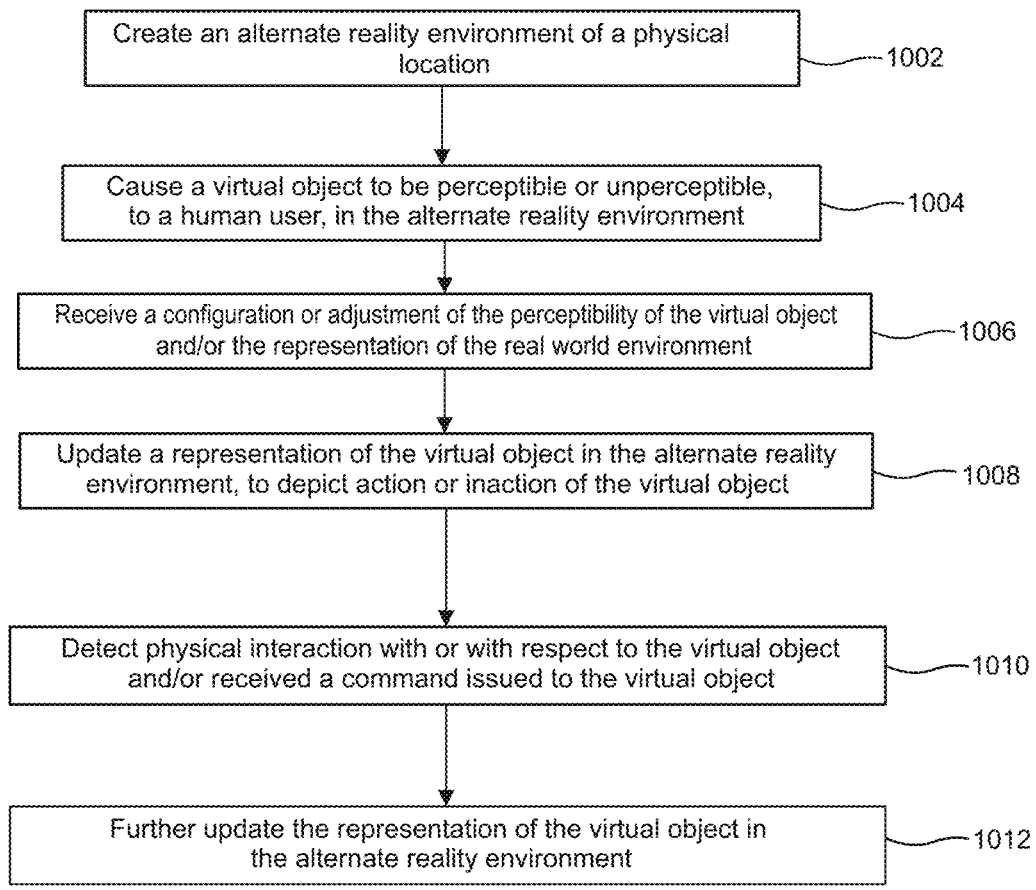
FIG. 10 depicts a flow chart illustrating an example process for creating an alternate reality environment, in accordance with embodiments of the present disclosure.

VOB types supported by the host server (e.g. host server 100 and/or host server 300) include by way of example, not limitation:

Object
Pass
Coupon
   One Time Discount
Gift card
Virtual currency debit card
Ticket
   Provides entry to something
Tool
A tool enables a user to do something to another object
An example is a Key object that unlocks another object
Container
A virtual object that contains other virtual objects
An example might be a "Gift Box" or "Easter Egg" which is a container that might contain several coupons and other goodies.
Actor
User
Agent
   Non-Player Character (NPC)
Content
Note
Web page
Video
Music
Classified Ad
   Wanted
   Offered
Digital graffiti (as shown in the examples of FIG. 2M-FIG. 2N)
   Styled Text
   Spraypaint
   Digital skywriting (as shown in the examples of FIG. 2M-FIG. 2N)
      World locked
      Writing on walls, floors, ceilings and in the air
Digital stickers
   Memes
   Slogans Logos
Symbols
Emojis
Contact Record
  Business Card
App
  Poll
  Survey
  Guest book
  Game
    Puzzle
    Shooter
    Arcade
    Strategy Game
    Quest
      Mission (achieve an objective in a set of places)
      Treasure Hunt (collect things in places)
      Tour (visit a set of places in sequence)
A) Instant Coupon Beacons (Local Ghost Beacons)
  1. VOBs that are less valuable that frequently appear in high traffic areas
    1. e.g., 10% off single item Bed Bath & Beyond coupon that is mailed to everyone.
    2. These will be the most seen coupons on the site.
B) Lock-and-Key
Users can collect rare spawning Virtual Keys throughout the global public namespace to unlock Treasure Chests that contain high-valued, limited quantity, rewards. Once enough Virtual Keys are collected, the Treasure Chest appears on the User's Map View.
  A) Treasure Chests—Treasure Chests are unlockable reward containers that are located inside a Place that is tied to a physical location of the admins choosing (ex. Brick and mortar retail location, event space, etc.)
  B) Virtual Keys
    1. Partial coupons that, when combined, can be used to unlock large rewards from treasure chests
    2. If users enter proximity to a Treasure Chest with the required number of Key VOBs in their inventory, they unlock an exclusive reward (ex. Pre-release of celebrity album, 40% coupon, access to buy an exclusive t-shirt design—Something they want to share on social media).
  C) Non-Player Characters (NPC's)
    1. These NPCs are essentially roaming coupons bots. They could be famous brand avatars (Ronald McDonald) that Users can only see in AR Goggles View.
      1. These bots spawn mini games to play against the NPC.*
      2. They can also lead viewer to location (follow the leader)
      3. They appear on Mapview as a shaded circle larger than the beacon as not to reveal exact location but to hint to user that they should switch to AR
Puzzles
Puzzle is type of VOB
To collect Puzzle, User must collect specific keys.
Clues
Puzzle may provide clues
Clues may also be concealed in other VOBs that users must acquire
Clues may also be in brand 2d ad campaigns outside AURA FIG. 10 depicts a flow chart illustrating an example process for creating an alternate reality environment/augmented reality environment, in accordance with embodiments of the present disclosure.

In process 1002, an alternate reality environment of a physical location is created. The alternate reality environment can be created, for example, to include a representation of a real environment associated with a physical location and/or a virtual object. The representation of the real environment can generally include a scene of the real environment. The scene of the real environment includes for example, one or more of, a photograph or image of the real environment, a photorealistic production or illustration of the real environment, a recorded video of the real environment, a live video or live stream of the real environment. In process 1004, the virtual object is caused to be perceptible or unperceptible (e.g., imperceptible) to a human user in the alternate reality environment.

For example, access to a virtual world component of the alternate reality environment can be provided to the human user where the virtual object is associated with the virtual world component. For instance, a virtual world component of the alternate reality environment is illustrated in the example of FIG. 4D.

In one embodiment, the human user can be affiliated with the virtual world component such that the human user is able to access the virtual world component in the alternate reality environment. The user can be affiliated in such a manner that the human user is an owner of the virtual world component. The human user may be affiliated as a member, administrator or manager of the virtual world component as well. In process 1004, the virtual object is caused to be perceptible or unperceptible (e.g., imperceptible) to a human user in the alternate reality environment. The virtual object can be made perceptible or unperceptible to the human user in the alternate reality environment depending on a rule set.

In one embodiment, the rule set can include, a search parameter and a filter parameter. The search parameter applied can be based on a user supplied setting and/or a system level configuration. Similarly, the filter parameter applied can also be based on a user supplied setting and/or a system level configuration. The filter provided by the alternate reality environment or presented for use by the human user can include for example: a price filter, a discount percentage filter, an expiry filter, a product category filter, a service category filter, a sub-filter for product feature, a filter by social distance or relevance to friends.

The rule set can further include a social parameter which is dependent on social distance of the human user in the alternate reality network in relation to various virtual objects. In a further embodiment, the rule set includes a proximity parameter which includes an indication of a physical distance between the human user and a real place in the physical location with which the virtual object is associated.

Depending on the type of affiliation, the user can also have permission to perform by way of example and not limitation: edit the virtual object in the virtual world component, review the virtual object, copy or make copies of the virtual object, access previous versions of the virtual object, interact with the virtual object, consume the virtual object, collect the virtual object, use the virtual object in the virtual world or the real world (environment), access other virtual objects in the virtual world component and/or author additional virtual objects to be associated with the virtual world component. Note that the virtual world component is otherwise referred to in the present disclosure as a 'digital namespace,' a 'namespace' or a 'layer.'

In one embodiment, the alternate reality environment includes a first virtual world component and a second virtual world component where the first virtual world component is affiliated with a first entity and the second virtual world component is affiliated with a second entity.

Access of a first set of virtual objects associated with the first virtual world in the alternate reality environment can be controlled, governed, regulated or determined based on a first set of policies or permissions. In general, the first set of policies or permissions can be configured, adjusted, set, adapted, constructed or determined at least in part by the first entity. Similarly, access of a second set of virtual objects associated with the second virtual world in the alternate reality environment based on a second set of policies or permissions. The second set of policies or permissions can be determined at least in part by the second entity.

The first entity and the second entity can each be, an individual person, an organization, a company, a school, an endowment, a government, a group, a brand, a celebrity/expert, a team, etc. The entities can configure any or all permissions and policies. The permissions and/or policies can be associated with the virtual objects or the virtual world with which the virtual objects are associated.

The permissions and policy settings include by way of example and not limitation, criteria or requirements for accessing, viewing, consuming or otherwise interacting with the virtual objects, Such criteria or requirements can include, by way of example, temporal requirement: timing requirement to be met to perceive, discern, view, hear, smell, access or to perform an action on or interact with a virtual object. Temporal requirement can be specified by way of
 a specific time or time range in one time zone or in multiple time zones, (e.g., at or substantially around 12 pm in all time zones, i.e. 12 PM EDT, 12 PM, PDT, etc.)
 an absolute time (e.g., at or substantially around 12 PM PDT and equivalents in other time zones, i.e. 5 pm EDT, 8 PM GMT, 9 PM CET, etc.)
 at or on the hour each hour, each half an hour, for a specified amount of time
 a given time range or time ranges in a given day
 any of the above applied to a given season, a specific day(s) of the week, certain week(s), month(s) of the year, certain years, etc.
 relative time, for example, a certain amount of time before or after the occurrence of an event in the virtual world or in the real world (e.g., 15 minutes before sunset, 1 hour after sunrise, 8 hours after snowfall, 30 min before a real world concert, 1 hour before or after a sporting event, 15 min before an online poker game, etc.)
spatial requirement: location criteria or spatial requirement to be met to perceive, discern, view, hear, smell, access, search, discover, query, browse, or to perform an action on or interact with a virtual object. Such criteria or requirements can include, by way of example,
 a specific location in the real world, location region(s) or location ranges in the real world (e.g., Salt Lake City, Utah, Washington State, Lake Michigan, Pacific Ocean, Lincoln Memorial, The Louvre Museum, Oracle Arena, 10 min radius surrounding Washington D.C., etc.)
 type(s) of locations in the real world (e.g., Cities of a certain population, capital cities in Europe, Countries in Asia, all basketball arenas in the United States, all tennis courts in San Francisco, etc.)
 relative location or distances or distance ranges in relation to geographical locations, landmarks, establishments, people or other physical entities or physical places in the real world (e.g., 3 miles from all Baskin Robbins ice cream store, 5 mi radius from the Statue of Liberty, 1 meter from user Albert, 10 meters outside of Stanford University front gate, 5 feet from the McDonald's at a certain location, 2 mi radius of the MET museum, etc.)
 virtual location(s) or virtual location range(s) in the alternate/augmented reality environment (e.g., in a simulated (digitally synthesized) playground, on a simulated sofa, on a rock in a virtual world, etc.)
 relative location or distance ranges in the alternate/augmented reality environment (e.g., within 3 meters of a computer-generated player, within 10 meters radius of another virtual object, etc.)
 relative location or distance range(s) in the alternate/augmented reality environment from an event
user requirement: user identity, user type, user affiliation, user membership, user performance, user skill, user score, user demographics criteria or to be met to perceive, discern, view, hear, smell, access, search, discover, query, browse, or to perform an action on or interact with a virtual object. Such criteria or requirements can include, by way of example,
 identity of the user in the real world,
 age, ethnicity, education, religion, gender of the user
 hobbies, interest of the user
 social graph of the user
 residence, address, citizenship of the user;
 user's membership level or type with the hosted platform, e.g., paid, subscription, celebrity, VIP, free, test, etc.)
 users' membership level or type with a third-party developer/publisher
 user affiliation with real world entities or organizations
 user membership in virtual spaces (e.g., namespaces, virtual world components, layers)
 user activity or performance—a reward for a user when a threshold in measurement of skill or activity is met or exceeded
contextual requirement: context or event related criteria or requirement to be met to perceive, discern, view, hear, smell, access, search, discover, query, browse, or to perform an action on or interact with a virtual object. Such criteria or requirements can include, by way of example,
 occurrence of a real world event (e.g., beginning of World cup finals, end of a basketball game, during snowfall, before a sale at a physical or online store, during black Friday, before Thanksgiving, before Christmas, etc.)
 occurrence of a digital event, or a synthetic event in the alternate/augmented reality environment (e.g., when a user wins an online game, when a ghost or goblin dies or is shot, or any other activity or reactivity by a virtual object, etc.)
 statistical requirement, when a certain item or object has been viewed a certain number of times, or accessed/viewed at a certain frequency, Different levels of access of the virtual object may have different requirements for a given user or a given type or group of users. Any number or combination of requirements may need to be satisfied for a given scenario.

In process 1006, a configuration or adjustment setting of the perceptibility of the virtual object and/or the representation of the real world environment is received. The human user, in having the appropriate permissions or in meeting the criteria to access the alternate reality environment and/or the virtual object can adjust their view of the alternate reality environment. For example, the human user can make the virtual object more or less translucent or more or less perceptible via a user device. In making the virtual object less perceptible, the alternate reality environment also appears less virtual or more real. The user can also make the real world environment more or less translucent or more or less perceptible via the user device. A less perceptible or more translucent version of the real world environment also makes the alternate reality environment more virtual or less real.

In process 1008, a representation of the virtual object is updated in the alternate reality environment to depict action or inaction of the virtual object. In one embodiment, the action of the virtual object includes, generating an output or response to a query command to obtain metadata from the virtual object. The query command can be issued by one or more of, the human user, another human user and another virtual object.

The action of the virtual object can include a talk action. For example, the talk action can be initiated responsive to a text or speech query or command received by the virtual object. In a further embodiment, the action of the virtual object can include a visible action the visible action can for example, cause a visual component of the representation of the virtual object to change for different users or difference devices used by the different users in the real environment to access the alternate reality environment. The action of the virtual object can also include an audible action. The audible action can, for example, cause an audible component of the representation of the virtual object to change for different users or difference devices used by the different users in the real environment to access the alternate reality environment. In addition, the action of the virtual object can also include a touch reaction. The touch reaction can for example, cause, one or more of: a surface of the virtual object to be interacted with, internals of the virtual object to be interacted with or exposed. Furthermore, behaviors of the virtual object can be initiated or triggered through touch. For example, a virtual object can depict its behaviour through object animations which can change through various states. In some instances, a virtual object can have a starting state, which depicts base animation which can include by way of example not limitation, rotating action, pulsing action, having a faint glow, or having small vibration, rotations or small movements. The virtual object can progress to a subsequent state (e.g., a highlighted state) as a touch reaction. For example, when a user hovers over an object or points/gestures towards an object or views an object. In the subsequent or highlighted state, an object aura may appear, or a noticeable transition animation may appear. In addition, the virtual object may have a crate/lid box which can open and expose any internal content.

The virtual object can further progress to a yet subsequent state (e.g., one or more activated states) as a touch reaction. For example, when a user selects the virtual object, the virtual object can depict in the alternate reality environment, transition animation. The virtual object can also open, expand or otherwise activate. Further examples of animations are listed in the table of FIG. 7. In general, the touch reaction of the virtual object is initiated or triggered in response to action by one or more of, a human user, another human user and another virtual object. For example, the touch reaction can include a reaction to one or more of move, hit, shoot, poke action by a human user, a non-player character or another virtual object in the alternate reality environment. The action of the virtual object can also include a collection reaction. The collection reaction can cause for example, one or more copies of the virtual object to be collected by the human user or another human user. The collection reaction can be initiated in response to action by one or more of, the human user, the other human user.

An action of the virtual object can further include a put reaction. The put reaction can for example, cause, one or more copies of the virtual object to be placed in a different physical location. In one embodiment, the put reaction is initiated in response to action by one or more of, the human user, the other human user in the alternate/augmented reality environment. In a further embodiment, an action of the virtual object includes a give reaction. The give reaction can cause, for example, one or more copies of the virtual object to be given to another human user via the alternate reality environment. In general, the give reaction can be initiated in response to action by the human user.

An action of the virtual object can also include an annotation reaction. The annotation reaction can be initiated in response to an annotation action by a human user. For example, the annotation action includes one or more of, commenting, liking, rating, tagging, and linking action by a human user. Another action of the virtual object can also include an edit reaction. The edit reaction causes specification or metadata of the virtual object to be modified. The edit reaction can also be initiated in response to action by the human user.

In a further embodiment, the action of the virtual object includes a publish action. The publish action can enable the virtual object to publish one or more of: content, a notification, an event, a command, to a content stream of multiple content streams associated with the virtual object. The multiple content streams associated with the virtual object can include a public content stream which is publicly accessible in the alternate reality environment.

The action of the virtual object can also include a subscribe/follow action. The subscribe/follow action can enable the virtual object to subscribe to content or events from an external content stream. Note that the external content stream can be associated with another virtual object. In one embodiment, action of the virtual object includes autonomous behavior. Autonomous behavior can include movements of the virtual object that are not triggered or caused by a trigger or human action or interaction. For example, autonomous behavior can include, one or more of: chasing the human user, randomly roaming around a path or region, hiding, doing things to other virtual objects, the human user or another human user.

A further the action of the virtual object includes behaviors determined by if-then rules. In a further embodiment, the action of the virtual object includes one or more of, self destruction, shoot at the human user, get shot by the human user, being selectively hidden, react to user, change over time, morph from one type of object to another, move from the physical location to another physical location, traverse a path over time. In process 1010, physical interaction with the virtual object or with respect to the virtual object is detected or a command issued to the virtual object is detected or received. In process 1012, the representation of the virtual object is further updated in the alternate reality environment.

Figure 11A:
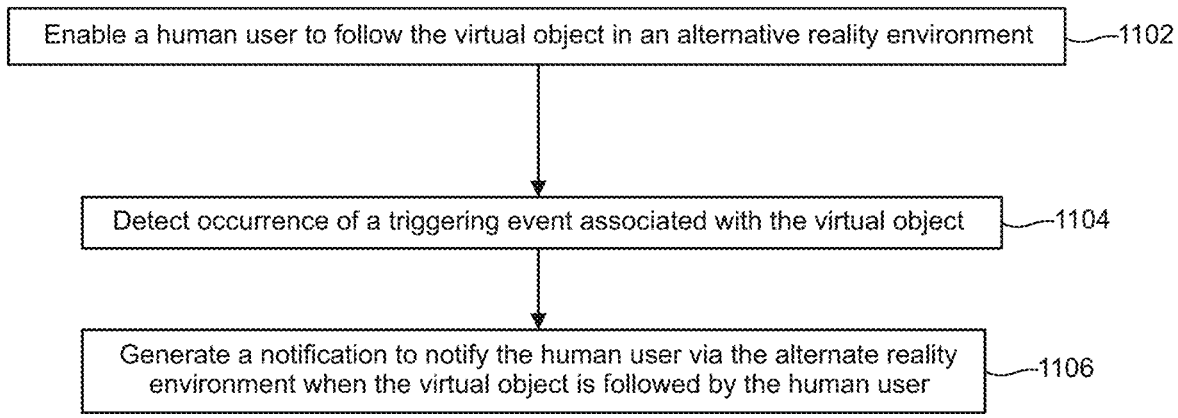
FIG. 11A depicts a flow chart illustrating an example process for managing notifications in an alternate/augmented reality environment, in accordance with embodiments of the present disclosure.

FIG. 11A depicts a flow chart illustrating an example process for managing notifications in an alternate/augmented reality environment, in accordance with embodiments of the present disclosure.

In process 1102, the human user is able to follow the virtual object in the alternate reality environment. Note that in general, the virtual object can represent for example, one or more of, a second human user, a non-human user character, a place, a location, and a thing. In process 1104, occurrence of a triggering event associated with the virtual object is detected. In process 1106, a notification to notify the human user is generated via the alternate reality environment when the virtual object is followed by the human user. In addition, the human user, in the alternate reality environment, can be notified of an event associated with the physical location associated with the alternate reality environment.

Figure 11B:
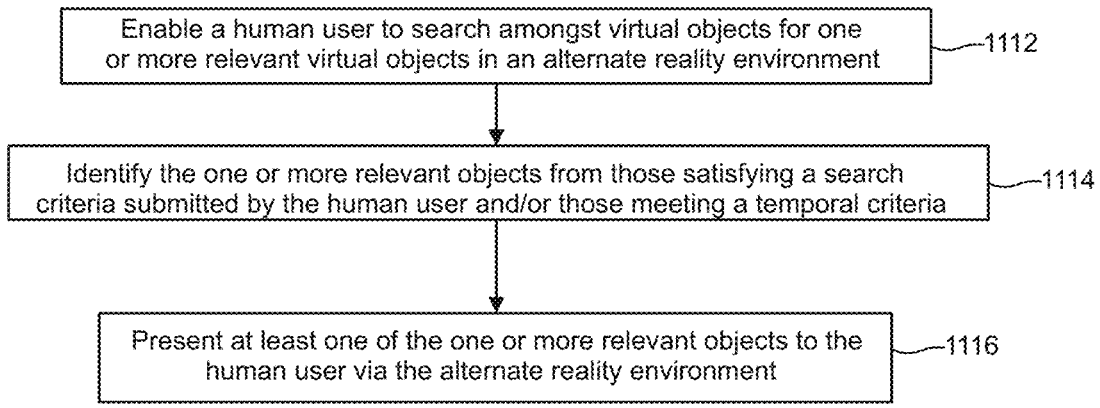
FIG. 11B depicts a flow chart illustrating an example process for facilitating search of virtual objects in an alternate/augmented reality environment, in accordance with embodiments of the present disclosure.

FIG. 11B depicts a flow chart illustrating an example process for facilitating search of virtual objects in an alternate/augmented reality environment, in accordance with embodiments of the present disclosure.

In one embodiment, the alternate reality environment includes a search environment. The search can include user search, text search, web search, document search, search for media objects (music, video, photos, etc.). Some or all search results can be embodied in or presented as virtual objects (e.g., 3D virtual objects or virtual objects with 270-360-degree view), such as virtual objects that can be interacted with by a human user in 3D.

The augmented reality/alternate reality enabled search can be hosted on a centralized platform, an operating system, a web browser, a mobile browser, or any other user 2D or 3D user interface.

The augmented reality/alternate reality features can also be built as a plug in to existing platforms, browsers, operating system, mobile browser. Alternatively, it can be a centralized platform with which third party applications, leverages for enhancement with alternate reality/augmented reality features. The alternate reality or augmented reality search can include the following processes:

In process 1112, a human user is enabled to search amongst virtual objects for one or more relevant virtual objects in an alternate reality environment. In process 1114, the one or more relevant objects are identified from those satisfying a search criterion submitted by the human user and/or those meeting a temporal criterion. In one embodiment, the one or more relevant virtual objects that are presented to the human user in response to the search criteria specified by the human user, further satisfy a spatial criterion. Note that the temporal criteria and the spatial criteria are attributes of the one or more relevant virtual objects. In process 1116, at least one or more of the relevant objects are presented to the human user via the alternate reality environment.

In a further embodiment, the alternate reality environment includes a browsing environment. The browsing environment can enable the human user to discover one or more relevant objects in the alternate reality environment through, one or more of: physical exploration of the physical location and areas physically surrounding the physical location and virtual exploration of the alternate reality environment through digital navigation via a user interface of the alternate reality environment.

During browsing, the virtual object presented to the human user in the alternate reality environment is identified in response to a filter applied by the human user. The filter provided by the alternate reality environment or presented for use by the human user can include for example: a price filter, a discount percentage filter, an expiry filter, a product category filter, a service category filter, a sub-filter for product feature, a filter by social distance or relevance to friends.

In one embodiment, the virtual object presented to the human user in the alternate reality environment is recommended to the human user by the alternate reality environment. The recommendation can be based on for example, one or more of, previously browsed virtual objects of the human user, activity of the human user in the alternate reality environment, transactions conducted by the human user in the alternate reality environment, social graph of the human user, demographic information of the human user, contents of the human user's shopping cart or wish list in the alternate reality environment.

In a further embodiment, the alternate reality environment comprises a commerce environment. The commerce environment can enable the human user to carry out a transaction with respect to another entity in relation to a virtual object. The transaction enables the human user to for example, carry out or consummate one or more of: purchase/acquire the virtual object from the other entity; sell the virtual object to the other entity; rent the virtual object to or from the other entity; license the virtual object to/from the other entity. In a commerce environment, the virtual object represents one or more of: a physical good in or near the physical location; services offered in or near the real environment; a virtual item with real world value; a virtual item with value in the alternate reality environment.

Figure 12:
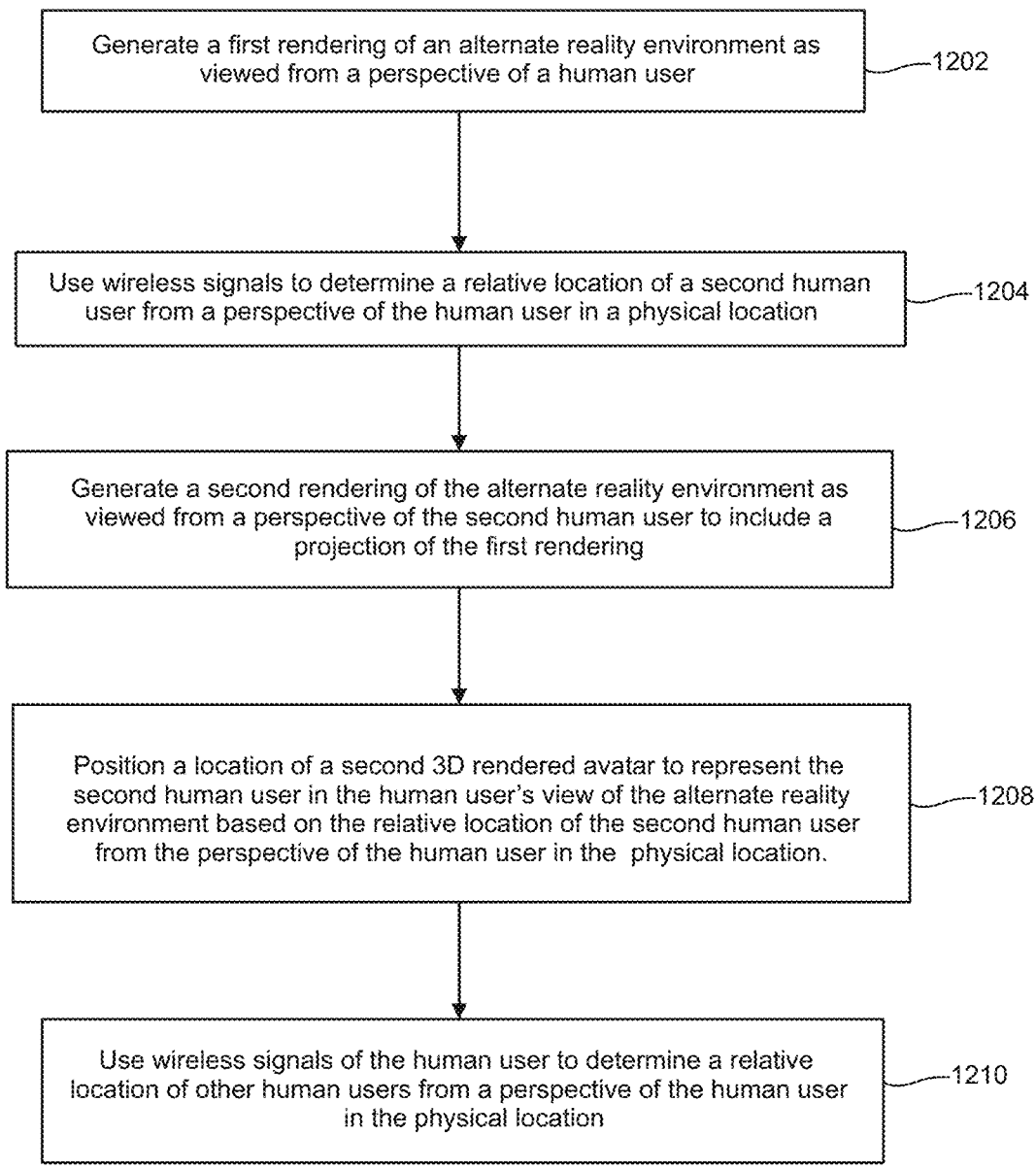
FIG. 12 depicts a flow chart illustrating an example process for determining relative positioning of human users of an alternate/augmented reality environment, in accordance with embodiments of the present disclosure.

FIG. 12 depicts a flow chart illustrating an example process for determining relative positioning of human users of an alternate/augmented reality environment, in accordance with embodiments of the present disclosure.

In the alternate reality environment a human user can be represented as a virtual object. In one embodiment, the virtual object representing the human user can include a 3D rendered avatar depicted to other human users in the alternate reality environment. For example, the alternate reality environment can include a first 3D rendered avatar to represent the human user and a second 3D rendered avatar to represent a second human user. An action between the first and second 3D rendered avatars include, one or more of, messaging, conducting transactions, friending or unfriending, and sharing identity or contact information. An action between the first and second 3D rendered avatars can further include, sharing, one or more of a place, a location, an event and the virtual object with one another. Moreover, virtual physical interactions such as commenting, tagging and liking can occur between the first and second 3D rendered avatars.

In process 1202, a first rendering of an alternate reality environment as viewed from a perspective of a human user is generated. In process 1204, wireless signals are used to determine a relative location of a second user from a perspective of the human user in the physical location. In process 1206, a second rendering of the alternate reality environment is generated as viewed from a perspective of the second human user to include a projection of the first rendering.

In process 1208, a location of the second 3D rendered avatar is positioned in the human user's view of the alternate reality environment based on the relative location of the second human user from the perspective of the human user in the physical location. In process 1210, a wireless signal associated with the human user is used to determine a relative location of other human users from a perspective of the human user in the physical location.

Figure 13:
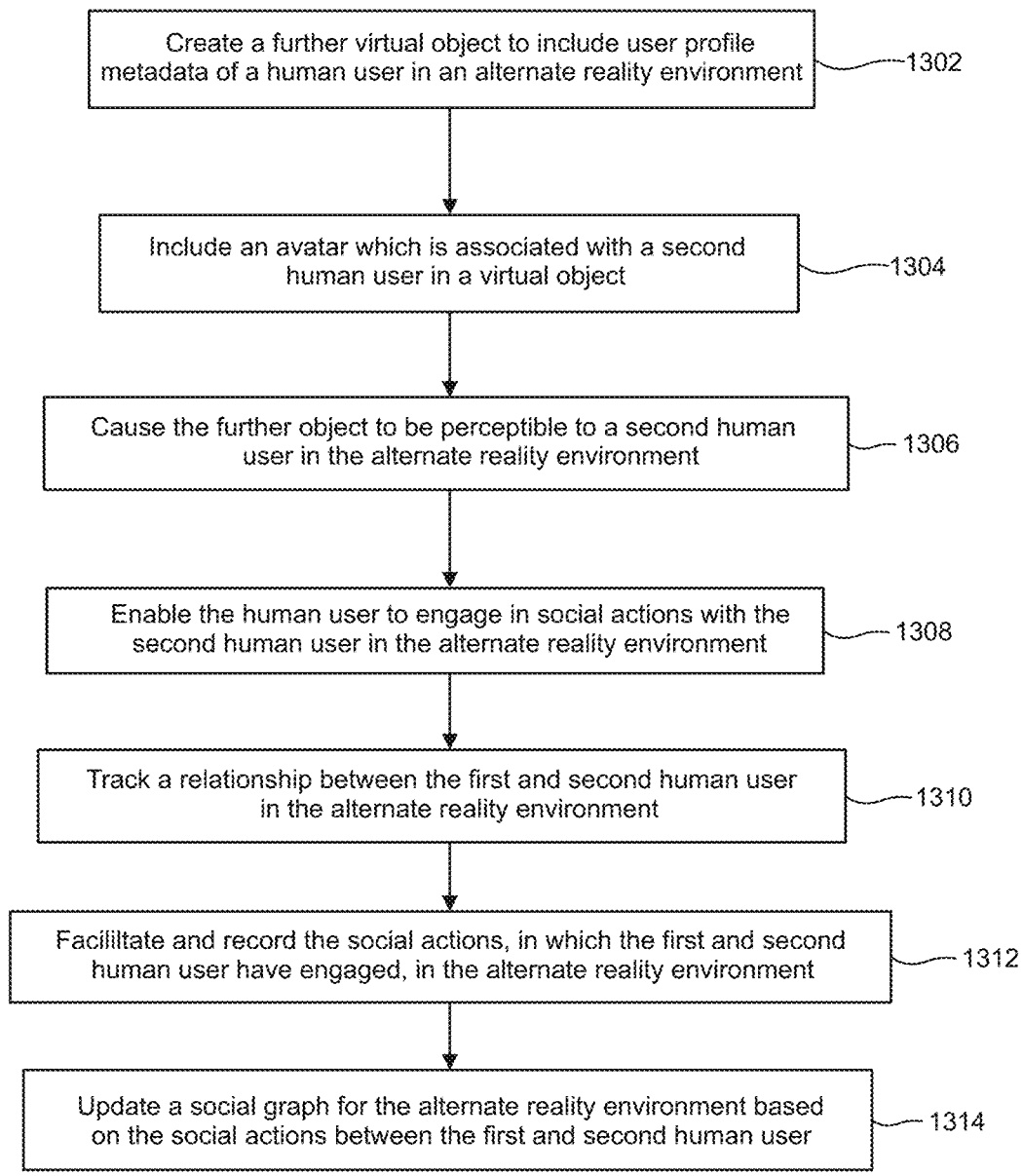
FIG. 13 depicts a flow chart illustrating an example process to implement a social network environment and facilitate social networking in an alternate reality environment, in accordance with embodiments of the present disclosure.

FIG. 13 depicts a flow chart illustrating an example process to implement a social network environment and facilitate social networking in an alternate reality environment, in accordance with embodiments of the present disclosure.

In process 1302, a further virtual object is created in an alternate reality environment to include user profile metadata of the human user. For example, in the alternate reality environment, an information halo associated with the human user can be depicted. The information halo can be depicted in or around a vicinity of a representation of the human user, which may be an avatar or a 3D avatar. The information halo includes one or more halo elements, as illustrated in the example of FIG. 4C.

In process 1304, an avatar associated with the second human user is included in a virtual object. In process 1306, the further virtual object is caused to be perceptible to the second human user in the alternate reality environment. In process 1308, the human user is able to engage in social actions with the second human user in the alternate reality environment. For example, the human user is able to friend the second human user in the alternate reality environment through initiating an action with a 3D rendered avatar representing the second human user in the alternate reality environment. The human user can also receive a notification in the alternate reality environment responsive to detection of a triggering event relating to the second human user. The second user can be a casual consumer, casual every day user. The second user that is friended or followed by the first human user can also be a celebrity, an expert or an influencer. In process 1310, a relationship between the first and second human user is tracked in the alternate reality environment. In process 1312, the social actions that the first and second human user have engaged in in the alternate reality environment are facilitated and recorded. In process 1314, a social graph for the alternate reality environment is updated based on the social actions between the first and second human user.

An example of an interaction between the human user and the second human user in the alternate reality environment can include, sending or leaving a message for the second human user by the human user. In one embodiment, the message is associated with a given place in the physical location. In this example, the message can be accessible by the second human user when location data of the second human user meets criteria in relation to the given place. For example, the criteria may require that the location data of the second human be within a certain distance from where the message was left by the first user, or where the first user was when the message was left. The criteria to be met for the second human user to read, view, or access the message can for example, be different from the criteria to be met to respond to, or edit the message, or to forward, delete the message or to add attachments to the message.

In a further example, the virtual object includes metadata regarding a given place in the physical location that is authored by the second human user. The virtual object having the metadata regarding the given place can be accessible by the first human user when location data of the first human user meets criteria in relation to the given place in the physical location. The metadata can include, one or more of, reviews, comments, suggestions, ratings, polls, social media data, tweets, feeds, posts, photos, and videos relating to the given place.

As yet a further example of interactions between users in the alternate/augmented reality environment, the alternate reality environment enables the human user to filter for a set of virtual objects alternate reality environment associated with the second human user. For instance, the set of virtual objects associated with the second human user can include one or more of, virtual objects accessed or purchased by the second human user.

Figure 14:
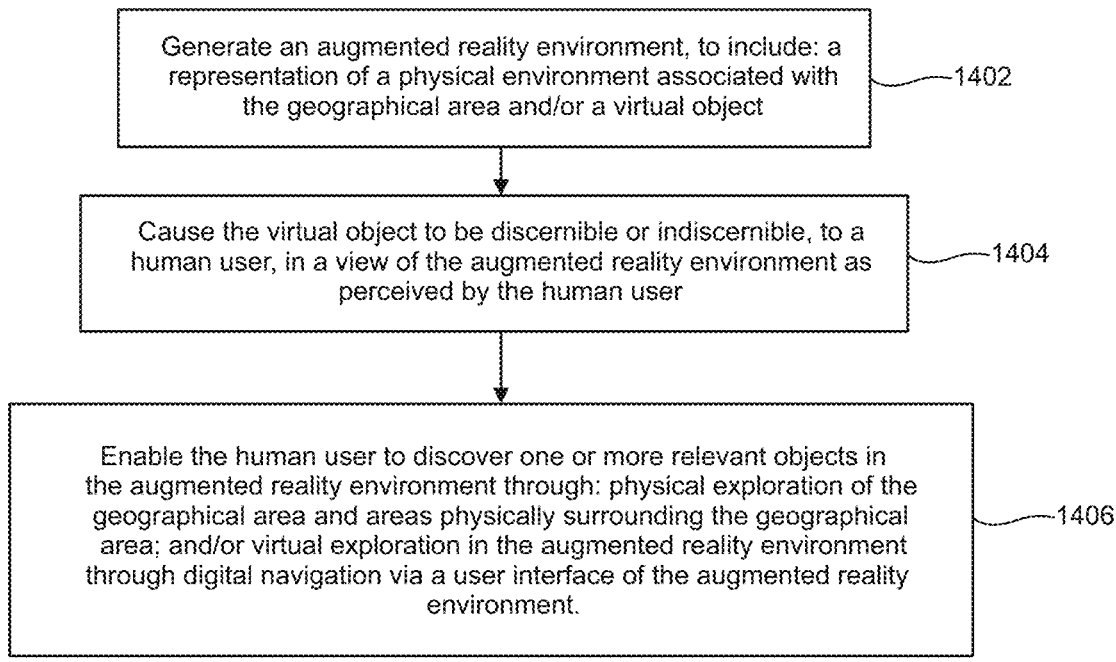
FIG. 14 depicts a flow chart illustrating an example process to facilitate discovery of relevant objects by a human user in an augmented reality environment (e.g., alternate reality environment, mixed reality environment), in accordance with embodiments of the present disclosure.

FIG. 14 depicts a flow chart illustrating an example process to facilitate discovery of relevant objects by a human user in an augmented reality environment (e.g., alternate reality environment, mixed reality environment), in accordance with embodiments of the present disclosure.

In process 1402, an augmented reality environment is generated to include: a representation of a physical environment associated with the geographical area and/or a virtual object. In some instances, the representation of the physical environment includes a photorealistic representation of the physical environment associated with the physical and the virtual object is depicted in a virtual world of the augmented reality environment (e.g., mixed reality or alternate reality environment). For example, the photo realistic representation can include, one or more of a photograph, a recorded video, a live video, a video stream, an illustration, a sketch, and a digitally synthesized video that is photo realistic.

In process 1404, the virtual object is caused to be discernible or indiscernible, to a human user, in a view of the augmented reality environment as perceived by the human user. In process 1406, the human user is enabled by the system to discover one or more relevant objects in the augmented reality environment through, physical exploration of the geographical area and areas physically surrounding the geographical area and/or virtual exploration in the augmented reality environment through digital navigation or digital exploration via a user interface of the augmented reality environment. Note that perceptibility of the virtual object and perceptibility of the representation of the real environment is generally configurable or adjustable by the human user.

In one embodiment, the augmented reality environment is rendered, to the human user, at least in part via a mobile device. At the mobile device, a combination of gestures initiated can be detected. Access to the virtual object by the human user in the augmented reality environment in response to determining that the combination of gestures is correct for accessing the virtual object. For example, the combination of gestures can include any or some of, shaking of the mobile device or by moving the mobile phone in a pattern. In a further embodiment, access to the virtual object by the human user in the augmented reality environment can be provided in response to detecting audio signal that meets criteria for accessing the virtual object. The audio signal can include by way of example, one or more of, a tune, a sequence of words, a combination of musical notes, and a phrase.

In one embodiment, the virtual object includes a portal virtual object. The portal virtual object is interacted with in the mixed reality environment to traverse into or out of another reality. Via the portal virtual object, a human user to discover one or more relevant objects in the other reality through, one or more of: physical exploration of the physical location and areas surrounding the physical location or digital exploration in the other reality environment through digital navigation via a user interface of the other reality. By way of example, the other reality can include, one or more of, another virtual world having different virtual objects and a mixed or augmented reality environment associated with another physical location. The ability of a human user to use the portal virtual object to traverse to another reality and the reality to which the human user has access to can depend on level of membership or membership type of the human user in the platform.

For instance, a higher level of membership or a higher paying human user can have access to multiple other realities, or other realities associated with geographical locations not in its vicinity or with geographical locations of a greater distance away from its vicinity. A higher level user can also have the option to access an external application embodied in the other reality. The other reality can provide, for example, a gaming experience, access to a simulated sporting event, a live sporting event, a simulated concert/performance or a live concert/performance.

In some embodiments, the augmented (e.g., alternate reality or mixed reality) reality environment is rendered at least in part in a hologram which can be accessible in 3D and/or in or near substantially 360 degrees.

Figure 15:
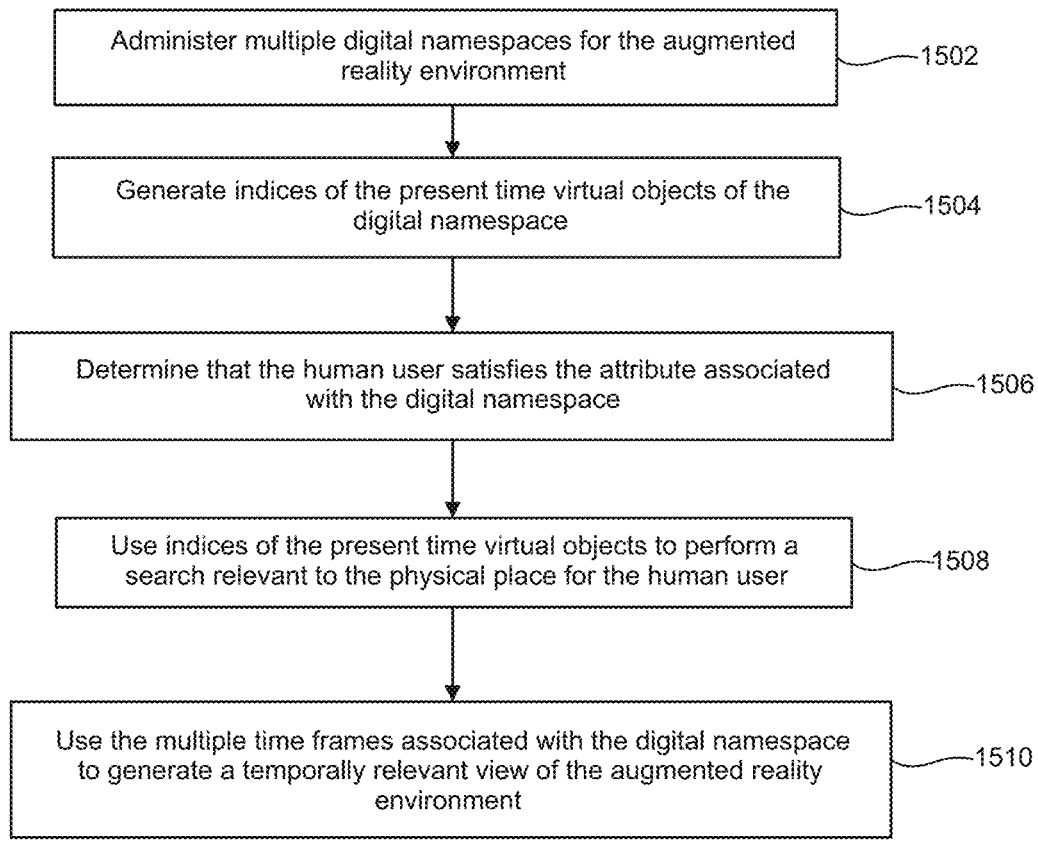
FIG. 15 depicts a flow chart illustrating an example process to use time frames associated with a digital namespace to generate a temporally relevant view of an augmented reality environment, in accordance with embodiments of the present disclosure.

FIG. 15 depicts a flow chart illustrating an example process to use time frames associated with a digital namespace to generate a temporally relevant view of an augmented reality environment, in accordance with embodiments of the present disclosure.

In process 1502, multiple digital namespaces for the augmented reality environment are administered. The multiple digital namespaces can be associated with the geographical place in the real world that is relevant to the augmented reality environment.

Note that a digital name space (e.g., namespace or layer) represent digital realms associated with entities in the augmented reality environment. For instance, each human user and virtual object can be associated with a given digital namespace or layer, and its identifier (e.g., an address). Namespaces or layers can be associated with policies or permissions as specified by attributes. Policies or permissions associated with the namespaces or layers can be used to govern access, perceptibility or consumption requirements of user avatars and/or virtual objects in the augmented reality environment (e.g., alternate reality environment or mixed reality environment).

One embodiment includes, associating a virtual object with one or more of multiple time frames associated with the digital namespace. For example, the virtual object can be associated with a time attribute, and the virtual object is assigned to the one or more of the multiple time frames associated with the digital namespace based on the time attribute. Generally, the multiple time frames include a present time frame and other time frames (e.g., past time frames, future time frames, etc.)

In process 1504, indices of a present time virtual objects of a digital namespace are generated. Such indices can be generated for the virtual object which is one of present time virtual objects that is associated with the present time frame of the multiple time frames. In the digital namespace, there are generally other virtual objects are associated with other time frames (e.g., past time frames, future time frames, etc.) of the digital namespace.

In process 1506, it is determined that the human user satisfies an attribute associated with the digital namespace. In process 1508, indices of the present time virtual objects are used to perform a search relevant to the physical place for the human user. One embodiment further includes enabling to be discoverable, via a user interface of the augmented reality environment, the present time virtual objects of the present time frame of the digital namespace.

In process 1510, multiple time frames associated with the digital namespace are used to generate a temporally relevant view of the augmented reality environment.

Figure 16:
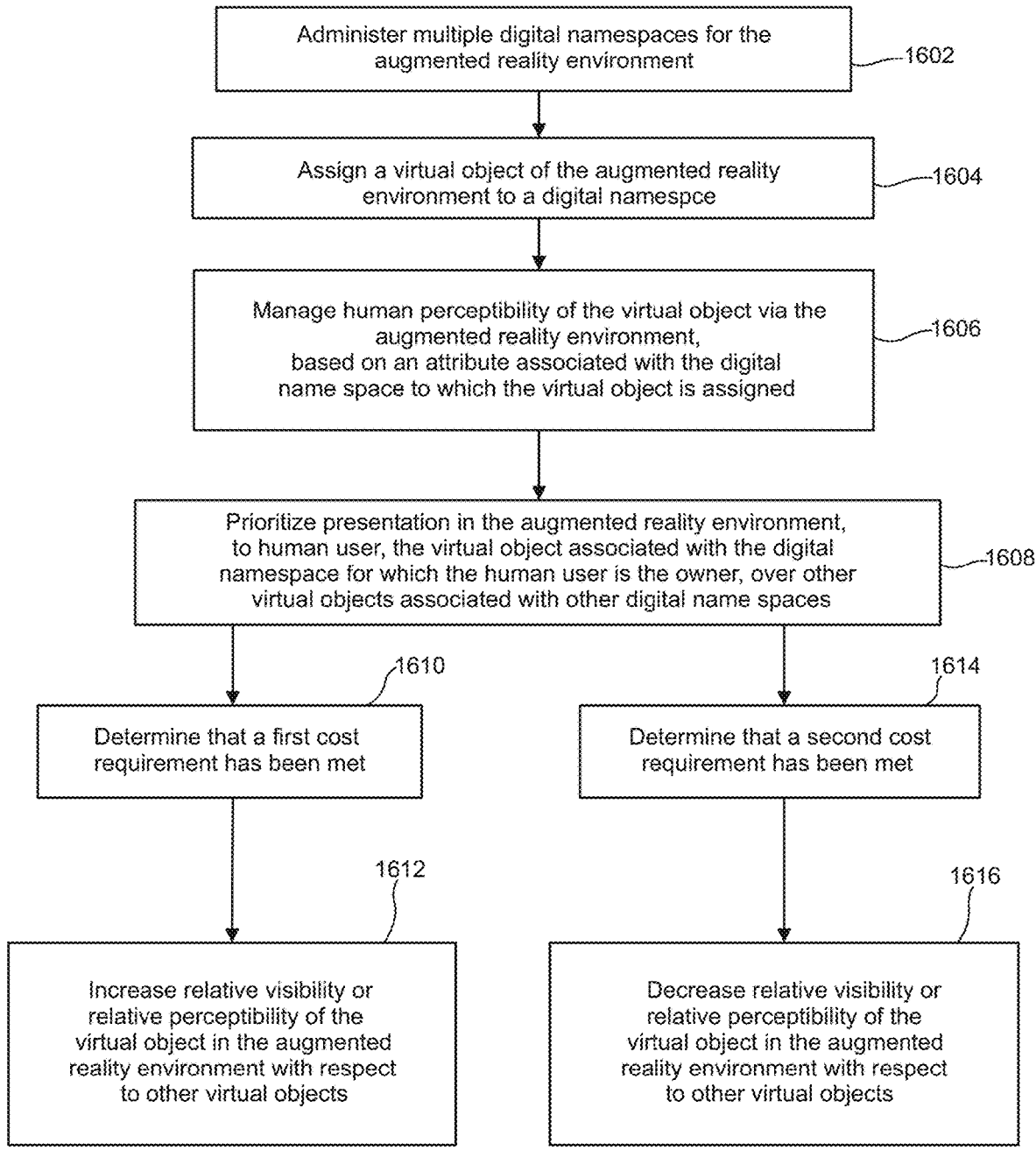
FIG. 16 depicts a flow chart illustrating an example process to manage or visibility of a virtual object based on an attribute associated with a digital namespace to which the virtual object of an augmented reality environment is assigned, in accordance with embodiments of the present disclosure.

FIG. 16 depicts a flow chart illustrating an example process to manage or visibility of a virtual object based on an attribute associated with a digital namespace to which the virtual object of an augmented reality environment is assigned, in accordance with embodiments of the present disclosure.

In process 1602, multiple digital namespaces for the augmented reality environment are administered. In general, the augmented reality environment can include, one or more of, a search engine, a gaming platform, a social network platform, a search environment, a market place, an e-commerce environment, an auction platform or any other digital platform, application, or service.

Note that the augmented reality environment can be generated for geographical places in the real world at a global scale, for participation by human users at the global scale. Digital namespaces can thus be associated with various geographical places in the real world globally, as illustrated in FIG. 19 and FIG. 20A. Grids can be used to identify or specify various geographical places on planet Earth. Each grid location associated with a geographical place can thus be associated with digital namespaces of the augmented reality environment.

In a further embodiment, the augmented reality environment can be generated for physical places in the real world at a universal scale, as illustrated by way of example in FIG. 20B.

In process 1604, a virtual object of the augmented reality environment is assigned to a digital namespace of the multiple digital namespaces. One embodiment further includes, enabling the digital namespace to be followed via the augmented reality environment by a human user. The augmented reality environment can then update the human user of updates or activities of the virtual object in the digital namespace or any other virtual objects associated with the digital namespace followed by the human user.

In process 1606, human perceptibility of the virtual object via the augmented reality environment is managed, based on an attribute associated with the digital namespace to which the virtual object is assigned. The attribute of the digital namespace can include, one or more of, policies and permissions. An attribute of the digital namespace can further include a cost requirement for association with the digital name space. The cost requirement can indicate the fee or other type of compensation or payment amount that is to be met to publish or to associate another virtual object to the digital namespace. In some cases, the attribute of the digital namespace is at least in part based on a type of the digital namespace. For example, the digital namespace can be one of: a public type, a personal type, and a group type. The attribute of the digital namespace can be at least in part configured by an owner of the digital name space. For instance, a virtual object associated with the digital namespace of the personal type can be perceptible to a human user who is the owner.

One embodiment further includes, enabling the human user who is the owner to configure policy settings of the attributes to govern, for example perceptibility of the virtual object to a second human user or a user group of the augmented reality environment. Additionally, the human user who is a designated owner can adjust or update permission configuration for a second virtual object owned by a second human user or a user group to associate a second virtual object with the digital namespace (owned by the human user).

In a further embodiment, the digital namespace is of a group type and the owner of the digital namespace can include a group entity comprised of a group of human users. The group entity can, for instance, include an admin user and one or more members. Visibility of the group entity in the augmented reality environment is determined based on a rule configurable by the admin user.

In one embodiment, a name for the group entity who owns the digital name space corresponds to a web domain name for the group entity. The web domain name can for example be related to a company name, organization name, name of an institution, a school, a brand, etc. As such the name can be associated with the digital name space in the augmented reality environment in response to verifying ownership of the web domain name by the group entity, to avoid potential naming conflicts or intellectual property issues.

In addition, the group entity can further include sub-group entities and the digital namespace (e.g., layer) can include sub-namespaces (e.g., sub-layer). By way of example, a sub-group can be a subset of employees in a given company (e.g., marketing division, HR team, etc.) or any subset of people in a given entity. A given sub namespace of the sub-namespace can be associated with a sub-group entity of the sub-group entities. Examples of namespaces and name spaces associated with sub-groups are illustrated in FIG. 5.

In on embodiment, the digital namespace is managed by a platform host of the augmented reality environment (e.g., platform hosted by server 100 or server 300). The digital namespace hosted by the platform host can be of a public type. In general, the public type namespace is associated with a relatively high or higher visibility compared to other namespaces. In other words, a virtual object associated with the public type namespace generally has higher visibility and as such a bigger audience by virtue of the association. For example, the virtual object assigned to the digital namespace of the public type can be discoverable or searchable by a public set of human users of the augmented reality environment. In some cases, the virtual object can be authored by a third party who is not a platform host of the augmented reality environment. As such, virtual object placement or association with the public type namespace can be suitable for brands, advertisers, promoters etc. to place virtual objects of a promotional nature. In some instances, the virtual object can include an incentive object including one or more of, a coupon object, a gift card object, a reward, a point, a treasure and a coin.

Note that relative visibility or relative perceptibility of the virtual object with respect to other virtual objects in any digital name space can be configurable, whether the digital name space is of the public, personal, group or any other types. In the example of the public type namespace, the platform host or any other owner of the public type namespace can thus impose a fee or levels of fees for placement or association of a virtual object with the public type namespace with higher fees generally corresponding to higher visibility, accessibility or perceptibility when compared to other virtual objects in the public type namespace. In one embodiment, the virtual object can be assigned to the digital namespace of the public type in response to determining that a cost requirement for placement of the virtual object has been met.

In process 1608, presentation in the augmented reality environment, to a human user, the virtual object associated with the digital namespace for which the human user is the owner, is prioritized over other virtual objects associated with other digital namespaces. In process 1610, it is determined that a first cost requirement has been met. In process 1612, relative visibility or relative perceptibility of the virtual object in the augmented reality environment is increased with respect to other virtual objects.

In process 1612, it is determined that a second cost requirement has been met, or that the first cost requirement has not been met. In process 1614, relative visibility or relative perceptibility of the virtual object in the augmented reality environment is decreased with respect to other virtual objects. In some instances, the relative visibility or the relative perceptibility of the virtual object is maintained while the relative visibility or the relative perceptibility of other virtual objects is increased. The cost requirement can be satisfied by one or more of, an advertiser, a brand, a third-party sponsor and a promoter.

Figure 17:
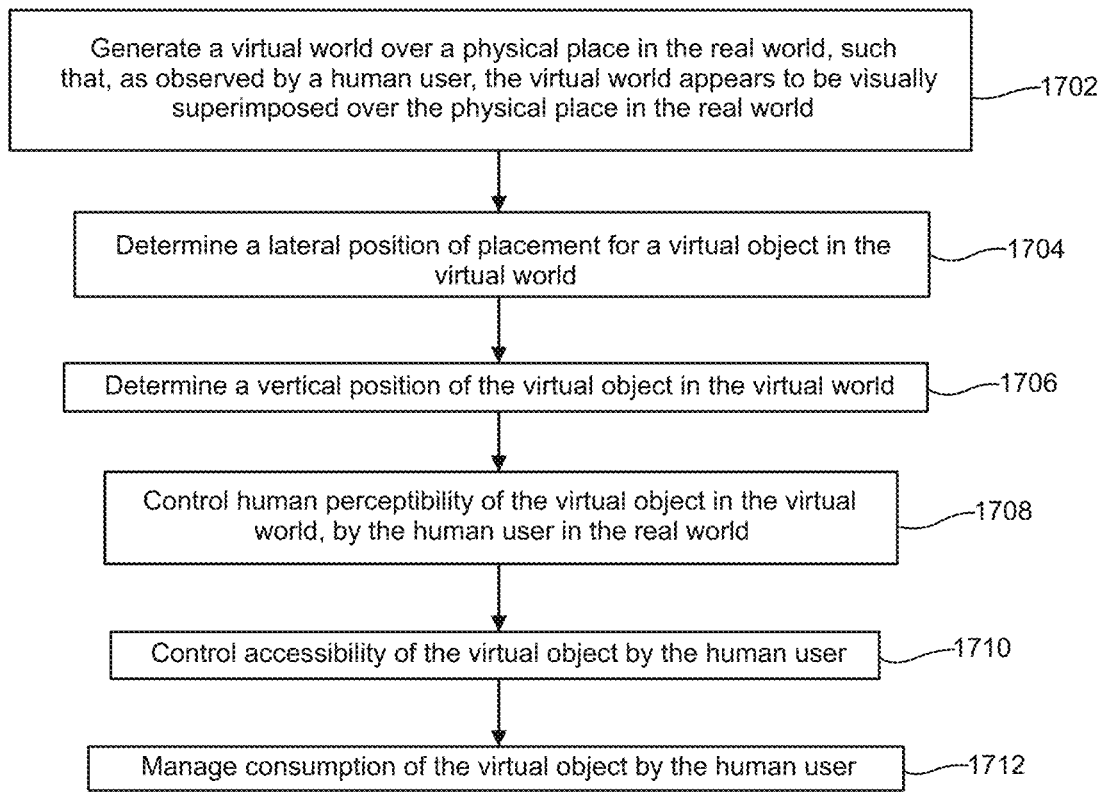
FIG. 17 depicts a flow chart illustrating an example process to generate a virtual world over a physical place in the real world and to determine positioning of a virtual object in the virtual world, in accordance with embodiments of the present disclosure.

FIG. 17 depicts a flow chart illustrating an example process to generate a virtual world over a physical place in the real world and to determine positioning of a virtual object in the virtual world, in accordance with embodiments of the present disclosure.

In process 1702, a virtual world is generated over a physical place in the real world such that, as observed by a human user, the virtual world appears to be visually superimposed over the physical place in the real world. In process 1704, a lateral position of placement for a virtual object in the virtual world is determined. In process 1706, a vertical position of the virtual object in the virtual world is determined. Note that the lateral position of the virtual object in the virtual world can correspond to positioning that is substantially parallel to a surface of the real world and the vertical position of the virtual object in the virtual world can correspond to positioning that is substantially vertical to the surface of the real world. The surface of the real world can include, for example, one or more of, the surface of earth, a surface of a mountain, a surface of a body of water, a ground, a floor in a room or building, a surface of a piece of furniture, a ceiling and a roof. In general, the surface of the real world can include any of planar, diagonal, flat, curved, spherical, or a round surfaces that occur in nature or are man-made.

Note that multiple vertical positions for placement of the virtual object can be associated with the lateral position. Furthermore, in one embodiment, an eye level or near eye level vertical position of the multiple vertical positions is associated with a higher cost than non-eye level vertical positions of the multiple vertical positions. Non-eye level vertical positions can for example, include, one or more of, a vertical position in the sky, a vertical position on the ground, and a vertical position under water.

In one embodiment, the virtual space surrounding the virtual object in the virtual world is associated with a fee. The fee can for example, include a cost to acquire or lease the virtual space Utilization of the virtual space surrounding the virtual object can be determined by an entity who has paid the fee. For example, an owner, creator or author of the virtual object can pay a required fee to the host platform to ensure that a certain amount of distance, space, or surface area in the surrounding space is not used by other entities, for instance, in a manner that may obstruct the visibility of the virtual object. The owner of the virtual object can also utilize the space around the virtual object to enhance its visibility or perceptibility. A further fee may be required for the owner to elect to utilize the space. In process 1708, human perceptibility of the virtual object in the virtual world, by the human user in the real world is controlled. In one embodiment, the human perceptibility of the virtual object is determined by a first proximity criterion. For example, the virtual object can be perceptible by the human user when the first proximity criterion is met by the human user. In a further embodiment, the human perceptibility of the virtual object is determined by a first location criterion. The virtual object can be perceptible by the human user when the first location criteria is met by the human user.

The first location criteria can specify, for example, a distance range of the human user from the physical place in the real world or a certain geographical area in the real world. In general, that the first location criteria can be adjustable or specifiable for a cost, where the cost can be paid for or otherwise satisfied by an advertiser, merchant or brand or any other entity. For example, the distance range of the human user from the physical place required to perceive (e.g., view, hear), access, edit, interact with or consume the virtual object can be decreased if a sponsor, creator, author, owner of the virtual object submits the require fee or cost. In this manner, the audience of the virtual object potentially increases as users from further away can perceive it.

In one embodiment, the virtual object is rendered in 2D and mapped to appear onto a surface of the real world. A size (e.g., area, surface area, volume, space etc.) of the virtual object as depicted in the virtual world can be adjustable based on a price paid to place the virtual object in the virtual world. In general, a larger size of the virtual object corresponds to a higher price paid and a smaller size of the virtual object corresponds to a lower price paid.

In process 1710, accessibility of the virtual object by the human user in the virtual world is controlled. In one embodiment, the accessibility of the virtual object can be determined by a second proximity criterion. For instance, the human user can interact with the virtual object when the second proximity criteria are met by the human user in process 1712, consumption of the virtual object by the human user in the virtual world is controlled or managed.

Figure 18:
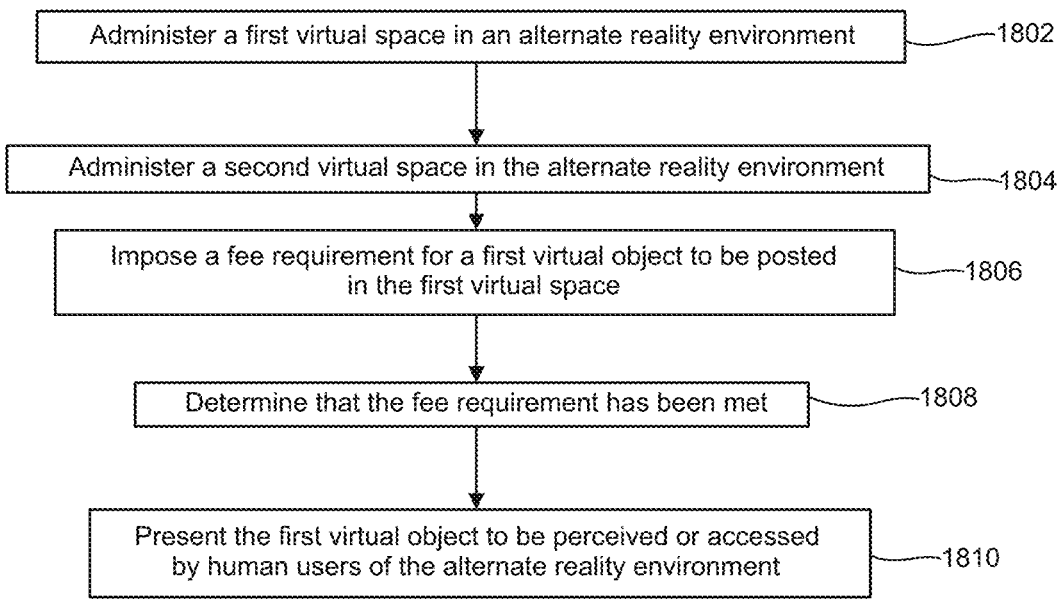
FIG. 18 depicts a flow chart illustrating an example process to impose fee requirements for a virtual object to be posted or associated with a given virtual space in an alternate reality environment, in accordance with embodiments of the present disclosure.

FIG. 18 depicts a flow chart illustrating an example process to impose fee requirements for a virtual object to be posted or associated with a given virtual space in an alternate reality environment, in accordance with embodiments of the present disclosure.

In process 1802, a first virtual space is administered in the alternate reality environment. In process 1804, a second virtual space is administered in the alternate reality environment. The first virtual space and the second virtual space can be associated with the geographical location in the real world. In the alternate reality environment, a first virtual object posted in the first virtual space can be more perceptible or accessible by human users of the alternate reality environment than the first virtual object posted in the second virtual space.

As such, in process 1806, a fee requirement is imposed for the first virtual object to be posted in the first virtual space. In process 1808, it is determined that the fee requirement has been met. In process 1810, the first virtual object is presented to be perceived or accessed by human users of the alternate reality environment, through association of the first virtual object with the first virtual space.

FIG. 19 depicts an example grid 1900 of physical locations in the real world with which virtual layer components can be associated, in accordance with embodiments of the present disclosure.

FIG. 20A depicts an exploded views 2002 and 2004 of example grid configurations for physical locations on earth with which virtual layer components can be associated, in accordance with embodiments of the present disclosure.

FIG. 20B depicts an exploded view 2050 of an example grid configurations for real locations in the universe with which virtual layer components can be associated, in accordance with embodiments of the present disclosure.

Figure 21:
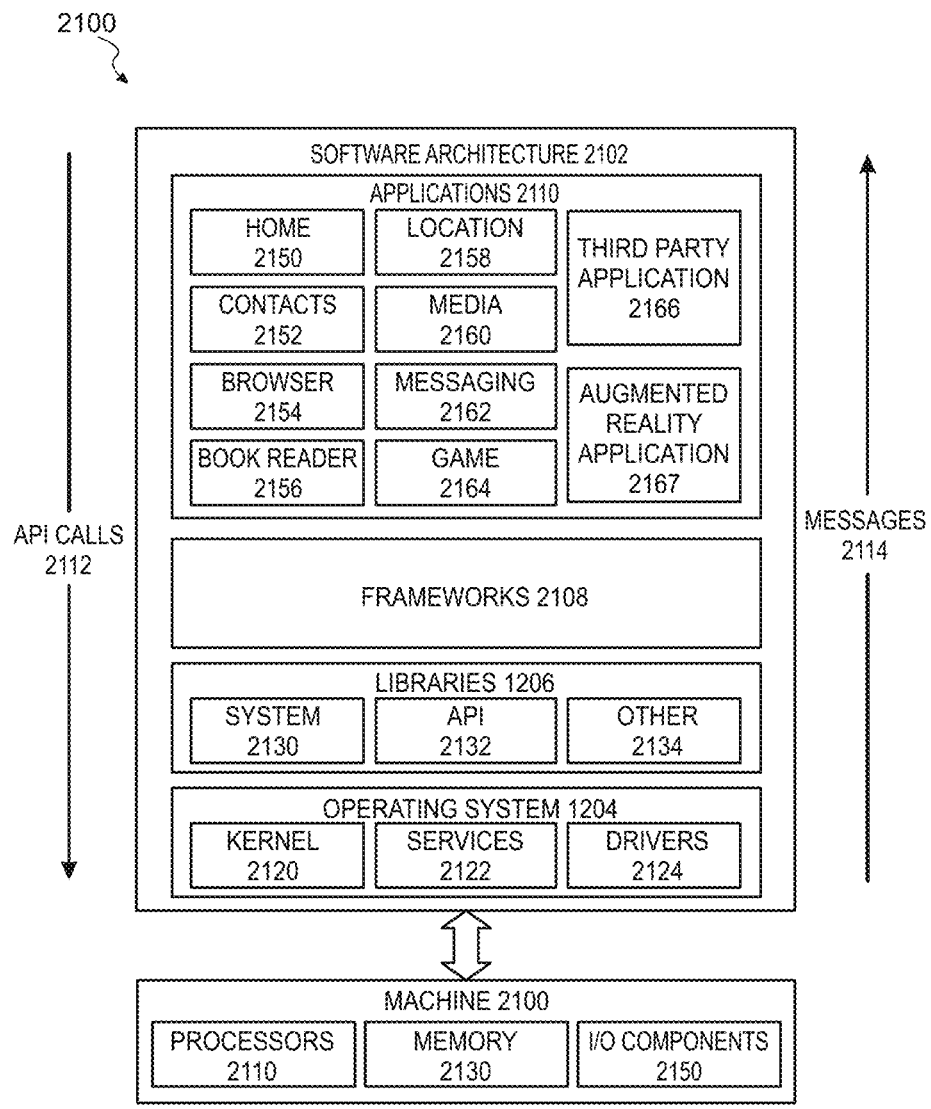
FIG. 21 is a block diagram illustrating an example of a software architecture that may be installed on a machine, in accordance with embodiments of the present disclosure.

FIG. 21 is a block diagram illustrating an example of a software architecture 2100 that may be installed on a machine, in accordance with embodiments of the present disclosure.

FIG. 21 is a block diagram 2100 illustrating an architecture of software 2102, which can be installed on any one or more of the devices described above. FIG. 21 is a non-limiting example of a software architecture, and it will be appreciated that many other architectures can be implemented to facilitate the functionality described herein. In various embodiments, the software 2102 is implemented by hardware such as machine 2200 of FIG. 22 that includes processors 2210, memory 2230, and input/output (I/O) components 2250. In this example architecture, the software 2102 can be conceptualized as a stack of layers where each layer may provide a particular functionality. For example, the software 2102 includes layers such as an operating system 2104, libraries 2106, frameworks 2108, and applications 2110. Operationally, the applications 2110 invoke API calls 2112 through the software stack and receive messages 2114 in response to the API calls 2112, in accordance with some embodiments. In one example, the monetization engine 362 operates as an application 2110.

In some embodiments, the operating system 2104 manages hardware resources and provides common services. The operating system 2104 includes, for example, a kernel 2120, services 2122, and drivers 2124. The kernel 2120 acts as an abstraction layer between the hardware and the other software layers consistent with some embodiments. For example, the kernel 2120 provides memory management, processor management (e.g., scheduling), component management, networking, and security settings, among other functionality. The services 2122 can provide other common services for the other software layers. The drivers 2124 are responsible for controlling or interfacing with the underlying hardware, according to some embodiments. For instance, the drivers 2124 can include display drivers, camera drivers, BLUETOOTH drivers, flash memory drivers, serial communication drivers (e.g., Universal Serial Bus (USB) drivers), WI-FI® drivers, audio drivers, power management drivers, and so forth.

In some embodiments, the libraries 2106 provide a low-level common infrastructure utilized by the applications 2110. The libraries 2106 can include system libraries 2130 (e.g., C standard library) that can provide functions such as memory allocation functions, string manipulation functions, mathematic functions, and the like. In addition, the libraries 2106 can include API libraries 2132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2106 can also include a wide variety of other libraries 2134 to provide many other APIs to the applications 2110.

The frameworks 2108 provide a high-level common infrastructure that can be utilized by the applications 2110, according to some embodiments. For example, the frameworks 2108 provide various graphic user interface (GUI) functions, high-level resource management, high-level location services, and so forth. The frameworks 2108 can provide a broad spectrum of other APIs that can be utilized by the applications 2110, some of which may be specific to a particular operating system 2104 or platform.

In an example embodiment, the applications 2110 include a home application 2150, a contacts application 2152, a browser application 2154, a search/discovery application 2156, a location application 2158, a media application 2160, a messaging application 2162, a game application 2164, and other applications such as a third-party application 2166. According to some embodiments, the applications 2110 are programs that execute functions defined in the programs. Various programming languages can be employed to create one or more of the applications 2110, structured in a variety of manners, such as object-oriented programming languages (e.g., Objective-C, Java, or C++) or procedural programming languages (e.g., C or assembly language). In a specific example, the third-party application 2166 (e.g., an application developed using the Android, Windows or iOS. software development kit (SDK) by an entity other than the vendor of the particular platform) may be mobile software running on a mobile operating system such as Android, Windows or iOS, or another mobile operating system. In this example, the third-party application 1266 can invoke the API calls 2112 provided by the operating system 2104 to facilitate functionality described herein.

An augmented reality application 2167 may implement any system or method described herein, including integration of augmented, alternate, virtual and/or mixed realities for digital experience enhancement, or any other operation described herein.

Figure 22:
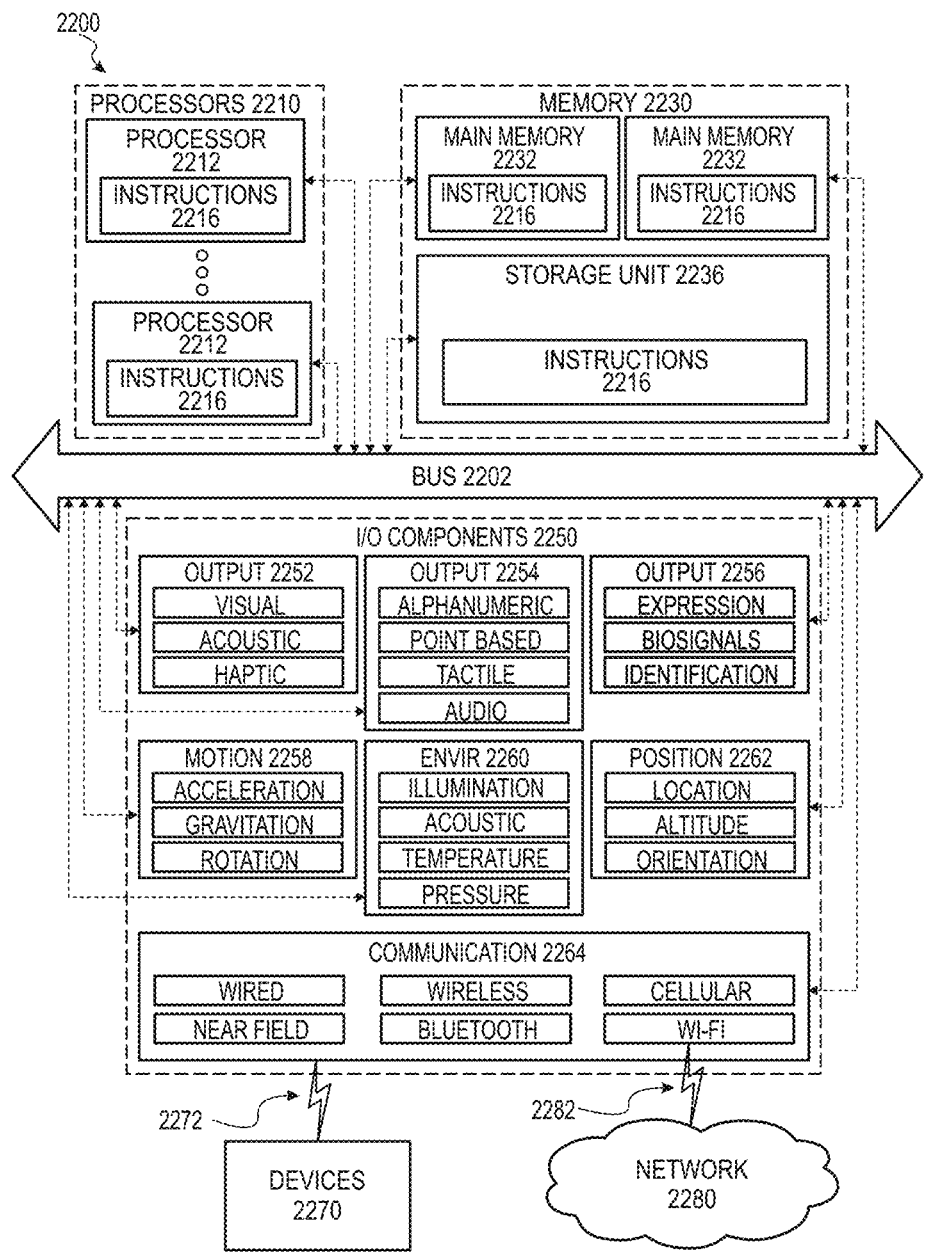
FIG. 22 is a block diagram illustrating components of a machine, according to some example embodiments, able to read a set of instructions from a machine-readable medium (e.g., a machine-readable storage medium) and perform any one or more of the methodologies discussed herein.

FIG. 22 is a block diagram illustrating components of a machine 2200, according to some example embodiments, able to read a set of instructions from a machine-readable medium (e.g., a machine-readable storage medium) and perform any one or more of the methodologies discussed herein.

Specifically, FIG. 22 shows a diagrammatic representation of the machine 2200 in the example form of a computer system, within which instructions 2216 (e.g., software, a program, an application, an applet, an app, or other executable code) for causing the machine 2200 to perform any one or more of the methodologies discussed herein can be executed. Additionally, or alternatively, the instruction can implement any module of FIG. 3A and any module of FIG. 4A, and so forth. The instructions transform the general, non-programmed machine into a particular machine programmed to carry out the described and illustrated functions in the manner described.

In alternative embodiments, the machine 2200 operates as a standalone device or can be coupled (e.g., networked) to other machines. In a networked deployment, the machine 2200 may operate in the capacity of a server machine or a client machine in a server-client network environment, or as a peer machine in a peer-to-peer (or distributed) network environment. The machine 2200 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a head mounted device, a smart lens, goggles, smart glasses, a smart home device (e.g., a smart appliance), other smart devices, a web appliance, a network router, a network switch, a network bridge, a Blackberry, a processor, a telephone, a web appliance, a console, a hand-held console, a (hand-held) gaming device, a music player, any portable, mobile, hand-held device or any device or machine capable of executing the instructions 2216, sequentially or otherwise, that specify actions to be taken by the machine 2200. Further, while only a single machine 2200 is illustrated, the term "machine" shall also be taken to include a collection of machines 2200 that individually or jointly execute the instructions 2216 to perform any one or more of the methodologies discussed herein.

The machine 2200 can include processors 2210, memory/storage 2230, and I/O components 2250, which can be configured to communicate with each other such as via a bus 2202. In an example embodiment, the processors 2210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 2212 and processor 2214 that may execute instructions 2216. The term "processor" is intended to include multi-core processor that may comprise two or more independent processors (sometimes referred to as "cores") that can execute instructions contemporaneously. Although FIG. 22 shows multiple processors, the machine 2200 may include a single processor with a single core, a single processor with multiple cores (e.g., a multi-core processor), multiple processors with a single core, multiple processors with multiples cores, or any combination thereof.

The memory/storage 2230 can include a main memory 2232, a static memory 2234, or other memory storage, and a storage unit 2236, both accessible to the processors 2210 such as via the bus 2202. The storage unit 2236 and memory 2232 store the instructions 2216 embodying any one or more of the methodologies or functions described herein. The instructions 2216 can also reside, completely or partially, within the memory 2232, within the storage unit 2236, within at least one of the processors 2210 (e.g., within the processor's cache memory), or any suitable combination thereof, during execution thereof by the machine 2200. Accordingly, the memory 2232, the storage unit 2236, and the memory of the processors 2210 are examples of machine-readable media.

As used herein, the term "machine-readable medium" or "machine-readable storage medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" or "machine-readable storage medium" should be taken to include a single medium or multiple media (e.g., a centralized or distributed database, or associated caches and servers) able to store instructions 2216. The term "machine-readable medium" or "machine-readable storage medium" shall also be taken to include any medium, or combination of multiple media, that is capable of storing, encoding or carrying a set of instructions (e.g., instructions 2216) for execution by a machine (e.g., machine 2200), such that the instructions, when executed by one or more processors of the machine 2200 (e.g., processors 2210), cause the machine 2200 to perform any one or more of the methodologies described herein. Accordingly, a "machine-readable medium" or "machine-readable storage medium" refers to a single storage apparatus or device, as well as "cloud-based" storage systems or storage networks that include multiple storage apparatus or devices. The term "machine-readable medium" or "machine-readable storage medium" excludes signals per se.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The I/O components 2250 can include a wide variety of components to receive input, provide output, produce output, transmit information, exchange information, capture measurements, and so on. The specific I/O components 2250 that are included in a particular machine will depend on the type of machine. For example, portable machines such as mobile phones will likely include a touch input device or other such input mechanisms, while a headless server machine will likely not include such a touch input device. It will be appreciated that the I/O components 2250 can include many other components that are not shown in FIG. 22. The I/O components 2250 are grouped according to functionality merely for simplifying the following discussion and the grouping is in no way limiting. In example embodiments, the I/O components 2250 can include output components 2252 and input components 2254. The output components 2252 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2254 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), eye trackers, and the like.

In further example embodiments, the I/O components 2250 can include biometric components 2256, motion components 2258, environmental components 2260, or position components 2262 among a wide array of other components. For example, the biometric components 2256 can include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 2258 can include acceleration sensor components (e.g., an accelerometer), gravitation sensor components, rotation sensor components (e.g., a gyroscope), and so forth. The environmental components 2260 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2262 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2250 may include communication components 2264 operable to couple the machine 2200 to a network 2280 or devices 2270 via a coupling 2282 and a coupling 2272, respectively. For example, the communication components 2264 include a network interface component or other suitable device to interface with the network 2280. In further examples, communication components 2264 include wired communication components, wireless communication components, cellular communication components, Near Field Communication (NFC) components, Bluetooth. components (e.g., Bluetooth. Low Energy), WI-FI components, and other communication components to provide communication via other modalities. The devices 2270 may be another machine or any of a wide variety of peripheral devices (e.g., a peripheral device coupled via a USB).

The network interface component can include one or more of a network adapter card, a wireless network interface card, a router, an access point, a wireless router, a switch, a multilayer switch, a protocol converter, a gateway, a bridge, bridge router, a hub, a digital media receiver, and/or a repeater.

The network interface component can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Moreover, the communication components 2264 can detect identifiers or include components operable to detect identifiers. For example, the communication components 2264 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI signal triangulation, location via detecting a BLUETOOTH or NFC beacon signal that may indicate a particular location, and so forth.

In various example embodiments, one or more portions of the network 2280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 2280 or a portion of the network 2280 may include a wireless or cellular network, and the coupling 1382 may be a Code Division Multiple Access (CDMA) connection, a Global System for Mobile communications (GSM) connection, or other type of cellular or wireless coupling. In this example, the coupling 1382 can implement any of a variety of types of data transfer technology, such as Single Carrier Radio Transmission Technology, Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, 5G, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2216 can be transmitted or received over the network 2280 using a transmission medium via a network interface device (e.g., a network interface component included in the communication components 2264) and utilizing any one of a number of transfer protocols (e.g., HTTP). Similarly, the instructions 2216 can be transmitted or received using a transmission medium via the coupling 2272 (e.g., a peer-to-peer coupling) to devices 2270. The term "transmission medium" shall be taken to include any intangible medium that is capable of storing, encoding, or carrying the instructions 2216 for execution by the machine 2200, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the innovative subject matter has been described with reference to specific example embodiments, various modifications and changes may be made to these embodiments without departing from the broader scope of embodiments of the present disclosure. Such embodiments of the novel subject matter may be referred to herein, individually or collectively, by the term "innovation" merely for convenience and without intending to voluntarily limit the scope of this application to any single disclosure or novel or innovative concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method to create an alternate reality environment of a physical location, the method, comprising:

causing to be perceptible or imperceptible, to a human user, a virtual object in the alternate reality environment;

wherein, the alternate reality environment includes:

a representation of a real environment associated with the physical location;

the virtual object;

wherein, the virtual object is made perceptible or imperceptible to the human user in the alternate reality environment depending on a rule set;

wherein, the rule set includes a proximity parameter;

wherein, the virtual object is associated with a real place in the physical location;

wherein, the proximity parameter includes an indication of a physical distance between the human user and the real place;

further wherein, in the alternate reality environment, one or more of, perceptibility of the virtual object and perceptibility of the representation of the real environment is configurable or adjustable by the human user.

2. The method of claim 1, further comprising:

providing access to a virtual world component of the alternate reality environment to the human user, the virtual object being associated with the virtual world component;

wherein, the human user is affiliated with the virtual world component such that the human user is able to access the virtual world component in the alternate reality environment and has permission to perform one or more of:

access the virtual object in the virtual world component;

edit the virtual object in the virtual world component;

author additional virtual objects to be associated with the virtual world component.

3. The method of claim 1, further comprising, updating a representation of the virtual object in the alternate reality environment, to depict action or inaction of the virtual object.

4. The method of claim 3, wherein, the action of the virtual object includes, one or more of:

a talk action; wherein, the talk action of the virtual object is initiated responsive to one or more of, a text query, a speech query or command received by the virtual object;

a visible action; wherein, the visible action of the virtual object causes a visual component of the representation of the virtual object to change for different users or difference devices used by the different users in the real environment to access the alternate reality environment;

an audible action; wherein, the audible action causes an audible component of the representation of the virtual object to change for different users or difference devices used by the different users in the real environment to access the alternate reality environment.

5. The method of claim 3, wherein, the action of the virtual object includes a touch reaction.

6. The method of claim 1,
wherein, an action of the virtual object includes one or more of:
(i) a collection reaction;
wherein, the collection reaction causes, one or more copies of the virtual object to be collected by the human user or another human user;
further wherein, the collection reaction is initiated in response to action by one or more of, the human user, the other human user;
(ii) a put reaction;
wherein, the put reaction causes, one or more copies of the virtual object to be placed in a different physical location;
further wherein, the put reaction is initiated in response to action by one or more of, the human user, the other human user;
(iii) a give reaction;
wherein, the give reaction causes, one or more copies of the virtual object to be given to another human user;
further wherein, the give reaction is initiated in response to action by the human user.

7. The method of claim 1, wherein:
an action of the virtual object includes one or more of:
(i) an annotation reaction;
wherein, the annotation reaction is initiated in response to an annotation action by the human user;
further wherein, the annotation action includes one or more of, commenting, liking, rating, tagging, and linking;
(ii) an edit reaction;
wherein, the edit reaction causes specification or metadata of the virtual object to be modified;
further wherein, the edit reaction is initiated in response to action by the human user;
(iii) a publish action;
wherein, the publish action enables the virtual object to publish one or more of: content, a notification, an event, a command, to a content stream associated with the virtual object.

8. The method of claim 1, wherein:
an action of the virtual object includes autonomous behavior in the alternate reality environment.

9. The method of claim 1, wherein:
an action of the virtual object includes behaviors determined by if-then rules;
wherein, the action of the virtual object includes one or more of, self destruction, shoot at the human user, get shot by the human user, being selectively hidden, react to the human user, change over time, morph from one type of object to another, move from the physical location to another physical location, traverse a path over time.

10. The method of claim 1, wherein, the alternate reality environment is rendered at least in part in a hologram.

11. The method of claim 1,
wherein the representation of the real environment includes a scene of the real environment.

12. The method of claim 1, wherein, the rule set further includes one or more of, temporal parameter, a social parameter, a search parameter and a filter parameter.

13. A machine-readable storage medium, having stored thereon instructions, which when executed by a processor cause the processor to implement a method to create a mixed reality environment associated with a geographical location, the method, comprising:
causing to be discernible or indiscernible, to a human user, a virtual object in the mixed reality environment;
wherein, the mixed reality environment includes:
a representation of a physical environment associated with the geographical location;
the virtual object;
wherein, the virtual object includes metadata regarding a physical place in the geographical location depicted in the representation of the physical environment;
wherein:
the virtual object is authored by a second human user, and accessible by the human user when location data of the human user meets a criteria in relation to the physical place in the geographical location;
the metadata includes, one or more of, reviews, comments, suggestions, ratings, polls, social media data, tweets, feeds, posts, photos, and videos relating to the physical place in the geographical location.

14. A method to create an alternate reality environment of a physical location, the method, comprising:
causing to be perceptible or imperceptible, to a human user, a virtual object in the alternate reality environment;
wherein, the alternate reality environment includes:
a representation of a real environment associated with the physical location;
the virtual object;
further wherein, in the alternate reality environment, one or more of, perceptibility of the virtual object and perceptibility of the representation of the real environment is configurable or adjustable by the human user;
wherein, the alternate reality environment includes a first virtual world component and a second virtual world component;
wherein, the first virtual world component is affiliated with a first entity and the second virtual world component is affiliated with a second entity;
controlling access of a first set of virtual objects associated with the first virtual world component in the alternate reality environment based on a first set of policies or permissions, the first set of policies or permissions being determined at least in part by the first entity;
controlling access of a second set of virtual objects associated with the second virtual world component in the alternate reality environment based on a second set of policies or permissions, the second set of policies or permissions being determined at least in part by the second entity.

15. The method of claim 14, further comprising:
providing access to the first virtual world component of the alternate reality environment to the human user, the virtual object being amongst the first set of virtual objects associated with the first virtual world component;
wherein, the human user is affiliated with the first entity such that the human user is able to access the first virtual world component.

16. The method of claim 14,
wherein, the human user is affiliated with the first entity such that the human user has permission to perform one or more of:
access the virtual object in the first virtual world component;
edit the virtual object in the first virtual world component.

17. The method of claim 14,
wherein, the human user is affiliated with the first entity such that the human user has permission to:
author additional virtual objects to be associated with the first virtual world component.

18. A method to create an alternate reality environment of a physical location, the method, comprising:
causing to be perceptible or imperceptible, to a human user, a virtual object in the alternate reality environment;
wherein, the alternate reality environment includes:
a representation of a real environment associated with the physical location;
the virtual object;
further wherein, in the alternate reality environment, one or more of, perceptibility of the virtual object and perceptibility of the representation of the real environment is configurable or adjustable by the human user;
updating a representation of the virtual object in the alternate reality environment, to depict action or inaction of the virtual object;
wherein, the action of the virtual object includes, generating an output or response to a query command to obtain metadata from the virtual object;
wherein, the query command is issued by one or more of, the human user, another human user and another virtual object.

19. The method of claim 18, further comprising,
further updating the representation of the virtual object in the alternate reality environment in response to detecting one or more of, interaction with the virtual object and interaction with respect to the virtual object.

20. A method to create an alternate reality environment of a physical location, the method, comprising:
causing to be perceptible or imperceptible, to a human user, a virtual object in the alternate reality environment;
wherein, the alternate reality environment includes:
a representation of a real environment associated with the physical location;
the virtual object;
wherein:
an action of the virtual object includes a subscribe/follow action;
wherein, the subscribe/follow action enables the virtual object to subscribe to content or events from an external content stream;
wherein, the external content stream is associated with another virtual object;
wherein, the external content stream associated with the other virtual object includes a public content stream which is publicly accessible in the alternate reality environment.

21. The method of claim 3, further comprising,
updating the representation of the virtual object in the alternate reality environment in response to detecting one or more of, interaction with the virtual object, with respect to the virtual object, and a command issued to the virtual object.

22. The method of claim 3,
wherein, the action of the virtual object includes a touch reaction;
wherein, the touch reaction causes a surface of the virtual object to be interacted with.

23. The method of claim 3,
wherein, the action of the virtual object includes a touch reaction;
wherein, the touch reaction causes internals of the virtual object to be interacted with or exposed.

24. The method of claim 3,
wherein, the action of the virtual object includes a touch reaction;
wherein, the touch reaction causes, one or more behaviors of the virtual object to be initiated or triggered.

25. The method of claim 3,
wherein, the action of the virtual object includes a touch reaction;
further wherein, the touch reaction is initiated in response to action by or contact with one or more of, the human user, another human user, a physical object and another virtual object.

26. The method of claim 3,
wherein, the action of the virtual object includes a touch reaction;
wherein, the touch reaction includes reaction to one or more of move, hit, shoot, poke actions.

27. The method of claim 8,
wherein, the autonomous behavior includes one or more of: chasing the human user and randomly roaming around a path or region.

28. The method of claim 8,
wherein, the autonomous behavior includes one or more of: hiding, doing things to and interacting with other virtual objects.

29. The method of claim 8,
wherein, the autonomous behavior includes, doing things to or interacting with the human user or another human user.

30. The method of claim 1, wherein, the alternate reality environment is rendered at least in part in a hologram, wherein the hologram is accessible in 3D and in 360 degrees.

31. The method of claim 11,
wherein the scene of the real environment includes one or more of, a photograph of the real environment, a photorealistic production or illustration of the real environment, a recorded video of the real environment, a live video or live stream of the real environment.

32. A system to create an alternate reality environment of a physical location, the system, comprising:
a processor;
memory having stored having stored thereon instructions, which when executed by a processor, cause the processor to:
cause to be perceptible or imperceptible, to a human user, a virtual object in the alternate reality environment;
wherein, the alternate reality environment includes:
a representation of a real environment associated with the physical location;
the virtual object;
further wherein, in the alternate reality environment, one or more of, perceptibility of the virtual object and perceptibility of the representation of the real environment is configurable or adjustable by the human user;
wherein, the virtual object is made perceptible or imperceptible to the human user in the alternate reality environment depending on a rule set;
wherein, the rule set includes a proximity parameter;
wherein, the virtual object is associated with a real place in the physical location;
wherein, the proximity parameter includes an indication of a physical distance between the human user and the real place.

* * * * *